(12) United States Patent
Czerwinski et al.

(10) Patent No.: US 12,424,343 B2
(45) Date of Patent: Sep. 23, 2025

(54) SEPARATION OF ACTINIUM FROM AN IRRADIATED SOURCE MATERIAL INCLUDING THORIUM

(71) Applicant: TerraPower Isotopes, LLC, Bellevue, WA (US)

(72) Inventors: Ken Czerwinski, Seattle, WA (US); Joshua C. Walter, Kirkland, WA (US); Christopher Dunckley, Seattle, WA (US)

(73) Assignee: TerraPower Isotopes, LLC, Bellevue, WA (US)

( * ) Notice: Subject to any disclaimer, the term of this patent is extended or adjusted under 35 U.S.C. 154(b) by 0 days.

(21) Appl. No.: 18/644,443

(22) Filed: Apr. 24, 2024

(65) Prior Publication Data

US 2024/0347222 A1    Oct. 17, 2024

Related U.S. Application Data

(63) Continuation of application No. 17/533,264, filed on Nov. 23, 2021, now Pat. No. 12,002,596, which is a
(Continued)

(51) Int. Cl.
*G21G 1/00* (2006.01)
*B01D 11/02* (2006.01)
(Continued)

(52) U.S. Cl.
CPC ........... *G21G 1/02* (2013.01); *B01D 11/0203* (2013.01); *B01D 11/0403* (2013.01);
(Continued)

(58) Field of Classification Search
None
See application file for complete search history.

(56) References Cited

U.S. PATENT DOCUMENTS

| 2,375,009 | A | 5/1945 | Lepsoe et al. |
| 2,874,106 | A | 2/1959 | Hammond et al. |
| | | (Continued) | |

FOREIGN PATENT DOCUMENTS

| CA | 631890 | 11/1961 | |
| CA | 3011398 A1 * | 1/2020 | ............ B01D 15/08 |
| | (Continued) | | |

OTHER PUBLICATIONS

Abbott et al, Thermal and Mechanical Design Aspects of the LIFE Engine, Fusion Science and Technology Dec. 2008; 56(2).
(Continued)

*Primary Examiner* — Lily C Garner
(74) *Attorney, Agent, or Firm* — Merchant and Gould, PC

(57) ABSTRACT

This disclosure describes methods for manufacturing a radioisotope of actinium from an irradiated source material that includes thorium. The method includes storing the source material in a vessel to allow at least some of the source material to decay into actinium. The containment vessel is then injected with supercritical carbon dioxide and a ligand to form a metal complex of actinium. The actinium complex is then removed from the vessel without substantially removing any of the thorium from the vessel.

8 Claims, 12 Drawing Sheets

Related U.S. Application Data continuation of application No. 16/444,973, filed on Jun. 18, 2019, now abandoned, which is a continuation of application No. 16/174,364, filed on Oct. 30, 2018, now abandoned, which is a continuation of application No. 14/757,683, filed on Dec. 23, 2015, now Pat. No. 10,141,079.

(60) Provisional application No. 62/097,235, filed on Dec. 29, 2014.

(51) Int. Cl.
  B01D 11/04      (2006.01)
  B01D 15/40      (2006.01)
  G21C 19/42      (2006.01)
  G21G 1/02       (2006.01)
  G21G 1/08       (2006.01)

(52) U.S. Cl.
  CPC ............ B01D 15/40 (2013.01); G21C 19/42 (2013.01); G21G 1/08 (2013.01); G21G 2001/0036 (2013.01); G21G 2001/0089 (2013.01); G21G 2001/0094 (2013.01); Y02P 20/54 (2015.11)

(56) References Cited

U.S. PATENT DOCUMENTS

| | | |
|---|---|---|
| 2,920,024 A | 1/1960 | Barton et al. |
| 2,945,794 A | 7/1960 | Winters et al. |
| 3,010,889 A | 11/1961 | Fortescue et al. |
| 3,018,239 A | 1/1962 | Happell et al. |
| 3,029,130 A | 4/1962 | Moore |
| 3,046,212 A | 7/1962 | Anderson |
| 3,136,700 A | 6/1964 | Poppendiek et al. |
| 3,216,901 A | 11/1965 | Teitel |
| 3,218,160 A | 11/1965 | Knighton et al. |
| 3,262,856 A | 7/1966 | Bettis |
| 3,275,422 A | 9/1966 | Cathers et al. |
| 3,287,225 A | 11/1966 | Ackroyd et al. |
| 3,383,285 A | 5/1968 | Ackroyd et al. |
| 3,450,198 A | 6/1969 | Brunner |
| 3,743,577 A | 7/1973 | Bettis et al. |
| 3,785,924 A | 1/1974 | Notari |
| 3,909,351 A | 9/1975 | Tilliette |
| 3,996,099 A | 12/1976 | Faugeras et al. |
| 3,997,413 A | 12/1976 | Fougner |
| 4,039,377 A | 8/1977 | Andrieu et al. |
| 4,045,286 A | 8/1977 | Blum et al. |
| 4,056,435 A | 11/1977 | Carlier et al. |
| 4,216,821 A | 8/1980 | Robin |
| 4,342,721 A | 8/1982 | Pomie |
| 4,397,778 A | 8/1983 | Lloyd |
| 4,762,667 A | 8/1988 | Sharbaugh |
| 5,185,120 A | 2/1993 | Fennern |
| 5,196,159 A | 3/1993 | Kawashima et al. |
| 5,223,210 A | 6/1993 | Hunsbedt et al. |
| 5,380,406 A | 1/1995 | Horton et al. |
| 5,421,855 A | 6/1995 | Hayden et al. |
| 5,596,611 A | 1/1997 | Ball |
| 5,730,874 A | 3/1998 | Wai et al. |
| 5,770,085 A | 6/1998 | Wai et al. |
| 5,792,357 A | 8/1998 | Wai et al. |
| 5,910,971 A | 6/1999 | Ponomarev-Stepnoy et al. |
| 6,181,759 B1 | 1/2001 | Heibel |
| 6,490,330 B1 | 12/2002 | Jamriska, Sr. et al. |
| 7,217,402 B1 | 5/2007 | Miller et al. |
| 8,132,410 B2 | 3/2012 | Oh et al. |
| 8,416,908 B2 | 4/2013 | Mann |
| 8,529,713 B2 | 9/2013 | Ahlfeld et al. |
| 8,594,268 B2 | 11/2013 | Shu |
| 8,734,738 B1 | 5/2014 | Herrmann |
| 9,171,646 B2 | 10/2015 | Moses et al. |
| 10,043,594 B2 | 8/2018 | Scott |
| 10,141,079 B2 | 11/2018 | Czerwinski et al. |
| 10,395,787 B2 * | 8/2019 | Sumita ............... G21F 9/28 |
| 10,438,705 B2 | 10/2019 | Cheatham |
| 10,497,479 B2 | 12/2019 | Abbott et al. |
| 10,566,096 B2 | 2/2020 | Czerwinski et al. |
| 10,734,122 B2 | 8/2020 | Cisneros et al. |
| 10,867,710 B2 | 12/2020 | Cisneros et al. |
| 10,878,969 B2 | 12/2020 | Huke et al. |
| 2004/0114704 A1 | 6/2004 | Bolton et al. |
| 2005/0220251 A1 | 10/2005 | Yokoyama et al. |
| 2008/0232533 A1 | 9/2008 | Blanovsky |
| 2008/0310575 A1 | 12/2008 | Cinotti |
| 2011/0131991 A1 | 6/2011 | Oh et al. |
| 2011/0222642 A1 | 9/2011 | Gautier |
| 2011/0286563 A1 | 11/2011 | Moses et al. |
| 2011/0286565 A1 | 11/2011 | Tsang |
| 2011/0305390 A1 | 12/2011 | Brown |
| 2012/0027156 A1 | 2/2012 | Peterson |
| 2012/0051481 A1 | 3/2012 | Shu |
| 2012/0056125 A1 | 3/2012 | Raade et al. |
| 2012/0069946 A1 | 3/2012 | Hamill et al. |
| 2012/0183112 A1 | 7/2012 | LeBlanc |
| 2012/0228788 A1 | 9/2012 | Jankowiak et al. |
| 2012/0288048 A1 | 11/2012 | Mann |
| 2012/0314829 A1 | 12/2012 | Greene |
| 2013/0083878 A1 | 4/2013 | Massie et al. |
| 2013/0180520 A1 | 7/2013 | Raade et al. |
| 2013/0272470 A1 | 10/2013 | Whitten et al. |
| 2014/0166924 A1 | 6/2014 | Raade et al. |
| 2014/0348287 A1 | 11/2014 | Huke et al. |
| 2015/0010875 A1 | 1/2015 | Raade et al. |
| 2015/0036779 A1 | 2/2015 | LeBlanc |
| 2015/0078504 A1 | 3/2015 | Woolley |
| 2015/0117589 A1 | 4/2015 | Kamei |
| 2015/0170766 A1 | 6/2015 | Singh et al. |
| 2015/0228363 A1 | 8/2015 | Dewan et al. |
| 2015/0243376 A1 | 8/2015 | Wilson |
| 2015/0310943 A1 | 10/2015 | Kielb et al. |
| 2015/0357056 A1 | 12/2015 | Shayer |
| 2016/0005497 A1 | 1/2016 | Scott |
| 2016/0189806 A1 | 6/2016 | Cheatham, III et al. |
| 2016/0189812 A1 | 6/2016 | Czerwinski et al. |
| 2016/0189813 A1 | 6/2016 | Cisneros et al. |
| 2016/0196887 A1 | 7/2016 | Singh |
| 2016/0217874 A1 | 7/2016 | Dewan et al. |
| 2016/0260505 A1 | 9/2016 | Cadell et al. |
| 2016/0260509 A1 | 9/2016 | Kim et al. |
| 2017/0084355 A1 | 3/2017 | Scott |
| 2017/0092381 A1 | 3/2017 | Cisneros et al. |
| 2017/0117065 A1 | 4/2017 | Scott |
| 2017/0213610 A1 | 7/2017 | Sumita et al. |
| 2017/0301421 A1 | 10/2017 | Abbott et al. |
| 2017/0316841 A1 | 11/2017 | Abbott et al. |
| 2018/0019025 A1 | 1/2018 | Abbott et al. |
| 2018/0047467 A1 | 2/2018 | Czerwinski et al. |
| 2018/0068750 A1 | 3/2018 | Cisneros et al. |
| 2018/0137944 A1 | 5/2018 | Abbott et al. |
| 2018/0277260 A1 | 9/2018 | Marcille et al. |
| 2019/0139665 A1 * | 5/2019 | Czerwinski ............ G21G 1/02 |
| 2019/0237205 A1 | 8/2019 | Abbott et al. |
| 2019/0311816 A1 | 10/2019 | Sumita et al. |
| 2020/0027590 A1 | 1/2020 | Cisneros et al. |
| 2020/0087156 A1 | 3/2020 | Kelleher |
| 2020/0118698 A1 | 4/2020 | Cheatham et al. |
| 2020/0122109 A1 | 4/2020 | Kruizenga et al. |
| 2020/0185114 A1 | 6/2020 | Abbott et al. |
| 2020/0211724 A1 | 7/2020 | Cisneros et al. |
| 2020/0251231 A1 | 8/2020 | Czerwinski et al. |
| 2021/0027905 A1 * | 1/2021 | Robertson .......... B01D 15/1871 |
| 2021/0062296 A1 * | 3/2021 | Sinclair ................ B01J 39/26 |
| 2022/0118379 A1 * | 4/2022 | Zhuravlev ............. C22B 34/14 |

FOREIGN PATENT DOCUMENTS

| | | |
|---|---|---|
| CN | 1922695 | 2/2007 |
| CN | 101323793 | 12/2008 |
| CN | 101939793 | 1/2011 |
| CN | 104145309 | 11/2014 |
| CN | 201580066422.1 | 8/2017 |

(56) References Cited

FOREIGN PATENT DOCUMENTS

| | | | |
|---|---|---|---|
| CN | 108780666 A | * 11/2018 | ............ G21C 1/024 |
| CN | 2015/80071735.6 | 9/2020 | |
| CN | 107112055 B | 9/2020 | |
| DE | 1112791 | 10/1963 | |
| DE | 1439107 | 2/1969 | |
| EP | 0617430 | 9/1994 | |
| EP | 3357068 | 8/2018 | |
| FR | 2296248 | 11/1977 | |
| GB | 739968 | 11/1955 | |
| GB | 835266 | 5/1960 | |
| GB | 964841 | 7/1964 | |
| GB | 2073938 B | 7/1984 | |
| GB | 2511113 | 8/2014 | |
| GB | 2508537 A | 12/2014 | |
| GB | 2516046 | 1/2015 | |
| JP | S 35-013995 B | 9/1960 | |
| JP | S571991 | 1/1982 | |
| JP | 1991282397 | 10/1991 | |
| JP | 11-174194 | 7/1999 | |
| JP | 2001133572 | 5/2001 | |
| JP | 2003063801 | 3/2003 | |
| JP | 2008116275 A | 9/2010 | |
| JP | 2010223942 | 10/2010 | |
| JP | 2012047531 | 3/2012 | |
| JP | 2014-119429 | 12/2012 | |
| JP | 2014-534413 A | 12/2014 | |
| JP | 2015-510588 | 4/2015 | |
| KR | 20000020716 A | 11/2000 | |
| KR | 20100113621 A | 1/2014 | |
| RU | 57040 U1 | 9/2006 | |
| RU | 2424587 | 7/2011 | |
| RU | 2490737 | 8/2013 | |
| RU | 2666552 | 9/2018 | |
| WO | WO2000/03399 | 1/2000 | |
| WO | WO2009/135286 | 11/2009 | |
| WO | WO2013/085383 | 6/2013 | |
| WO | WO2013/116942 | 8/2013 | |
| WO | WO2013/180029 | 12/2013 | |
| WO | WO2014/039641 | 3/2014 | |
| WO | WO2014/074930 | 5/2014 | |
| WO | WO2014/128457 | 8/2014 | |
| WO | WO2014/196338 | 12/2014 | |
| WO | WO2015/140495 | 9/2015 | |
| WO | WO2016/109565 | 7/2016 | |
| WO | WO2016197807 | 12/2016 | |
| WO | WO2018/013317 | 1/2018 | |
| WO | WO/2019183724 | 10/2019 | |
| WO | WO-2020030659 A1 | * 2/2020 | ......... A61K 51/0478 |

OTHER PUBLICATIONS

Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.
ASTM International, Designation: B898-11, Standard Specification for Reactive and Refractory Metal Clad Plate (Sep. 2011), 15 pages.
Chapter 20, Creeping Flow, Physics of Continuous Matter, Exotic and Everyday Phenomena in the Macroscopic World, Lautrup, B., The Niels Bohr Institute, Copenhagen, Denmark, 2004.
Clarno, K.T. et al., "Trade studies for the liquid-salt-cooled very high-temperature reactor: fiscal year 2006 progress report", ORNL/TM-2006 140 (2007), 35 pgs.
Cohen et al., "Vanadium-Lined HT9 Cladding Tubes", Argonne National Lab ANL/ET/CP-80384, (Feb. 1994), 12 pgs.
Donnelly et al., Fabrication of Heat Exchanger Tube Bundle for the Molten-Salt Reactor Experiment, ORNL-3500, Dec. 9, 1963.
EP15876187.4 European Extended Search Report for EP 15876187.4 dated Sep. 11, 2018, 10 pages.
Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.
Forsberg et al., Fluoride-Salt-Cooled High-Temperature Reactor (FHR) for Power and Process Heat, Final Project Report, MIT-ANP-TR-157, Dec. 2014, 62 pgs.
Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.
Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.
Freeman et al., "Archimedes Plasma Mass Filter," AIP Conf. Proc. 694, 403 (2003).
GEN IV International Forum, Molten Salt Reactor (MSR), https://www.gen-4.org/gif/jcms/c_9359/msr, accessed Feb. 26, 2016, 3 pgs.
Grimes, W. R., "Molten-Salt Reactor Chemistry," Nucl. Appl. Technol. vol 8, 137-155 (1970).
Holcomb, et al. Fast Spectrum Molten Salt Reactor Options, Jul. 2011, 46 pages. Available at: http://info.ornl.gov/sites/publications/files/Pub29596.pdf.
KIMURA-Neutron Spectrum in Small Iron Pile Surrounded by Lead Reflector, Journal of Nuclear Science and Technology, 15(3), pp. 183-191 (Mar. 1978).
Kramer et al., Fusion-Fission Blanket Options for the LIFE Engine, Fusion Science and Technology, vol. 60, pp. 72-77, Jul. 2011.
Kramer et al., Parameter study of the LIFE engine nuclear design, Energy Conversion and Management, 51, pp. 1744-1750, 2010.
Kuznetsov et al., Electrochemical Behavior and Some Thermodynamic Properties of UCl [sub 4] and UCl [sub 3] Dissolved in a LiCl-KCl Eutectic Melt, Journal of the Electrochemical Society, vol. 152, No. 4, Jan. 2005, 11 pages.
Maltsev et al., Redox potentials of uranium in molten eutectic mixture of lithium, potassium, and cesium chlorides, Russian Metallurgy, Maiknauka—Interperidica, RU, vol. 2016, No. 8, Dec. 2016.
Merle-Lucotte, E., Introduction to the Physics of the Molten Salt Fast Reactor, Thorium Energy Conference 2013 (ThEC13), 2013.
Molten Salt Reactor (MSR) Review: Feasibility Study of developing a pilot scale molten salt reactor in the UK, Jul. 2015, Energy Process Development, LTD (available at www.energyprocessdevelopments.com).
Mourogov et al., Potentialities of the fast spectrum molten salt reactor concept: REBUS-3700, Energy Conversion and Management, Mar. 30, 2006, vol. 47, No. 17, pp. 2761-2771.
MSR—Fuji General Information, Technical Features, and Operating Characteristics.
Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982.
Ottewitte, E. H., Cursory First Look at the Molten Chloride Fast Reactor as an Alternative to the Conventional BATR Concept.
PCT/US2016/055001 IPRP+WO—International Preliminary Report on Patentability and Written Opinion mailed Apr. 3, 2018, 8 pages.
PCT/US2016/055001 ISR+WO—International Search Report and Written Opinion in International Application PCT/US2016/055001, mailed Jan. 25, 2017, 14 pages.
PCT/US2017/030455 ISR+WO—International Search Report and Written Opinion mailed Jan. 30, 2018, 23 pages.
PCT/US2017/030666 ISR+WO, date mailed Jul. 20, 2017.
PCT/US2017/030672 ISR+WO—International Search Report and Written Opinion in International Application No. PCT/US2017/030672, mailed Sep. 27, 2017, 11 pages.
PCT/US2017/038806 IPRP+WO—International Preliminary Report on Patentability and Written Opinion in International Application PCT/US2017/038806, mailed Jan. 15, 2019, 9 pgs.
PCT/US2017/038806 ISR+WO—International Search Report and Written Opinion Oct. 16, 2017.
PCT/US2017/046139 IPRP+WO—International Preliminary Report on Patentability and Written Opinion Feb. 12, 2019, 8 pgs.
PCT/US2017/046139 ISR+WO—International Search Report and Written Opinion, Jan. 17, 2018, 16 pgs.

(56) References Cited

OTHER PUBLICATIONS

PCT/US2017/061843 IPRP + WO—International Preliminary Report on Patentability and Written Opinion in International Application PCT/US2017/061843, mailed May 21, 2019, 13 pages.
PCT/US2017/061843 ISR + WO—International Search Report and Written Opinion in International Application PCT/US2017/061843, mailed Oct. 29, 2018, 35 pages.
PCT/US2019/015967 ISR + WO—International Search Report and Written Opinion of PCT/US2019/015967, mailed Jun. 12, 2019, 20 pages.
PCT/US2019/021791 ISR + WO—International Search Report and Written Opinion in International Application PCT/US2019/021791, mailed Nov. 19, 2019, 15 pages.
Reactor Start-up Procedure. Technical University Dresden. Reactor Training Course. pp. 3-4. <https://tu-dresden.de/ing/maschinenwesen/iet/wket/ressourcen/dateien/akr2/Lehrrnaterialien/start_e.pdf?lang=en>. (Mar. 2015), 21 pgs.
Reactor Training Course Experiment Reactor Start-up Procedure, Technical University Dresden, Institute of Power Engineering Training Reactor.
Rouch et al, Preliminary thermal-hydraulic core design of the Molten Salt Fast Reactor (MSFR), Annals of Nuclear Energy 64 (2014) 449-456.
Scott, Ian: Safer, cheaper nuclear: The simple molten salt reactor, http://www.ee.co.za/article/safer-cheaper-nuclear-simple-molten-salt-reactor.html, Dec. 2, 2014, 10 pgs.
Taube, et al., Molten Plutonium Chlorides Fast Breeder Reactor Cooled by Molten Uranium Chloride, Annals of Nuclear Science and Engineering, vol. 1, pp. 277-281., 1974.
Thoma, R. E., "Chemical Aspects of MSRE Operations," ORNL-4658, Dec. 1971.
Van't Eind, R.J.S., Simulation of a Fast Molten Salt Reactor, PSR-131-2011-009, Jul. 2011, 68 pages.
Xu et al., Thorium Energy R&D in China, THEO13, Cern, Oct. 28, 2013, 59 pgs.
Yamaji et al., Experimental and numerical thermal-hydraulics investigation of a molten salt reactor concept core, Kerntechnik 82 (2017) 4.
Yamaji et al., Thermal-hydraulic analyses and experimental modelling of MSFR, Annals of Nuclear Energy 64 (2014) 457-471.
Adamson et al., "Interim Report on Corrosion By Alkali-Metal Fluorides: Way to May 1, 1953" ORNL-2337, Oak Ridge Laboratory, Oak Ridge, Tennessee (Mar. 20, 1959).
Adamson, et al., "Interim Report on Corrosion by Zirconium-Base Fluorides" ORNL-2338 UC-25—Metallurgy and Ceramics, Oak Ridge National Laboratory, Oak Ridge, TN, (Jan. 3, 1961).
Afonichkin et al., "Dynamic Reference Electrode for Investigation of Fluoride Melts Containing Beryllium Difluoride" Journal of Fluorine Chemistry 130: 83-88 (Jul. 2008).
ASTM International "A312/A312M-17 Standard Specification for Seamless, Welded, and Heavily Cold Worked Austenitic Stainless Steel Pipes" ASTM International, West Conshohocken, PA, Mar. 15, 2017.
ASTM International "B407-08a Standard Specification for Nickel-Iron-Chromium Alloy Seamless Pipe and Tube" ASTM International, West Conshohocken, PA, 2019.
ASTM International "Standard Practice for Cleaning, Descaling, and Passivation of Stainless Steel Parts, Equipment, and Systems" ASTM International A380/A380M-17, pp. 1-13, West Conshohocken, PA (Sep. 2017).
Blood "Solubility and Stability of Structural Metal Difluorides in Molten Fluoride Mixtures" ORNL-TM-760, Oak Ridge National Laboratory (Jan. 9, 1964).
Diamond et al., Actinium-225 Production with an Electron Accelerator, Nov. 28, 2020, 37 pages.
Ding et al., "Hot Corrosion Behavior of Commercial Alloys in Thermal Energy Storage Material of molten MgCl2/KCl/NaCl Under Inert Atmosphere" Solar Energy Materials and Solar Cells, pp. 1-20 (May 2018).
Ding et al., "Molten Chloride Salts for Next Generation Concentrated Solar Power Plants: Mitigation Strategies Against Corrosion of Structural Materials" Solar Energy Materials and Solar Cells 193:298-313 (Jan. 30, 2019).
Dvorakova, Zuzana, Production and chemical processing of 177Lu for nuclear medicine at the Munich research reactor FRM-II, Dissertation of Zuzana Dvorakova, Institut fur Radiochemie der Technischen Universitat Munchen, 95 pages, 2007.
Eiselstein et al., "The Invention and Definition of Alloy 625" Superalloys 718, 625, and Various Derivatives, The Minerals, Metals & Materials Society, pp. 1-14 (1991).
Evans et al., "Corrosion in Polythermal Loop Systems II. A Solid-State Diffusion Mechanism With and Without Liquid Film Effects" ORNL-4575, vol. 2, Oak Ridge National Laboratory, Oak Ridge, Tennessee (Jun. 1971).
Floreen et al., "The Metallurgy of Alloy 625" Superalloys 718, 625, and Various Derivatives, The Minerals, Metals & Materials Society, pp. 13-37 (1994).
Gracheva et al., Production and characterization of no-carrier-added 161tb as an alternative to the clinically-applied 177lu for radionuclide therapy, EJNMMI Radiopharmacy and Chemistry (2019) 4:12, 16 pages.
Hastelloy C-276 alloy (brochure), https://www.haynesintl.com/alloys/alloy-portfolio_/Corrosion-resistant-Alloys/HASTELLOY-C-276-Alloy/principal-features.aspx, Last accessed Feb. 1, 2022, 1 page (2022).
Johnson et al., "A Method for the Purification of Molten Chloride Salts" Technical Report ANL-7603, Argonne National Laboratory, Argonne, Illinois (Aug. 1969).
Keiser et al. "The Corrosion Resistance of Type 316 Stainless Steel to Li2BeF4" ORNL—TM-5782, Oak Ridge National Laboratory, Oak Ridge, Tennessee (Apr. 1977).
Koger "Alloy Compatibility with LiF—BeF2 Salts Containing ThF4 and UF4" Technical Paper ORNL-TM-4286, Oak Ridge National Laboratory, Oak Ridge, Tennessee (Dec. 1972).
Koger "Corrosion and Mass Transfer Characteristics of NaBF4—NaF (92-8 mole %) in Hastelloy N" ORNL-TM-3866 Oak Ridge National Laboratory, Oak Ridge, Tennessee (Oct. 6, 1972).
Koger "Effect of FeF2 Addition on Mass Transfer in a Hastelloy N—LiF—BeF2—UF4 Thermal Convection Loop System" ORNL-TM-4188 Oak Ridge National Laboratory, Oak Ridge Tennessee (Dec. 1972).
Koger "Evaluation of Hastelloy N Alloys After Nine Years Exposure to Both a Molten Fluoride Salt and Air at Temperatures from 700 to 560 Degrees C" ORNL-TM-4189, Oak Ridge National Laboratory, Oak Ridge, Tennessee (Dec. 1972).
Kozempel et al., Preparation of 67 Cu via deuteron irradiation of 70 Zn, Radiochimica Acta, Jul. 2012, 6 pages.
Le, Van So, Specific Radioactivity of Neutron Induced Radioisotopes: Assessment Methods and Application for Medically Useful 177Lu Production as a Case, Molecules 2011, 16, pp. 818-846.
Manly et al., "Aircraft Reactor Experiment—Metallurgical Aspects" AEC Research and Development Report ORNL-2349, Oak Ridge National Laboratory, 1-51 (Dec. 20, 1957).
McCoy "The INOR-8 Story" Review—Oak Ridge National Laboratory 3:35-48 (1969).
Melville, et al., A theoretical model for the production of Ac-225 for cancer therapy by neutron capture transmutation of Ra-226, Elsevier Applied Radiation and Isotopes 72 (2013) 152-157.
Miller, True, Production of Lutetium-177 via the Indirect Route Using PUR-1, Thesis submitted to the Faculty of Purdue University in partial fullfillment of the Requirements for the degree of Master of Science in Nuclear Engineering, West Lafayette, Indiana, USA, May 2021.
Mortazavi et al., "High-Temperature Corrosion of a Nickel-Based Alloy in a Molten Chloride Environment—The Effect of Thermal and Chemical Purifications" Solar Energy Materials and Solar Cells, 236:1-17 (Dec. 16, 2021).
Raiman et al., "Aggregation and Data Analysis of Corrosion Studies in Molten Chloride and Fluoride Salts" Journal of Nuclear Materials, pp. 1-13 (Jul. 16, 2018).

(56) References Cited

OTHER PUBLICATIONS

Raseman et al., "Engineering Experience at Brookhaven National Laboratory in Handling Fused Chloride Salts" Associated Universities Inc., Brookhaven National Laboratory, Upton, N.Y. (Jun. 1960).
Ren et al., "Alloy Selection and C-276 Code Design Value Extension for Advanced Molten Salt Technology Test Facilities Experimentation" Proceedings of the ASME 2020 Pressure Vessels & Piping Conference PVP2020, Aug. 3, 2020, Virtual Online, pp. 1-9 (Aug. 2020).
Richardson "Development of Freeze Valve for Use in the MSRE" ORNL-TM-128 Oak Ridge National Laboratory, Oak Ridge, Tennessee (Feb. 28, 1962).
Richardson et al., "Corrosion by Molten Fluorides" AEC Research and Development Report, Oak Ridge National Laboratory, pp. 1-19, (Sep. 1952).
Shaffer "Preparation and Handling of Salt Mixtures for the Molten Salt Reactor Experiment" ORNL-4616, Oak Ridge National Laboratory, Oak Ridge, Tennessee (Jan. 1971).
Sjoblom et al., Capture Cross Section of Ac-227 for Thermal Pile Neutrons, ANL-5263, May 1954, 8 pages.
Special Metals "The story of the "Incoloy alloys series," from 800, through 800H, 800HT" https://www.specialmetals.com/documents/technical-bulletins/incoloy/incoloy-alloy-800h-800ht.pdf, pp. 1-16 (Sep. 2004).
Stites, Jr., et al., The Micrometallurgy of Actinium, MLM-881, Aug. 5, 1953, 16 pages.
Sun et al., "Corrosion Behavior of 316SS and Ni-based Alloys in a Ternary NaCl—KCl-MgCl2 Molten Salt" Solar Energy 171: 320-329 (Jul. 2, 2018).
Susskind et al. "Corrosion Studies for a Fused Salt-Liquid Metal Extraction Process for the Liquid Metal Fuel Reactor" Associated Universities Inc., Brookhaven National Laboratory, Upton, N.Y. (Jun. 30, 1960).
Vansant, Paul D., Medical Isotope Production of Actinium-225 By Linear Accelerator Photon Irradiation of Radium-226, Thesis submitted to the faculty of the Virginia Polytechnic Institute and State University in partial fulfillment of the requirements for the degree of Master of Science In Mechanical Engineering, Apr. 30, 2013, Blacksburg, VA, 95 pages.
Vidal et al., "Molten Chloride Technology Pathway to Meet the U.S. Doe Sunshot Initiative with Gen3 CSP" AIP Conference Proceedings 2126, 080006, National Renewable Energy Laboratory, Golden Colorado (Jul. 26, 2019).
Vignarooban et al., "Corrosion Resistance of Hastelloys in Molten Metal-Chloride Heat-Transfer Fluids for Concentrating Solar Power Applications" Solar Energy 103:62-69 (Feb. 2014).
Vijayan et al., "On the Steady-State Performance of Natural Circulation Loops" International Journal of Heat and Mass Transfer, vol. 34, No. 9, pp. 2219-2230 (Jul. 18, 1990).
Vijayan et al., "Scaling Laws for Single-Phase Natural Circulation Loops" Nuclear Engineering and Design 152:331-347 (1994).
Williams "Assessment of Candidate Molten Salt Coolants for the NGNP/NHI Heat-Transfer Loop" ORNL-TM-2006/69, Oak Ridge National Laboratory, Oak Ridge, Tennessee (Jun. 2006).
Zhao "Molten Chloride Thermophysical Properties, Chemical Optimization, and Purification" Technical Report NREL/TP-5500-78047 National Renewable Energy Laboratory, Golden, Colorado, (2020).
Zheng et al., "High-Temperature Corrosion of UNS N10003 in Molten Li2BeF4 (FLiBe) Salt" Corrosion, vol. 71, No. 10, pp. 1257-1266 (Oct. 2015).
Ashraf-Khorassani, Mehdi, Michael T. Combs, and Larry T. Taylor. "Solubility of metal chelates and their extraction from an aqueous environment via supercritical CO2." Talanta 44.5 (1997): 755-763.
Bertch, T.C., Selective Gaseous Extraction Research, Development and Training for Isotope Production, Final Technical Report for the Period Apr. 1, 2012 through Mar. 31, 2014, General Atomics, 27 pgs.
Borts, B., et al. "The study of supercritical extraction of complexes of molybdenum with carbon dioxide." 6 (6) (2016): 57-63.
Chou, Wei-Lung, et al., "Removal of gallium (iii) ions from acidic aqueous solution by supercritical carbon dioxide extraction in the green separation process." Journal of hazardous materials 160.1 (2008): 6-12.
EESR EP15875826.8 European Extended Search Report in European Application EP15875826.8, mailed Sep. 6, 2018, 7 pages.
EESR Extended European Search Report Oct. 27, 2021 in European Application No. 21187359.1 filed Aug. 9, 2017, 7 pages.
EP14863738.2 European Extended Search Report for EP 14863738.2 dated Jun. 2, 2017, 11 pages.
ESR20211581.2 European Extended Search Report in European Application EP 20 21 1581.2, mailed Mar. 24, 2021, 8 pages.
Gomez-Vidal et al., "Corrosion of Alloys in a Chloride Molten Salt (NaCl-LiCl) for Solar Thermal Technologies" Solar Energy Materials & Solar Cells 157:234-244 (May 20, 2016).
Guo, et al. "Corrosion in the Molten Fluoride and Chloride Salts and Materials Development for Nuclear Applications" Progress in Materials Science, pp. 1-111 (May 14, 2018).
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, 28 pages, Aug. 1969.
Hung, Laurence, et al. "Supercritical CO2 extraction of molybdenum-ligand complexes from sulfuric solutions." The Journal of Supercritical Fluids 111 (2016): 97-103.
Li, et al., "Affinity Extraction into CO2. 2. Extraction of Heavy Metals into C02 from Low-pH Aqueous Solutions", Ind. Eng. Chem. Res. 37:4763-4773 (1998).
Lin et al., "Supercritical fluid extraction and chromatography of metal chelates and organometallic compounds" trends in analytical chemistry 14(3): 123-133 (1995).
MacPherson "The Molten Salt Reactor Adventure" Nuclear Science and Engineering 90: 374-380 (1985).
Mekki et al., "Extraction of Lanthanides from Aqueous Solution by Using Room-Temperature Ionic Liquid and Supercritical Carbon Dioxide in Conjunction" Chem. Eur. J. 12:1760-1766 (2006).
PCT/US2015/000499 IPRP+WO—International Preliminary Report on Patentability and Written Opinion in International Application PCT/US2015/000499, mailed Jul. 4, 2017, 9 pages.
PCT/US2015/000499 ISR + WO—International Search Report and Written Opinion in International Application PCT/US2015/000499, mailed Jul. 22, 2016, 13 pages.
PCT/US2015/067704 IPRP+WO—International Preliminary Report on Patentability and Written Opinion mailed Jul. 4, 2017, 7 pages.
PCT/US2015/067704 ISR + WO—International Search Report and Written Opinion, 9 pages.
PCT/US2015/067905 IPRP—International Preliminary Report on Patentability mailed Jul. 4, 2017, 14 pages.
PCT/US2015/067905 ISR + WO—International Search Report and Written Opinion in International Application PCT/US2015/067905 mailed Aug. 5, 2016, 20 pages.
PCT/US2015/067923 IPRP—International Preliminary Report on Patentability mailed Jul. 4, 2017, 7 pages.
PCT/US2015/067923 ISR + WO—International Search Report and Written Opinion in International Application PCT/US2015/067923, mailed Apr. 19, 2016.
PCT/US2017/030455 IPRP—International Preliminary Report on Patentability mailed Nov. 6, 2018, 17 pages.
PCT/US2017/030457 IPRP—International Preliminary Report on Patentability mailed Nov. 15, 2018, 15 pages.
PCT/US2017/030457 ISR + WO—International Search Report and Written Opinion in International Application PCT/US2017/030457, mailed Jan. 23, 2018, 20 pages.
PCT/US2017/030666 PCT International Preliminary Report on Patentability in International Application PCT/US2017/030666 date mailed Nov. 6, 2018, 9 pages.
PCT/US2017/030672 IPRP+WO—International Preliminary Report on Patentability and Written Opinion mailed Nov. 6, 2018, 7 pages.
PCT/US2019/015967 IPRP—International Preliminary Report on Patentability (IPRP) dated Aug. 13, 2020.

(56) References Cited

OTHER PUBLICATIONS

PCT/US2019/021791 IPRP—PCT International Preliminary Report on Patentability in International Application PCT/US2019/021791, mailed Sep. 24, 2020, 9 pages.

PCT/US2019/051345 ISR + WO—International Search Report and Written Opinion in International Application PCT/US2019/051345, mailed Mar. 5, 2020, 15 pages.

PCT/US2020/066599 ISR + WO dated May 17, 2021, 17 pages.

PCT/US2020/066908 Search report and written opinion, date of mailing Aug. 16, 2021, 22 pages.

Rosenthal, M.W., et al., "Molten-Salt Reactors—History, Status, and Potential" Nuclear Applications and Technology 8:2, 107-117, May 19, 2017.

Rykhlevskii, Andrei, et al., Fuel Cycle Performance of Fast Spectrum Molten Salt Reactor Designs. Oak Ridge National Lab (ORNL), Oak Ridge, TN (United States), 2019. (Year: 2019), 13 pages.

Scott, Ian and Durham John, the Simple Molten Salt Reactor, Practical, safe and cheap, Moltex Energy LLP presentation slides, 9 pgs.

Serp et al., "The Molten Salt Reactor (MSR) in Generation IV: Overview and Perspectives" Progress in Nuclear Energy 77: 308-319 (2014).

Takata et al., Conceptual Design on Fast Reactor Fuel Reprocessing System Using Super-Direx Process, p. 5 (Apr. 25-29, 2004).

Transatomic Power Technical White Paper, Mar. 2014, V1 .0.1., (2014), http://www.transatomicpower.com/, 34 pgs.

Wai, C. M. "Supercritical Fluid Extraction of Trace Metals from Solid and Liquid Materials for Analytical Application." Analytical sciences 11.1 (1995): 165-167.

Wai, C.M. and Shaofen Wang. "Supercritical fluid extraction: metals as complexes." Journal of chromatography A 785. 1-2 (1997): 369-383.

Wang et al., "Extraction of Uranium from Aqueous Solutions by Using Ionic Liquid and Supercritical Carbon Dioxide in Conjunction" Chem. Eur. J. 15:4458-4463 (2009).

Wang Shaofen et al., "Application of Supercritical Fluid Extraction Technology on the Treatment of Nuclear Waste", Applied Chemistry, vol. 20, No. 5, pp. 409-414, May 31, 2003.

Wang, Jun-Wei et al.: "Influence of MgCl2 content on corrosion behavior of GH1140 in molten NaCl—MgCl2as thermal storage medium", Solar Energy Materials and Solar Cells, Elsevier Science Publishers, Amsterdam, NL, vol. 179, Nov. 20, 2017, pp. 194-201, ISSN: 0927-0248.

Yamaji et al., Experimental investigation of the MSFR molten salt reactor concept, Kerntechnik 79 (2014) 5, pp. 408-416.

Yamaji et al., Experimental Modelling and Numerical Analysis of a Molten Salt Fast Reactor, PHYSOR 2014—The Role of Reactor Physics Toward a Sustainable Future, Kyoto, Japan, Sep. 28-Oct. 2, 2014.

Yan, Wudan, "Mining medical isotopes from nuclear waste", Nuclear Chemistry, vol. 98, Issue 20, Jul. 27, 2020.

Zhao et al., Review Use of ionic liquids as 'green' solvents for extractions, J. Chem. technol. Biotechnol. 80: 1089-1096 (2005), pp. 1089-1096 (2005).

Zhu et al., "Extraction of Actinides and Lanthanides by Supercritical Fluid" Journal of Engineering for Gas Turbines and Power 133:1-8 (May 2011).

\* cited by examiner

SEPARATION OF ACTINIUM FROM AN IRRADIATED SOURCE MATERIAL INCLUDING THORIUM

CROSS REFERENCE TO RELATED APPLICATIONS

The present application is a continuation of and claims priority to U.S. patent application Ser. No. 17/533,264, filed Nov. 23, 2021, now U.S. Pat. No. 12,002,596, which application is a continuation of and claims priority to U.S. patent application Ser. No. 16/444,973, filed Jun. 18, 2019, now abandoned. U.S. patent application Ser. No. 16/444,973 is a continuation of and claims priority to U.S. patent application Ser. No. 16/174,364, filed Oct. 30, 2018, now abandoned. U.S. application Ser. No. 16/174,364 is a continuation of and claims priority to U.S. patent application Ser. No. 14/757,683, filed Dec. 23, 2015, now U.S. Pat. No. 10,141,079. U.S. Pat. No. 10,141,079 claims the benefit of U.S. Provisional Patent Application No. 62/097,235, filed Dec. 29, 2014, the entire disclosures of which are incorporated by reference in their entireties. To the extent appropriate, a claim of priority is made to each of the above disclosed applications.

INTRODUCTION

Irradiation of chemical compounds and separating materials from the irradiated compound have a range of technical applications which includes the production of radioisotopes, nuclear fuel processing, and fundamental scientific research. For example, the following is a table that lists some valuable radioisotopes including those with medical applications. Some of the radioisotopes are generated directly from precursor fissionable material while others are decay products of other radioisotopes.

TABLE 1

Radioisotopes and Uses

| Radioisotope | Symbol | Half Life | Use(s) |
|---|---|---|---|
| Actinium-227 | $^{227}Ac$ | 21.8 y | As a parent of $^{223}Ra$, used to create a $^{223}Ra$ generator (such an isotope generator may also sometimes be referred to as a $^{227}Ac$ "cow" that is occasionally "milked" to obtain the $^{223}Ra$ isotope). |
| Bismuth-213 | $^{213}Bi$ | 46 min | Used for targeted alpha therapy (TAT), especially cancers, as it has a high energy (8.4 MeV). |
| Cesium-various isotopes | $^{xx}Cs$ | | Used in brachytherapy, particularly $^{133}Cs$ and $^{131}Cs$. |
| Carbon-11 | $^{11}C$ | 20.3 m | Positron emitter used in positron emission tomography (PET) for studying brain physiology and pathology, in particular for localizing epileptic focus, and in dementia, psychiatry and neuropharmacology studies. Also has a role in cardiology. |
| Chromium-51 | $^{51}Cr$ | 27.7 d | Used to label red blood cells and quantify gastro-intestinal protein loss. |
| Cobalt-57 | $^{57}Co$ | 271.8 d | Used as a marker to estimate organ size and for in-vitro diagnostic kits. |
| Cobalt-60 | $^{60}Co$ | 5.271 y | Formerly used for external beam radiotherapy. |
| Copper-64 | $^{64}Cu$ | 12.7 h | Used to study genetic diseases affecting copper metabolism, such as Wilson's and Menke's diseases, and for PET imaging of tumors, and therapy. |
| Copper-67 | $^{67}Cu$ | 2.6 d | Beta emitter, used in therapy. |
| Dysprosium-165 | $^{165}Dy$ | 2.33 h | Used as an aggregated hydroxide for synovectomy treatment of arthritis. |
| Erbium-169 | $^{169}Er$ | 9.4 d | Used for relieving arthritis pain in synovial joints. |
| Fluorine-18 | $^{18}F$ | 1.83 h | Positron emitter used in PET for studying brain physiology and pathology, in particular for localizing epileptic focus, and in dementia, psychiatry and neuropharmacology studies. Also has a role in cardiology. $^{18}F$ has become very important in detection of cancers and the monitoring of progress in their treatment, using PET. |
| Gallium-67 | $^{67}Ga$ | 78 h | Used for tumor imaging and localization of inflammatory lesions (infections). |
| Gallium-68 | $^{68}Ga$ | 68 min | Positron emitter used in PET and PET-CT units. A daughter of $^{68}Ge$ typically obtained from a 68Ge generator. |
| Germanium-68 | $^{68}Ge$ | 271 d | Used as the 'parent' in a generator to produce the daughter isotope $^{68}Ga$. |
| Gold, various isotopes | $^{xx}Au$ | | Used in brachytherapy. $^{198}Au$ in particular is used for treatment of the prostate. |
| Holmium-166 | $^{166}Ho$ | 26 h | Being developed for diagnosis and treatment of liver tumors. |
| Indium-111 | $^{111}In$ | 2.8 d | Used for specialized diagnostic studies, e.g. brain studies, infection and colon transit studies. |
| Iodine-123 | $^{123}I$ | 13.2 h | Increasingly used for diagnosis of thyroid function, it is a gamma emitter from electron capture. This isotope does not have the beta decay that occurs in $^{131}I$. |

TABLE 1-continued

Radioisotopes and Uses

| Radioisotope | Symbol | Half Life | Use(s) |
|---|---|---|---|
| Iodine-124 | $^{124}$I | 4.18 d | Used as a tracer. |
| Iodine-125 | $^{125}$I | 59.4 d | Used in cancer brachytherapy (prostate and brain), also diagnostically to evaluate the filtration rate of kidneys and to diagnose deep vein thrombosis in the leg. It is also widely used in radioimmuno-assays to show the presence of hormones in tiny quantities. |
| Iodine-131 | $^{131}$I | 8.02 d | Widely used in treating thyroid cancer and in imaging the thyroid; also in diagnosis of abnormal liver function, renal (kidney) blood flow and urinary tract obstruction. A strong gamma emitter, but used for beta therapy. |
| Iridium-192 | $^{192}$Ir | 74 d | Supplied in wire form for use as an internal radiotherapy source for cancer treatment (used then removed). Beta emitter. |
| Iron-59 | $^{59}$Fe | 46 d | Used in studies of iron metabolism in the spleen. |
| Krypton-81m | $^{81m}$Kr | 13.1 sec | $^{81m}$Kr gas can yield functional images of pulmonary ventilation, e.g. in asthmatic patients, and for the early diagnosis of lung diseases and function. |
| Lead-212 | $^{212}$Pb | 10.6 h | Used in TAT for cancers or alpha radioimmunotherapy, with decay products $^{212}$Bi and $^{212}$Po delivering the alpha particles. |
| Lutetium-177 | $^{177}$Lu | 6.7 d | Increasingly important as it emits just enough gamma for imaging while the beta radiation does the therapy on small (e.g. endocrine) tumors. Its half-life is long enough to allow sophisticated preparation for use. |
| Molybdenum-99 | $^{99}$Mo | 66 h | Used as the 'parent' in a generator (e.g., a $^{99}$Mo cow) to produce $^{99m}$Tc. |
| Nitrogen-13 | $^{13}$N | 9.97 m | Positron emitter used in PET for studying brain physiology and pathology, in particular for localizing epileptic focus, and in dementia, psychiatry and neuropharmacology studies. Also has a role in cardiology. |
| Neptunium-238 | $^{238}$N | 2.11 d | Can be obtained from neutron bombardment of $^{237}$N, a parent of $^{238}$Pu. |
| Oxygen-15 | $^{15}$O | 122.2 s | Positron emitter used in PET for studying brain physiology and pathology, in particular for localizing epileptic focus, and in dementia, psychiatry and neuropharmacology studies. Also has a role in cardiology. |
| Palladium-103 | $^{103}$Pd | 17 d | Used to make brachytherapy permanent implant seeds for early stage prostate cancer. |
| Phosphorus-32 | $^{32}$P | 14 d | Used in the treatment of polycythemia vera (excess red blood cells) and laboratory experiments. Beta emitter. |
| Plutonium-238 | $^{238}$Pu | 87.7 y | Used as a source in radioisotope thermoelectric generators. |
| Potassium-42 | $^{42}$K | 12 h | Used for the determination of exchangeable potassium in coronary blood flow. |
| Radium-227 | $^{227}$Ra | 42 m | Parent of $^{223}$Ra. |
| Radium-223 | $^{223}$Ra | 11.4 d | Used for treating pain associated with multifocal bone metastases. Decay product of $^{227}$Ra via $^{227}$Ac and $^{227}$Th. |
| Rhenium-186 | $^{186}$Re | 3.8 d | Used for pain relief in bone cancer. Beta emitter with weak gamma for imaging. |
| Rhenium-188 | $^{188}$Re | 17 h | Used to beta irradiate coronary arteries from an angioplasty balloon. |
| Rubidium-81 | $^{81}$Rb | 4.6 h | Parent of $^{81m}$Kr. |
| Rubidium-82 | $^{82}$Rb | 1.26 min | Convenient PET agent in myocardial perfusion imaging. |
| Ruthenium-various isotopes | $^{xx}$Ru | | Used in brachytherapy. |
| Samarium-153 | $^{153}$Sm | 47 h | Very effective in relieving the pain of secondary cancers lodged in the bone, sold as Quadramet ™. Also very effective for prostate and breast cancer. Beta emitter. |
| Selenium-75 | $^{75}$Se | 120 d | Used in the form of seleno-methionine to study the production of digestive enzymes. |
| Sodium-24 | $^{23}$Na | 15 h | For studies of electrolytes within the body. |
| Strontium-82 | $^{82}$Sr | 25 d | Used as the 'parent' in a generator to produce $^{82}$Rb. |
| Strontium-89 | $^{89}$Sr | 50 d | Very effective in reducing the pain of prostate and bone cancer. Beta emitter. |
| Technetium-99m | $^{99m}$Tc | 6.0 h | Used in to image the skeleton and heart muscle in particular, but also for brain, thyroid, lungs |

TABLE 1-continued

Radioisotopes and Uses

| Radioisotope | Symbol | Half Life | Use(s) |
|---|---|---|---|
| | | | (perfusion and ventilation), liver, spleen, kidney (structure and filtration rate), gall bladder, bone marrow, salivary and lacrimal glands, heart blood pool, infection and numerous specialized medical studies. |
| Thallium-201 | $^{201}$Tl | 73 h | Used for diagnosis of coronary artery disease other heart conditions such as heart muscle death and for location of low-grade lymphomas. It is the most commonly used substitute for $^{99}$Tc in cardiac-stress tests. |
| Thorium-227 | $^{227}$Th | 18.7 d | Decay product of $^{227}$Ac and parent of $^{223}$Ra. |
| Xenon-133 | $^{133}$Xe | 5.24 d | Used for pulmonary (lung) ventilation studies. |
| Ytterbium-169 | $^{169}$Yb | 32 d | Used for cerebrospinal fluid studies in the brain. |
| Ytterbium-169 | $^{169}$Yb | 32 d | Used for cerebrospinal fluid studies in the brain. |
| Yttrium-90 | $^{90}$Y | 64 h | Used for cancer brachytherapy and as silicate colloid for relieving the pain of arthritis in larger synovial joints. Pure beta emitter and of growing significance in therapy, especially liver cancer. |

Current techniques for the production of radioisotopes involve the irradiation of a precursor material in which some of the precursor is converted into one or more radioisotopes distributed throughout the material. This is followed by dissolution of the material and subsequent separation of the unreacted precursor material from the produced radioisotopes. In currently known techniques for producing radioactive isotopes, target materials are often sealed in capsules and placed into irradiation locations. The irradiations can be performed with reactors or accelerators using a variety of particles and targets. After irradiation, the capsules are placed in shielded containers and transported to chemistry laboratories capable of handling the high activity of the material for batch dissolution and recovery of the radioactive isotope product or products.

Targetry Coupled Separations

Using currently known techniques, the vast majority of the initial starting material in irradiations is unreacted and often must be dissolved to allow the irradiation products to be chemically separated. The separation of the minuscule amount of the irradiation product from a large excess of unreacted starting material often requires multiple purification routes after dissolution. If additional product is to be formed from nuclear reactions with the remaining starting material, the remaining starting material must be reformed after dissolution into a form suitable for subsequent irradiations. This requires additional processing steps, often with losses in potential product and additional waste generation. However, if the dissolved remaining starting material is not reformed for additional production, that remaining material must be disposed of, representing both a loss of potentially usable (and valuable) material and an additional disposal cost. For isotopically rare or enriched materials, this can be a large expense.

The same issue can also arise in the context of nuclear fuel reprocessing. In this context, nuclear fuel, rather than precursor starting material, can be processed after irradiation in a power generating nuclear reactor, nuclear fission test reactor, research reactor, or teaching reactor, to remove byproducts of the nuclear fission reaction and to reprocess the unreacted nuclear fuel for recycling and/or reuse. Similar to radioisotope production, current recycling of used nuclear fuel from extraction, ion exchange, or electrochemical methods first requires dissolution of the fuel into a solution. After the fuel has been dissolved, the remaining steps are done to remove the unwanted byproducts and to reprocess the unreacted nuclear fuel back into a suitable form for reuse as fuel.

This disclosure describes systems and methods for creating (through irradiation) and removing one or more desired radioisotopes from a starting material and further describes systems and methods that allow the same starting material to undergo multiple irradiations and separation operations without extensive, if any, damage to its original form. In one aspect, targetry coupled separation refer to the selection of a starting material (including selection of the material's physical structure) and separation chemistry in order to optimize the recovery of the predetermined irradiation product. The disclosure further describes how with targetry coupled separations, by removing the newly-created product in a way that allows the same starting material to undergo one or more subsequent irradiations (that is, without having to dissolve or otherwise destroy the material between irradiations), significant cost savings can be achieved using repeated irradiation and separation operations on the same starting material. The systems and methods described achieve this with a minimum waste of the starting material during the irradiation and product isotope removal and separation operations. In contrast with the prior art that requires complete or substantial dissolution or destruction of the starting material before recovery of any irradiation products, the repeated reuse of the starting material allowed by targetry coupled separation represents a significant increase in efficiency and decrease in cost over the prior art.

One aspect of this disclosure is a system for generating radioisotopes that includes: one or more containers, including a first container, the first container containing source material that includes at least one target material; a radiation generator; a radiation bombardment chamber that receives radiation from the radiation generator in which the radiation bombardment chamber is adapted to hold and expose the one or more containers to the received radiation, thereby creating at least some first radioisotopes that are a direct product of the exposure of the target material to the radiation; an insertion component adapted to transfer an extraction material into the first container, thereby contacting the source material within the first container with the extraction material in which the extraction material is selected to dissolve, without dissolving the target material, one or more of a first radioisotope, a second radioisotope that is a daughter product of a first radioisotope, or both a first radioisotope and a second radioisotope; and an extraction component adapted to remove extraction material with the dissolved radioisotope from the first container without removing the target material from the first container.

In the system the target material may be a fissionable material and the radiation generator is a neutron generator. The source material may be a porous form with a pore wall width based on a recoil distance of a direct radioisotope product of the fissionable target material. The system may also include a recovery component adapted to receive the extraction material with the dissolved radioisotope from the first container and recover some of the at least one species of radioisotope from the extraction material. The system may also include a conveyance system adapted to physically move a container from the radiation bombardment chamber to a second location for interaction with one or both of the insertion component or the extraction component. The conveyance system may be further adapted to repeatedly move a container from the radiation bombardment chamber to the second location and from the second location to the radiation bombardment chamber. The conveyance system may also be adapted to physically move a plurality of containers from the radiation bombardment chamber to the second location. The fissionable target material may include grains containing uranium oxide or uranium metal having an average particle size of less than an average recoil distance of $^{99}$Mo as a fission product of uranium.

In the system, the extraction material may be selected from a supercritical fluid and an aqueous fluid that preferentially dissolves the one or more of a first radioisotope, a second radioisotope that is a daughter product of a first radioisotope, or both a first radioisotope and a second radioisotope. The extraction material may be supercritical carbon dioxide containing a ligand that dissolves the one or more of a first radioisotope, a second radioisotope that is a daughter product of a first radioisotope, or both a first radioisotope and a second radioisotope.

The system may automatically perform a radioisotope generation cycle in which the system exposes the first container to radiation, transfers the extraction material into the first container, and removes extraction material with the dissolved radioisotope from the first container. The system may also automatically repeat the radioisotope generation cycle on the first container. The system may process a plurality of containers, including the first container, such that each of the plurality of containers is exposed to radiation.

The target material may include one or more of uranium oxide or uranium metal in the form of powder, salt, cloth, foam or a colloidal suspension in liquid. The source material may include radium or radium electroplated on beryllium. The at least one species of radioisotope generated by the system include one or more of $^{227}$Ac, $^{213}$Bi, $^{131}$Cs $^{133}$Cs, $^{11}$C, $^{51}$Cr, $^{57}$Co, $^{60}$Co, $^{64}$Cu, $^{67}$Cu, $^{165}$Dy, $^{169}$Er, $^{18}$F, $^{67}$Ga, $^{68}$Ga, $^{68}$Ge, $^{198}$Au, $^{166}$Ho, $^{111}$In, $^{123}$I, $^{124}$I, $^{125}$I, $^{131}$I, $^{192}$Ir, $^{59}$Fe, $^{81m}$Kr $^{212}$Pb, $^{177}$Lu, $^{99}$Mo, $^{13}$N, $^{15}$O, $^{103}$Pd, $^{32}$P, $^{238}$P, $^{42}$K, $^{227}$Ra, $^{223}$Ra, $^{186}$Re, $^{188}$Re, $^{81}$Rb, $^{82}$Rb, $^{101}$Ru, $^{103}$Ru, $^{153}$Sm, $^{75}$Se, $^{24}$Na, $^{82}$Sr, $^{89}$Sr, $^{99m}$Tc, and $^{201}$Tl. The radiation generator used by the system may be selected from one or more of Pu—Be sources, $^{252}$Cf sources, sealed tube radiation generators, dense plasma focus devices, pinch devices, inertial electrostatic confinement devices, sub-critical source driven assemblies, fission reactors, and accelerator spallation devices.

Another aspect of this disclosure is a method for generating $^{99}$Mo. The method includes: providing a source containing a first mass of uranium in which the source is in a form in which a majority of uranium atoms are within a selected distance from an available surface of the source; exposing the source to neutrons, thereby reducing the first mass of uranium in the source to a second mass of uranium less than the first mass and creating at least some atoms of the $^{99}$Mo radioisotope and thereby also causing at least some of the newly created atoms of the $^{99}$Mo radioisotope to move toward an available surface of the source; and after exposing the source to neutrons, removing at least some of the atoms of the $^{99}$Mo radioisotope from the source without substantially removing uranium from the second mass of uranium in the source.

In the method, the removing operation may remove less than 0.1% of the uranium or even less than 0.01% of the uranium from the second mass of uranium in the source. The providing operation may include providing a source made at least partially from particles containing uranium oxide or uranium metal in which the particles have a particle size based on a recoil distance of $^{99}$Mo in the source. The method may include enclosing the source in a neutronically-translucent container. The method may further include exposing the container enclosing the source to neutrons and removing at least some of the atoms of the $^{99}$Mo radioisotope from the container. The method may include selecting an extraction material that dissolves atoms of the $^{99}$Mo radioisotope without changing the phase of the uranium in the source or selecting an extraction material in which atoms of the $^{99}$Mo radioisotope are more soluble than atoms of uranium.

The method may include determining the form of the source based on the selected extraction material. The method may also include selecting a combination of a source and an extraction material, wherein the combination allows $^{99}$Mo radioisotope to be removed from the source after exposure to neutrons without substantially affecting the source. The removing operation of the method may include passing an extraction material selected to dissolve the $^{99}$Mo radioisotope through the container, thereby contacting the available surface of the source with the extraction material.

In the method, the extraction material may be selected from a supercritical fluid and an aqueous fluid. If the extraction material is supercritical carbon dioxide, it may contain a ligand that dissolves the $^{99}$Mo radioisotope. The ligand may be selected from 8-hydroxyquinoline, α-benzoinoxime, disodium 4,5-dihydroxy-1,3-benzenedisulfonate, phosphate compounds, and diketone compounds. In an alternative embodiment, the ligand may have one or more functional groups selected from hydroxyl, carbonyl, diketones, aldehyde, haloformyl, carbonate ester, carboxylate, ester, ether, peroxy, amine, carboxamide, imide, imine, nitrate, cyanate, thiol, sulfide, sulfinyl, sulfonyl, thiocyanate, isothiocyanate, phosphate, and phosphono groups.

The method may include repeatedly performing the exposing operation and the removing operations on the container without removing the uranium from the container. The method may include removing the $^{99}$Mo radioisotope from the extraction material and, afterwards, repeating the exposing operation on the same source. The method may further include removing, in addition to the $^{99}$Mo radioisotope, an amount of one or more other fission products created during the exposing operation.

Yet another aspect of this disclosure is a method for selectively manufacturing a radioisotope. The method includes: selecting the radioisotope; identifying a target material from which the selected radioisotope can be created as a fission product; determining a recoil distance of the selected radioisotope in the target material; creating a plurality of grains of target material having a grain size based on the recoil distance of the selected radioisotope; exposing the grains of target material to neutrons, thereby causing at least some atoms of the target material to undergo nuclear fission to create atoms of the selected radioisotope and also causing at least some of the newly created atoms of the selected radioisotope to move the recoil distance relative to the target material; and extracting atoms of the selected radioisotope from the target material.

In the method, the exposing and extracting operations may be performed without changing the phase of the target material. The method may further include repeating the exposing operation and extracting operation on the plurality of grains of target material. The plurality of grains of target material may be contained within a neutronically-translucent container and the method may further include repeatedly performing the exposing operation and extracting operation on the same plurality of grains of target material without removing the plurality of grains of target material from the container. The grains may be particles of uranium oxide or uranium metal having a grain size of less than 20 microns. In an embodiment, the grains are particles of uranium oxide or uranium metal having a grain size from about 0.001 to 10 micrometers. In the method, at least some of the plurality of grains may have a characteristic length along at least one dimension smaller than or equal to the recoil distance.

The extraction operation of the method may include exposing at least some of the grains of target material to a solvent that preferentially extracts the selected radioisotope from the target material. The method may further include processing the grains of target material into a solid, porous source prior to the exposing operation. The processing may include processing the grains of target material into an open-cell foam, an open lattice, an open framework, a ceramic, a cloth, a thin film, a monolayer, a sponge, a nanocage, or a nanocrystal. The processing may include processing the grains of target material into a solid, porous source having a surface area greater than 10 m$^2$/g as measured by Brunauer, Emmett and Teller (BET) analysis. The processing may include one or more of sintering, milling, sieving, 3D printing, crystallizing, precipitating, or heating the grains of target material.

Another aspect of this disclosure is a method for selectively manufacturing a radioisotope. The method includes: receiving a source having solid fissionable material in a neutronically-translucent container in which the source has a porous form with pore walls having a width substantially similar to a recoil distance of a radioisotope product of the solid fissionable material; exposing the source to neutrons, thereby converting at least some atoms of the solid fissionable material via nuclear fission into atoms of the radioisotope so that the source contains radioisotope and unconverted solid fissionable material; selecting an extraction material that preferentially dissolves the radioisotope relative to the fissionable material; injecting the extraction material into the container, thereby contacting the source material with the extraction material; removing extraction material from the container after a residence time, thereby removing at least some dissolved radioisotope from the container while leaving substantially all of the unconverted solid fissionable material in the container; and, after removing the extraction material, re-exposing the source material to neutrons, thereby converting at least some atoms of the unconverted solid fissionable material via nuclear fission into atoms of the radioisotope.

The method may further include repeating the injecting and removing operations on the target after re-exposing the target to neutrons. The method may also include separating dissolved radioisotope from the extraction material; and incorporating the dissolved radioisotope into a daughter isotope generator. The method may further include periodically milking the daughter isotope generator for the daughter isotope. The method may include waiting until at least a first predetermined period of time has elapsed after removing the extraction material from the container in which the predetermined period of time being based on a half-life of the radioisotope; and separating the radioisotope from the extraction material.

Another aspect of this disclosure is a method for manufacturing a radioisotope-generating target. The method includes: providing a dissolved salt of a fissionable material in a solution in which the fissionable material capable of generating a first designated radioisotope when exposed to neutrons and the first designated radioisotope having a recoil distance associated with the fissionable material; precipitating an oxide of the fissionable material from the solution; and selectively forming the precipitated oxide into grains, i.e., individual particles, having a grain size based on the recoil distance of the first designated radioisotope. The method may further include mixing a precipitant into the solution and/or selecting the fissionable material based on the first designated radioisotope. The method may include determining the recoil distance of the first designated radioisotope based on the selected fissionable material and/or forming grains having a grain size equal to or less than 10 micrometers. The method may include forming grains having a grain size equal to or less than 1 micrometer. The method may include forming grains having a grain size equal to or less than 100 nanometers and the method may include forming grains having a grain size equal to or less than 10 nanometers.

In the method, the forming operation may include one or more of milling, drying, filtering, washing, calcining, or sintering the precipitated oxide. The method may include packaging the grains of the precipitated oxide in a container. The container may have a first valve adapted to allow the injection of a solvent into the container and a second valve adapted to allow the extraction of a solvent from the container. The container may be neutronically-translucent. Packaging the grains may further include placing the grains in a cavity defined by the container; and sealing the container, thereby trapping the grains in the cavity. The method may include synthesizing a ceramic from the precipitated oxide grains. In the method, the providing operation may further include providing the dissolved salt of the fissionable material in a solution selected from one or more of an acidic solution, a basic solution, an aqueous solution, and an alcohol solution.

In yet another aspect of this disclosure, a radioisotope-generating target is described. The target includes a target material capable of generating the radioisotope upon prolonged exposure to neutrons and the radioisotope associated with a recoil distance; and the target material having a characteristic distance selected based on the recoil distance of the radioisotope. In the target, the radioisotope may be a direct fission product of nuclear fission of the target material. A neutronically-translucent container may be used to contain the plurality of grains. The container may have an input valve and an output valve allowing the injection and extraction of a fluid. The target's container may include a body portion and at least one removable lid portion that, when engaged, encloses the target material within the container. The container may be made of one or more of aluminum, aluminum alloy, zirconium, zirconium alloy, molybdenum, molybdenum alloy, and stainless steel.

The target material may include a plurality of grains of target material loosely packed in the container and the characteristic distance is a grain size selected based on the recoil distance of the radioisotope. The target material may include a plurality of grains of target material formed into a ceramic. The target material may include a plurality of grains of target material formed into or attached to a metal-organic framework. The target material may include one or more of uranium oxide or uranium metal. The target material may include a plurality of grains of target material formed into a loose powder, a cloth, a foam or a colloidal suspension in liquid. The target material may include radium or radium electroplated on beryllium. The target material may include grains of an actinide monolayer and the actinide monolayer may be a monolayer of uranium. The target material may include grains of a high surface area, uranium metal which may be created using the Kroll process.

Yet another aspect of this disclosure is a supercritical carbon dioxide separation method. The method extracts a first radioisotope from irradiated fissionable material containing a plurality of radioisotopes including the first radioisotope. The method includes: selecting a ligand that is soluble in supercritical carbon dioxide ($sCO_2$), forms a chelate with the first radioisotope, and does not form a chelate with the fissionable material; dissolving the identified ligand into $sCO_2$ to form an $sCO_2$-ligand solution; contacting the irradiated material with the $sCO_2$-ligand solution for a contact time, thereby creating an $sCO_2$-radioisotope complex solution; separating the $sCO_2$-radioisotope complex solution from the irradiated material; and after separating the $sCO_2$-radioisotope complex solution from the irradiated material, removing the radioisotope from the $sCO_2$-radioisotope complex solution. In the method, removing the radioisotope from the $sCO_2$-radioisotope complex solution may include removing the radioisotope complex from the $sCO_2$-radioisotope complex solution. The removing operation may generate the $sCO_2$-ligand solution suitable for reuse without decompressing and repressurizing the $sCO_2$ ligand solution. This may be achieved by contacting the $sCO_2$-radioisotope complex solution with an acidic solution, thereby generating an acid-radioisotope solution and a regenerated $sCO_2$-ligand solution.

In the method, the irradiated material may be enclosed in a container and the exposing operation may further include passing the $sCO_2$-ligand solution through the container without removing substantially any of the fissionable material from the container. In this case, the container may be operated as a packed bed reactor. In the method, the irradiated material may be in the form of loose grains and the exposing operation further includes passing the $sCO_2$-ligand solution through the container at a flow rate sufficient to fluidize the plurality of grains within the container. In the method, the irradiated material may also be a liquid.

In the method, the radioisotope may be $^{99}Mo$, the fissionable material may be $^{235}U$ and the ligand may have one or more functional groups selected from hydroxyl, carbonyl, diketones, aldehyde, haloformyl, carbonate ester, carboxylate, ester, ether, peroxy, amine, carboxamide, imide, imine, nitrate, cyanate, thiol, sulfide, sulfinyl, sulfonyl, thiocyanate, isothiocyanate, phosphate, and phosphono groups. The ligand may be selected from a fluorinated β-diketone and a trialkyl phosphate, or a fluorinated β-diketone and a trialkylphosphine oxide. The ligand may be selected from dithiocarbamates, thiocarbazones, β-diketones and crown ethers. The ligand may have one or more functional groups selected from hydroxyl, carbonyl, diketones, aldehyde, haloformyl, carbonate ester, carboxylate, ester, ether, peroxy, amine, carboxamide, imide, imine, nitrate, cyanate, thiol, sulfide, sulfinyl, sulfonyl, thiocyanate, isothiocyanate, phosphate, and phosphono groups. Radioisotopes that may be created by this method include one or more of $^{227}Ac$, $^{213}Bi$, $^{131}Cs$, $^{133}Cs$, $^{11}C$, $^{51}Cr$, $^{57}Co$, $^{60}Co$, $^{64}Cu$, $^{67}Cu$, $^{165}Dy$, $^{169}Er$, $^{18}F$, $^{67}Ga$, $^{68}Ga$, $^{68}Ge$, $^{198}Au$, $^{166}Ho$, $^{111}In$, $^{123}I$, $^{124}I$, $^{125}I$, $^{131}I$, $^{192}Ir$, $^{59}Fe$, $^{81m}Kr$, $^{212}Pb$, $^{177}Lu$, $^{99}Mo$, $^{13}N$, $^{15}O$, $^{103}Pd$, $^{32}P$, $^{238}P$, $^{42}K$, $^{227}Ra$, $^{223}Ra$, $^{186}Re$, $^{188}Re$, $^{81}Rb$, $^{82}Rb$, $^{101}Ru$, $^{103}Ru$, $^{153}Sm$, $^{75}Se$, $^{24}Na$, $^{82}Sr$, $^{89}Sr$, $^{99m}Tc$, and $^{201}Tl$.

Another aspect of this disclosure is a method of obtaining a radioisotope from a bulk material, in which the bulk material includes at least the radioisotope and a fissionable material. The method includes: selecting an extraction material that removes the radioisotope from the bulk material without substantially dissolving the fissionable material; contacting the bulk material with the extraction material for a residence time, thereby creating an extraction material and radioisotope mixture; after the residence time, removing the extraction material and radioisotope mixture; and separating the radioisotope from the extraction material. In the method, the contacting operation may further include one or more of: agitating one or both of the bulk material and the extraction material during at least a portion of the residence time; changing a temperature of one or both of the bulk material and the extraction material during at least a portion of the residence time; and changing a pressure of one or both of the bulk material and the extraction material during at least a portion of the residence time.

In embodiments of the method in which the bulk material is solid, contacting the bulk material may include contacting the bulk material with a liquid extraction material for a residence time, thereby creating an extraction material and radioisotope liquid mixture. In embodiments of the method in which the bulk material is a liquid, contacting the bulk material may include contacting the bulk material with a liquid extraction material for a residence time, thereby creating an extraction material and radioisotope liquid mixture immiscible in the bulk material. In an embodiment, the bulk material may be in the form of solid grains stored in a container and the contacting operation may include inserting an amount of the extraction material into the container; and retaining the extraction material in the container for the residence time.

In the method, the extraction material may include an extractant and a solvent. The extractant may be a ligand soluble in the solvent under temperature and pressure conditions of the contacting operation. The solvent may be $sCO_2$. The ligand may form a carbon dioxide soluble chelate with the radioisotope. The ligand may be selected from a fluorinated β-diketone and a trialkyl phosphate, or a fluorinated β-diketone and a trialkylphosphine oxide or selected from dithiocarbamates, thiocarbazones, β-diketones and crown ethers. The ligand may have one or more functional groups selected from hydroxyl, carbonyl, diketones, aldehyde, haloformyl, carbonate ester, carboxylate, ester, ether, peroxy, amine, carboxamide, imide, imine, nitrate, cyanate, thiol, sulfide, sulfinyl, sulfonyl, thiocyanate, isothiocyanate, phosphate, and phosphono groups.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Figure 1:
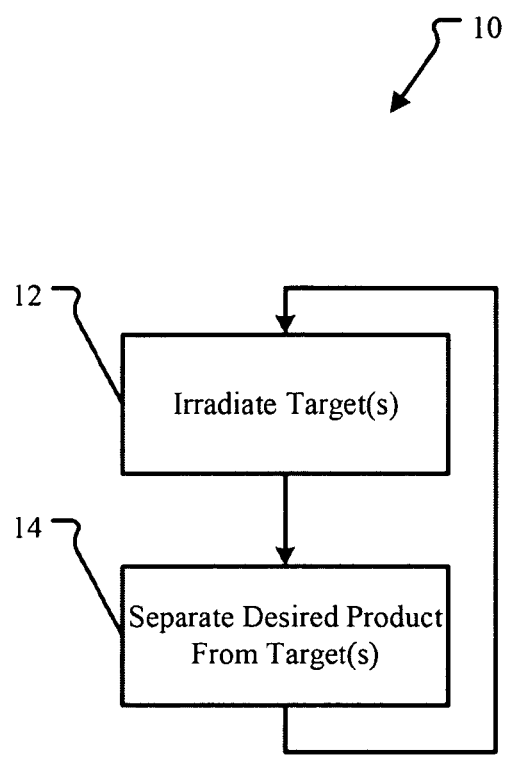
FIG. 1 illustrates an embodiment of a targetry coupled separation method that repeatedly generates radiation products, such as radioisotopes, from the same target.

FIG. 1 illustrates, at a high level, an embodiment of a targetry coupled separation method that repeatedly generates irradiation products, such as radioisotopes, from some amount of target material. In the method 10 as illustrated, some amount of target material is irradiated in an irradiation operation 12 which creates a desired irradiation product. The irradiation operation 12 is followed by a separation operation 14 in which the desired product is removed from the target material without substantially reducing the amount of post-irradiation target material. (As discussed in greater detail below, the word 'substantially' shall be used at times when referring to the amount of target material that remains in the irradiated object after a separation operation 14 to remind the reader that no separation technique is perfect and a small or de minimis amount of the target material may, in fact, be removed during the separation operation 14.) The desired product, after removal from the target material, may then be subjected to subsequent processing and use. For example, in an embodiment the target material is incorporated into a porous, solid object and the product is removed using a liquid solvent that dissolves the product but does not substantially, if at all, dissolve or remove the remaining post-irradiation target material from the object. The irradiation and separation operations 12, 14 are then repeated on the remaining target material. The method 10 may be repeated any number of times and, in an ideal system, could be repeated until all of the target material is completely consumed. Realistically, however, it is presumed that after some number of repetitions it will become more economical to dispose of the remaining target material rather than reuse it for another cycle. While many more detailed embodiments, some of which are discussed below, are possible, FIG. 1 is presented as a simplified embodiment in order to provide a convenient reference point for further discussion and to introduce the concepts and terminology that will be discussed in greater detail below.

As discussed above, in targetry coupled separations a target material is subjected to one or more irradiation operations. The "target material," as that term will be used herein, refers to a material that, upon exposure to the particular radiation used in an irradiation operation, results in the creation of one or more irradiation products. Depending on the embodiment, the radiation used may include one or more of alpha particles, beta particles, gamma rays, x-rays, neutrons. electrons, protons, and other particles capable of producing nuclear reaction products. In any particular irradiation operation, some amount of the target material will be converted into the irradiation product(s), resulting in a mass decrease of target material and a newly created mass of the irradiation product(s).

In some embodiments, targetry coupled separations may be tailored to enhance the recovery of one or more predetermined, desired products from the irradiated target material. A desired product refers to either a direct or an indirect irradiation product that the operator wants to remove from the target material after irradiation in the separation operation 14. Depending on the combination of radiation and target material used in an embodiment, undesired reaction products may also be created by the irradiation, which may not be removed from the target material in the separation operation 14. For example, if the radiation is in the form of neutrons and the target material includes uranium-235 ($^{235}$U), one of the fission products will be the molybdenum isotope, $^{99}$Mo. After irradiation, atoms of $^{99}$Mo will be dispersed within the target material and each $^{99}$Mo atom will be from one uranium atom that existed prior to irradiation. However, due to the nature of neutron irradiation, many other fission products will also exist in the target after irradiation, each also representing atoms produced from fissioned uranium atoms. In an embodiment, the $^{99}$Mo is a desired product and subsequently removed in the separation operation 14 while the other fission products are not removed and remain with the target material during subsequent irradiations.

Target material may be incorporated into a larger mass of source material. The source material may be formed into a single object or discrete mass, occasionally referred to herein simply as the "source", that can be exposed to radiation in an irradiation operation to convert at least some of the target material (either directly or indirectly, as discussed in greater detail below) into the desired product (or its parent, as will be discussed below). In addition to the target material, source material also may optionally include material that does not react to irradiation to produce the desired product. Such material may be completely unreactive to the radiation or may form something other than the desired product. Where appropriate, the term 'ancillary material' may be used to refer to any component of the source material that does not form the desired product when irradiated. Ancillary materials could include, for example, trace contaminants, materials present in the source material to provide a physical structure for the target, or unharvested products of previous irradiations of the target.

Figure 11:
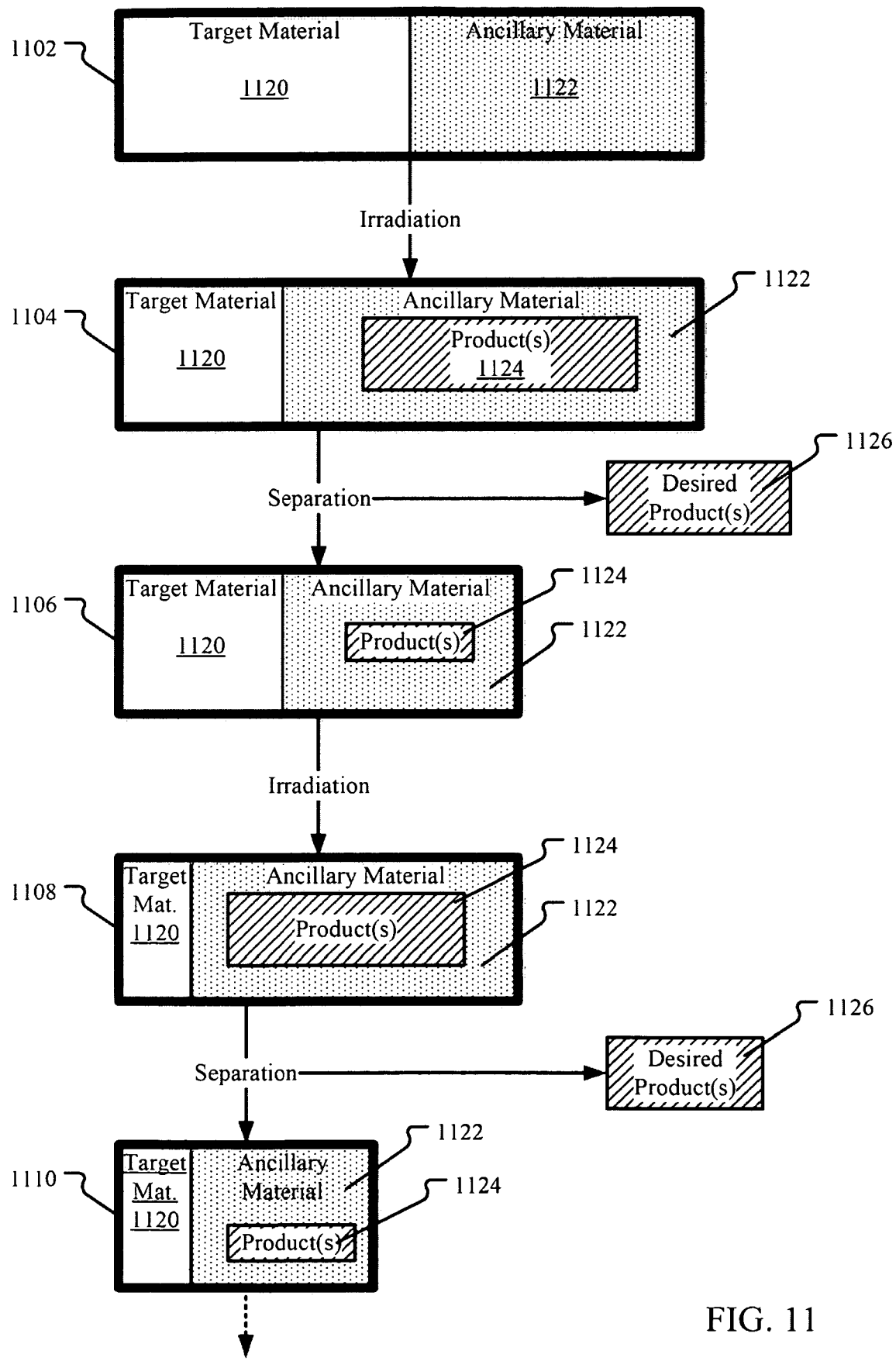
FIG. 11 illustrates the material conversion cycle showing the changes in a source over two passes of targetry coupled separation.

FIG. 11 illustrates the material conversion cycle showing the changes in a source over two passes of targetry coupled separation. The material conversion cycle 1100 starts with some amount of source material 1102 that, in the embodiment shown, includes some amount of target 1120 and another amount of ancillary material 1122. Although the target and ancillary material of the source material are shown as separate boxes, it is to be appreciated that the FIG. 11 is for illustrative purposes of the cycle of target and product, and it should be appreciated that the elements of FIG. 11 are not representative of actual amount or ratio of target and ancillary material, intermixing of target and ancillary material, and/or structure of the source. An irradiation operation (such as irradiation operation 12 of FIG. 1) changes the source material 1102 into an irradiated source material 1104 in which some amount of target material 1120 has been changed into irradiation products 1124. While exaggerated for illustration purposes, in FIG. 11 approximately half of the target material 1120 has been changed into some amount of irradiation product 1124. Because products 1124 are considered an ancillary material, FIG. 11 also illustrates a relative increase in the mass of ancillary material in the source 1104 and a commensurate decease in the amount of target material 1120.

The reader will be reminded that, especially in fission reactions, the immediate result of irradiation will be a spectrum of direct irradiation products, some which over time may subsequently decay into indirect products which may, themselves, further decay into other indirect products. Thus, the exact makeup of irradiation products 1124 may change over time as various direct and indirect products decay. However, for the purposes of this discussion, FIG. 11 does not distinguish between direct irradiation products and indirect irradiation products or attempt to track how the makeup of irradiation products changes over time.

The cycle 1100 further shows the effects of a first separation operation (such as separation operation 14 of FIG. 1) on the irradiated source material 1104. The separation results in a certain amount of desired product 1126 being removed from the irradiated source material 1104. Again, exaggerated for illustration purposes, FIG. 11 shows the post-separation source 1106 having had some of the product removed, so that the post-separation source material 1106 has relatively less ancillary material, but the amount of target remains the same as in the irradiated source material 1104. This graphically illustrates that the separation operation has no effect or substantially no effect on the mass of target material 1120 in the source.

FIG. 11 also illustrates that some irradiation products 1124 may remain as ancillary material 1122 in the source 1106 after the separation. This may be the case either because the separation is not 100% efficient, because not all of the irradiation products 1124 are desired products and the separation operation intentionally does not remove those products, or both.

FIG. 11 further illustrates a second set of irradiation and separation operations on the source material. FIG. 11 shows a second-irradiated source 1108 that again illustrates that some amount of target material 1122 of the precursor source material 1106 is converted into product 1124 by the second irradiation operation. The second separation operation then reduces the overall mass of the second-irradiated source material 1108 by removing some of the desired product 1126, but without changing the mass of the target material 1122 in the source material 1108. The resulting post-second separation source material 1110 is then ready for subsequent irradiation and separation operations as illustrated by the arrow at the bottom of the illustration.

As mentioned above, FIG. 11 is exaggerated for illustration purposes. However, it clearly shows certain aspects of targetry coupled separation. Specifically, it illustrates that target material 1122 is converted into product 1124 by the irradiation operation and some amount of product 1126 is removed, without removing substantially any target material 1122 from the source, in the separation operation. Thus, by subjecting the same source to repeated irradiation and separation operations, the target material 1122 in the source can be consumed until such time as it is completely converted into product 1124 or it is no longer economical to repeat the process.

FIG. 11 further illustrates that not all of the product 1124 may be removed by the separation operation. This may occur for different reasons. While it is preferable to remove as much of the desired product 1126 as possible with each separation, not all of the irradiation products 1124 may be desired products 1126 and/or removal of all of the desired product 1126 may not be technologically practical or possible. Thus, products 1124 from prior irradiation operations (such as undesired products) may remain in the source material by design (e.g., by appropriate selection of the extraction material to avoid or reduce removal of the undesired product). It is also possible that the separation operation is not 100% efficient at removing all the product, thus leaving some desired product in the source material.

As discussed above, target material can include any one or more isotopes or elements that, directly or indirectly, can form the desired product upon irradiation. The term 'directly or indirectly' is used here to point out to the reader that, while some desired isotopes may be the direct irradiation product of a target material, other desired products may be created by the natural decay of a direct irradiation product. For example, $^{99}$Mo is one of many direct fission products of $^{235}$U. That is, in the thermal neutron fission of a mass of $^{235}$U, some of the atoms (6.1% to be precise) of $^{235}$U will be converted directly into atoms with a mass of 99, including $^{99}$Mo. Other atoms of $^{235}$U will be converted into other products such as $^{135}$I and $^{157}$Gd. However, many direct fission products are unstable and will, after some period of time based on their half-lives, naturally decay into indirect products. Using $^{99}$Mo again as the example, $^{99}$Mo has a half-life of 65.94 hours, primarily decaying in to $^{99m}$Tc. The isotope $^{99m}$Tc, with a 6.01 hour half-life, decays into $^{99}$Tc. Thus, $^{99}$Mo is a direct product of the fission of $^{235}$U while $^{99}$Tc is an indirect product. It should be noted that $^{99}$Tc is also a direct product of fission, but with different independent fission yield than $^{99}$Mo. It should be noted that a desired product may be both a direct product from irradiation of a target and an indirect product that is created by decay of a different direct product of the same irradiation of the target. Target material can include the elemental form of a material, metals, alloys, intermetallic compounds, hydrides, oxides, hydroxide, halides, chalcogenide, nitrides, phosphides, carbides, silicides, carbonates, nitrates, sulfates, thiosulfate, sulfites, perchlorates, borides, arsenates, arsenites, phosphates, nitrite, iodate, chlorate, bromate, chlorite, chromate, cyanides, thiocyanates, amides, peroxides, organic complexes, mixed species, ternary compounds, quaternary compounds or greater, or a combination of any of these compounds.

The source material can be in a variety of structures, forms or morphologies that permit the separation of the desired product from the target without significant alteration of the physical form of the source material (other than the removal of some or all of the desired products), thus allowing previously irradiated source material to undergo a subsequent irradiation without substantial reprocessing. Morphologies, forms, and shapes can include sheets, monoliths, sol-gels, ceramics, polymers, metallic phases, particles, spheres, layers, aggregates, crystalline phases, metal-organic frameworks, fibers, precipitates, tubes, micelles, sponges, cages, powders, granules, suspensions, slurries, emulsions, porous particles, and colloids.

Furthermore, as will be described in greater detail below with reference to FIGS. 4 and 5, a source material's physical form or morphology may be selected or altered in order to improve the performance or efficiency of the separation operation 14, e.g., by tailoring the form of the target material in the source to suit the selected extraction material or process. For example, a particularly high surface area form of source material may be used to improve the contact between a solid target material and a liquid or gaseous extraction material, such as a supercritical carbon dioxide and ligand mixture. Alternatively, a form of source material may be selected to take advantage of the effect of irradiation. For instance, some uranium fuels (e.g., ceramic and metal fuels) can become porous after irradiation in a reactor, which can prepare the target for separation of the product from the target and subsequent re-irradiation without the need to dissolve or destroy most or all, if any, of the remaining source material as part of the separation.

Although, in an embodiment, the source may be a solid piece or structure including the target material, in many embodiments discussed herein the source material may be contained in a container that, at least partially, encases the source material. For example, in an embodiment the source material may be in a particulate or pelletized form and a container may be provided to hold the source material during some or all of the operations of FIG. 1. Depending on the physical form of the source material (e.g., aggregate, powder, liquid, etc.), a container may be used to provide a physical constraint and may also be used to provide contact points for ease of handling. In addition, the container may be adapted to simplify the separation operation 14. Suitable container embodiments are discussed in greater detail with reference to FIG. 4. The form of the porous source material can be manufactured or selected, such as through 3D printing, foam, molds, particulate, sintering particulate, etc. as will be discussed further below.

Returning to FIG. 1, in an embodiment of the irradiation operation 12, one or more sources are exposed to radiation that causes at least some of the target material to be converted into desired product. Radiation generators can include reactors, particle accelerators, electron accelerators, plasma focus devices, pinch devices, and/or sealed tube neutron generators. The accelerators can supply reaction particles directly or can be used to produce particles from reactions. In an embodiment, the irradiation operation 12 may include placing one or more sources containing target material in a controlled environment where the source(s) may be safely exposed to the radiation. For example, in an embodiment in which the radiation includes neutrons, exposure is achieved by placing the source material in, or passing a source through, a neutron bombardment chamber that receives neutrons from a neutron generator.

In the separation operation 14, the exposed source material is treated to remove the desired product without substantially dissolving or removing the remaining target material in the source. In an embodiment, this may include contacting an available surface of the source material with an extraction material, such as a fluid, that preferentially dissolves the desired product but for which the target material and ancillary material, if any, is either insoluble or has a substantially reduced solubility relative to the desired product. In an alternative embodiment, some other separation technique may be used that preferentially removes the desired product from the source material. The target material in a source is left in a form suitable for subsequent irradiation to generate additional desired product.

The reader will appreciate that no separation system is perfect and that some trace amount of target material may be unintentionally entrained, dissolved and/or otherwise removed with the extraction material during the separation operation 14. As mentioned above, the word 'substantially' shall be used at times when referring to the amount of target that remains in the source material after a separation operation 14 to remind the reader that some small or de minimis amount (less than 0.1% although less than 0.01% is anticipated) of the target material by mass may, in fact, be removed from the source during the separation operation 14.

Although the techniques introduced above and discussed in detail below may be implemented for a variety of desired products such as radioisotopes or other fission products, this disclosure will primarily discuss targetry coupled separation systems and methods in the context of systems and methods that repeatedly generate and remove one or more fission products from source material containing fissionable material as the target. More particularly, this disclosure will primarily discuss targetry coupled separation in the context of systems and methods that repeatedly generate and remove $^{99}$Mo as the desired product from grains of a source material that includes $^{235}$U as the target. Upon fission of the uranium, $^{99}$Mo product is one of the many isotopes produced as fission products. The $^{99}$Mo product can be separated from the uranium by the formation of a molybdenum-specific species that can be easily removed from the uranium target without the need to remove the target material from the source or alter the form of the target material to facilitate separation. An example of suitable molybdenum specie that facilitates separation from the source includes $MoO^{2-}$, which can be removed by dissolution, or $Mo(CO)_6$, which can be removed by volatilization.

The reader will understand that the technology described in the context of $^{99}$Mo could be adapted for use in generating any nuclear reaction product, such as those listed in Table 1, either directly by irradiating an appropriate target material with neutrons, or indirectly by irradiating the appropriate target material with neutrons to form a radioisotope parent of the desired product and allowing the parent to decay. More generally, the targetry coupled separation methods and systems described herein may be adapted to generate any desired product that could be obtained through irradiation of a target material using any type of radiation, not just neutron irradiation.

FIG. 2 illustrates, again at a high level, an embodiment of a targetry coupled separation system. The system illustrated is adapted for the continuous or semi-continuous production of products such as the $^{99}$Mo radioisotope from a target containing $^{235}$U.

While embodiments of the system 200 may include manual operations, the system 200 is particularly suited for automation and the entire process may be implemented as an automated system that continuously or semi-continuously generates $^{99}$Mo product until such time as the target is consumed or otherwise fouled with unwanted byproducts to the extent that further generation of $^{99}$Mo from the targets is uneconomical. For example, some fission products of 235U are neutron poisons (such as $^{135}$Xe, $^{149}$Sm and $^{151}$Sm) and, if these products are allowed to buildup in the source material over successive re-irradiations, the subsequent yield of desired product from each irradiation will be reduced. Even then, in an embodiment, old source material may be automatically stored and new source material placed into the system until all available or a desired amount of target material is consumed.

The system 200 includes: a neutron generator 202; a neutron bombardment chamber 204; a conveyance system 206 (illustrated as a conveyor-type system 206); a separation system 208, which in this embodiment includes two components: an insertion component 210 and an extraction component 212; an optional treatment system 228; a product storage system 224; and a supply or source of extraction material 226. A plurality of uranium-containing sources 214 is illustrated undergoing various operations by the separation system 200 and traveling in the direction of the conveyor-type system 206 as indicated by arrows 220 and 222.

In the embodiment shown, the neutron generator 202 can be any appropriate generator of neutrons. Examples include Pu—Be sources, $^{252}$Cf sources, sealed tube neutron generators, dense plasma focus device, pinch devices, inertial electrostatic confinement device, fission reactors, or accelerator spallation devices.

The neutron bombardment chamber 204 receives neutrons from the neutron generator 202 and exposes any sources 214 within the chamber 204 to neutron bombardment. The chamber 204 may include multiple components designed to allow the sources to enter and exit. The chamber 204 may be constructed to reduce the release of stray neutrons to the outside environment of chamber 204 itself or outside of the containment of system 200. The chamber 204 may include an irradiation zone within which the sources are exposed to neutrons. The irradiation zone may be sized to irradiate any desired number of sources at the same time. In the embodiment shown, the conveyor 206 causes sources to pass through the irradiation zone.

Because the rate of source transport into and through the irradiation zone determines, in part, the total exposure of the source to neutrons, the transport rate may be selected to achieve the desired amount of irradiation of the target based on the neutron flux of the neutron generator 202. Transportation of sources may be continuous (wherein the sources are continuously in motion), non-continuous (in which the conveyance system 206 starts and stops to achieve the desired rate), or a combination of the two (e.g., continuous movement through the bombardment chamber 204 but sources are held in the separation system 208 until a desired amount of separation has been obtained after which transportation is resumed). The rate may be constant, decreasing, intermittent or varied based on monitoring of neutron flux or any other parameter that can be used to identify the exposure of the target material to radiation. It should be appreciated that the exposure level of irradiation in the irradiation zone need not be constant for a particular source, or from one source to the next source introduced to the irradiation zone. That is, the neutron generator 202 may not have a constant neutron flux over time. In this situation, the neutron flux may be monitored and the transport rate may be varied as necessary to achieve the desired irradiation results.

When a new source enters the irradiation zone, there is little or no product or an undesired amount of product in the source material. Given time in the irradiation zone, the nuclear reaction product concentration increases in the source as some of the atoms of uranium undergo a nuclear reaction due to the uranium atoms' interaction with the neutrons. The conveyor speed, stopping points and times and/or neutron flux in the irradiation zone may be tuned so that sources are exposed for a desired irradiation time or dosage, thus generating a designed amount of fission products including $^{99}$Mo in each source. The source is then removed from the irradiation zone by further movement of the conveyor 206 and passed to the separation system 208.

The separation system 208 refers to those components that together pass extraction material through the source to remove at least some of the atoms of the $^{99}$Mo radioisotope product from the source without substantially reducing the post-irradiation uranium content of the source. The separation system 208 obtains extraction material from the extraction material supply 226, contacts the irradiated source material with the extraction material, and then removes the extraction material (along with at least of the $^{99}$Mo product) for the source material. As illustrated graphically in FIG. 11, the separation system 208 does not substantially, if at all, reduce the mass of the target material in the source, but rather exclusively or primarily removes only the desired product or products. Generally, an extraction material may be introduced to the irradiated source material (including the product material) to dissolve the $^{99}$Mo radioisotope product into the extraction material and substantially retain the full, post-irradiation mass of target material in the source material separate from the extraction material. The chemistry of the extraction material used to perform the separation may be tailored to the target material and the desired product, and, depending on the embodiment, may use aqueous solutions, organic phases, ionic liquids, supercritical fluids, fluidized beds, reactive gases, thermal treatments, or their combinations. However, in this embodiment the separation system 208 uses an extraction material that is placed in contact with the irradiated target material, now containing an amount of $^{99}$Mo product. In an embodiment, the extraction material preferentially dissolves the $^{99}$Mo product without dissolving the uranium target or, preferably, any of the ancillary material including any other byproducts such as other fission products. In an alternative embodiment, the desired product is, in fact, multiple fission products and the extraction material preferentially dissolves all of the desired products simultaneously, without substantially affecting the remaining target material in the source material. In yet another embodiment, multiple different extraction materials are used sequentially in separate contacting operations to remove the various products. In yet another embodiment, multiple different extraction materials are used in a single contacting operation to remove the various desired products.

The removed product(s) are then recovered from the extraction material (s) and processed as necessary into a usable form and the sources are returned to the conveyance system 206 for further irradiation. In the embodiment shown, the product is output into a product storage system 224. The recovery of the product(s) may be performed by the extraction system 208 so that a final, usable form of product(s) is stored by the storage system 224. In an alternative embodiment, the product and extraction material mixture may be stored in the storage system 224 for future processing by a separate recovery system (not shown), which may be local to or remote from the system 200.

Figure 2:
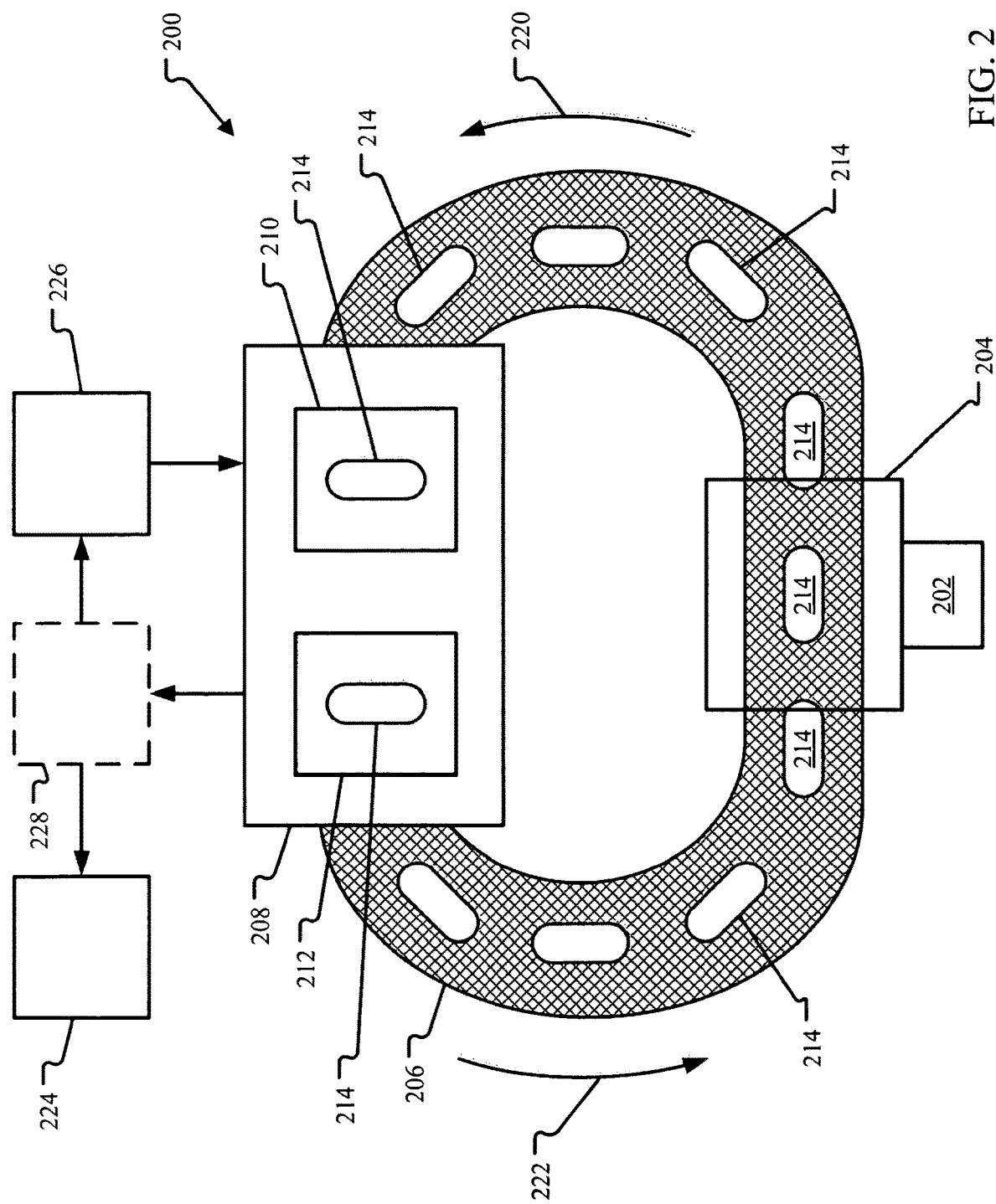
FIG. 2 illustrates an embodiment of a targetry coupled separation system for the continuous or semi-continuous production of the $^{99}$Mo radioisotope.

In the embodiment illustrated in FIG. 2, the first stage of the separation system 208 is the insertion component 210. In the embodiment shown, the targets are contained in containers 214 encasing some amount of target material and the insertion component 210 refers to that equipment that transfers the extraction material into the containers. The insertion component is adapted to transfer an extraction material into containers, thereby contacting the source material within the first container with the extraction material. In an embodiment, the extraction material is selected to dissolve, without dissolving the target material, the desired product or products. Transferring the extraction material into the containers may include one or more of injecting the extraction material under pressure into the container, applying a vacuum to a container open to a reservoir of extraction material, allowing the extraction material to flow under gravity into the container, submerging an open container into a pool of extraction material, or any other technique whereby the extraction material is transferred into the container. The insertion component 210 may include automated or manually-operated equipment that accesses the container and delivers the extraction material into the container, such as through one or more valves or other access points provided on the container. As is known in the art, there are many different ways of inserting fluids into a container and any suitable method may be used.

In an embodiment, the extraction material is maintained in the container for an appropriate residence time. During some or all of the residence time, the container may be subjected to additional actions such as heating, cooling, pressurization, depressurization, agitation, circulation of extraction material, and/or secondary irradiation as desired to improve the removal of the product from the source material. For example, in an embodiment the source material is a loose particulate or powder and the extraction material is repeatedly flowed (circulated) under pressure through the container (e.g., flowed into a valve at one end of the container and removed from a valve at the other end of the container) such that the container temporarily becomes a packed bed reactor or, if the flow rate through the container is sufficient, a fluidized bed reactor. In these embodiments, the contacting of the extraction material with the source material is performed substantially without removing target material from its container, and in some cases without removing any source material other than the desired product from the container.

After the appropriate residence time, the extraction component 212 of the separation system 208 removes the extraction material from the container and passes the extraction material including the removed product to a treatment system 228. As with the insertion component 210, any suitable technique for removing the extraction material and product mixture including those described above for inserting the extraction material into the container may be used. The extraction solution can admix or carry the product. Alternatively, the extraction solution (including the extraction method and parameters of operation) can be selected to dissolve the product.

The treatment system may separate the dissolved $^{99}$Mo product from the extraction material. The treatment system 228 and/or a post-processing system (not shown) that is considered a part of the separation system 208 for the purposes of this discussion may purify the removed product into a usable $^{99}$Mo or further decay product, which is then stored in the product storage system 224. For example, in an embodiment the $^{99}$Mo product may be incorporated into an isotope generator by the separation system 208 as a final processing step. The extraction material may be further regenerated for reuse, such as by removal of any unwanted byproducts or trace source material picked up by the extraction material. However, regeneration is optional and the separation system 208 may or may not regenerate the extraction material as part of the recovery of the $^{99}$Mo product. The extraction material may be returned to the extraction material supply 226 for reuse by the insertion component 210. Alternatively, the extraction material may be processed for waste and/or removal from the system 200. For example, in an embodiment that uses $sCO_2$ as part of the extraction material, the treatment system 228 may maintain the $sCO_2$ in the supercritical state during the separation and returned recycled $sCO_2$ to the separation system 208.

The purification of $^{99}$Mo product may include removal of a trace amount of target elements or isotopes, removal of other products from the nuclear reaction, and/or removal of separation chemical(s) used in the separation of the product from the source material. The methods for purification are based on existing techniques and can include any one or more appropriate techniques including column chromatography, gravity separation, distillation, evaporation, centrifugation, precipitation, ion exchange, sorption, filtration, and solvent extraction. These methods can be performed with an automated chemistry system.

Additionally, the extraction component 212 may also perform one or more regeneration operations to prepare the source material for further irradiation. Such regeneration operations can include washing the remaining source material with a volatile, acidic or basic solution, heating, treatment under vacuum, sparging with gas, flushing with a solution, or any other appropriate process or a combination of any of these processes. The regeneration operations can occur at the same location as the extraction operation and may use the same equipment, as shown in FIG. 2. For example, the extraction component 212 may perform the source regeneration and, in that capacity, may also be considered a source regeneration component. In an alternative embodiment (not shown), the source regeneration operations can occur at a different location and/or use separate equipment, such as an independent source regeneration component (not shown).

Some embodiments of targetry coupled separation may have advantages compared to the existing methods of isotope production. The reuse of the source containing the target is an attribute in this regard. Because targets may be composed of enriched or rare isotopes, embodiments may provide a ready route to re-irradiate the target with reduced preparation and/or regeneration expenses. Furthermore, in various embodiments separating the produced isotope product from the source does not substantially reduce the amount of target material in the source (after conversion of some amount of target material into product through irradiation) nor even require the target material be removed from the source material or even the container. As will be appreciated, target dissolution can result in waste formation, which can represent a significant expense with radioactive material. While the target material may be recovered after dissolution and reformed into a new source, losses of target through imperfect reformation and/or costs of reformation may have an impact on fabrication costs and waste formation. And that is not to mention the extra cost associated with reformation of the target material into a new source.

Embodiments of targetry coupled separation can be incorporated into existing reactors or accelerator centers, thereby utilizing current infrastructure which often are included in and/or accompany these facilities. This utilization can help to decrease potential production start-up and/or change costs for existing irradiation facilities and can help to result in a broader distribution of isotope production centers.

In addition, automated or manual embodiments of the system 200 easily may be installed into existing equipment or installations. For example, embodiments may be incorporated into existing irradiation facilities which may include any component of or combination of equipment to perform and/or support a reactor, accelerator center, target/product chemical processing equipment, etc. Embodiments can be combined with particle accelerators or reactors to produce desired isotopes. Accelerators and reactors produce different isotopes for a range of diagnostic and therapeutic medical applications as well as industrial usage. Through adjustments of the target material, its morphology, and the separation chemistry, embodiments can be tuned to produce a range of product isotopes for medical applications in the same facility or similar facilities to those existing. Embodiments can incorporate existing chemical automation tools. These automation tools can be applied to the separation of the produced radionuclide product from the target, purification of the separated radionuclide, and any preparation and/or regeneration of the source prior to re-irradiation.

The final radioisotope product of the system 200 can be integrated into existing generators. These generators can be distributed to medical facilities to provide radionuclides for medical applications. The processes used by the separation system 208 can be selected to regulate the chemistry and solution conditions of the produced isotope to meet desired conditions for generator use.

Because radioisotope products are time-sensitive due in part to half-life limitations of the produced species, producing product near its preparation or ultimate use location can increase their availability for medical or other applications. Additionally and/or alternatively, the ability to automate separations and isotope production can increase production rates and help to decrease potential worker dose. The high activity of targets and/or waste may result in radiation doses to workers involved in their handling. Thus, embodiments of the system 200 and method 10 can couple shorter irradiation time with automation for separation and/or reformation and reduce waste processing with target re-use, thereby helping to decrease the potential worker dose due to material handling.

In the embodiment illustrated in FIG. 2, the conveyor 206 is the conveyance system that physically moves the sources from the neutron bombardment chamber to a different location for interaction with one or both of the insertion component 210 or the extraction component 212. Conveyance system 206 may be open to the environment of other components of the system 200 or alternatively enclosed and possibly shielded to reduce radiation emissions around conveyance system 206. For example, as illustrated in FIG. 2 a portion of the conveyance system 206 such as a conveyor belt may physically move through some or all of the other components and systems. Alternatively, the conveyance system 206 may simply transfer containers 214 between the various components and systems, each of which is provided with its own container handling mechanisms for receiving the containers from, and returning them to, the conveyance systems. In an alternative embodiment, other conveyance systems than conveyors may be used such as robotics, or any other suitable container handling or transfer system including without limitation belts, chutes, diverter gates, bucket elevators, pneumatic conveyances, screw conveyors, etc.

The conveyor 206 may be operated in a semi-continuous fashion (e.g., periodically pausing while containers are being acted on by a system or component) or a continuous fashion. In an alternative embodiment, the system 200 may produce the product through a batch irradiation followed by a batch separation, for example, irradiation of multiple sources and/or containers as a batch. The irradiated containers may be processed for product extraction either serially or in one or more batches or sets of containers. Although FIG. 2 shows a substantially continuous irradiation followed by a batch separation of the individual containers, any combination of batch or substantially continuous irradiation and batch or substantially continuous separation may be used as appropriate.

Many different configurations of the targetry coupled separation system are possible and all are considered within the scope of this disclosure. For example, in an embodiment, the conveyor 206 may eliminated in favor of a manual transfer operation. In this embodiment, operators manually or by remote control move the sources between the various components of the system 200. In yet another embodiment, the various components of the system 200 are designed so that the source is not moved, but rather the different components interact with a stationary source at different times during the process. In yet another embodiment, one or more sources are fixed inside a mobile neutron bombardment chamber 204 and the chamber is moved between a neutron generator and a separation system 208.

Figure 3:
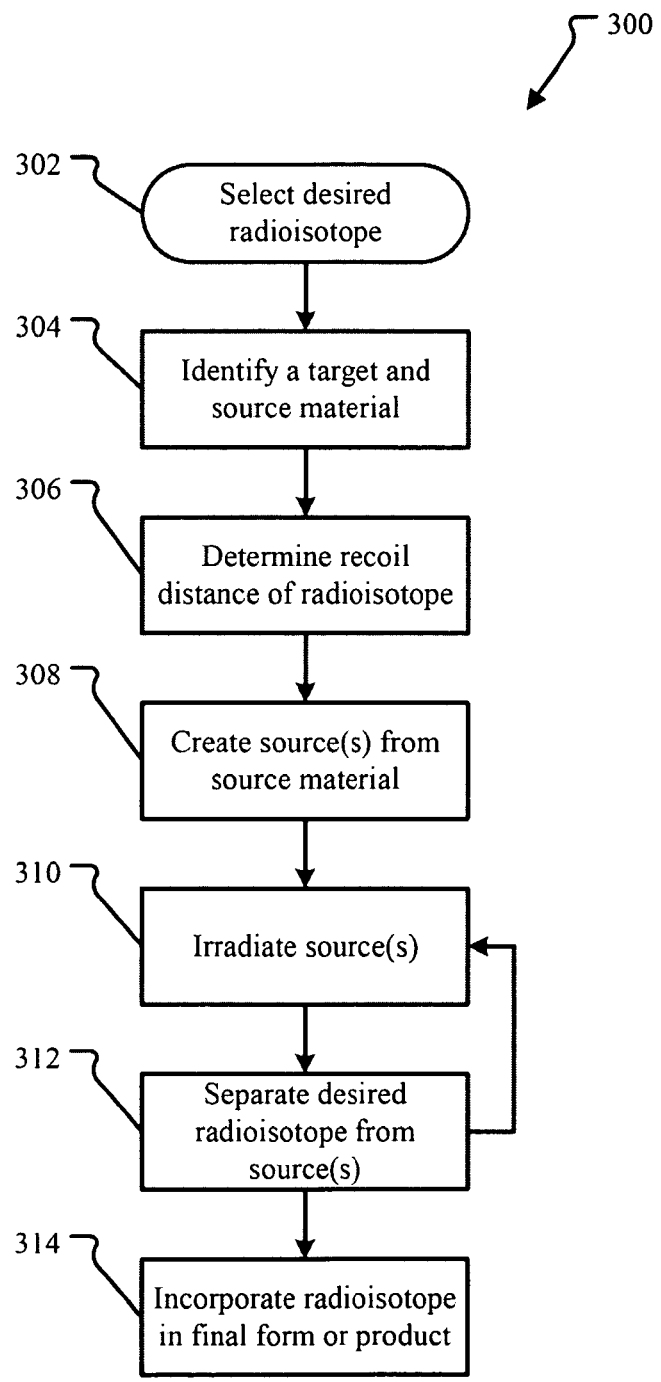
FIG. 3 illustrates an embodiment of a method for selectively generating a desired radioisotope using targetry coupled separation.

FIG. 3 illustrates an embodiment of a method for selectively generating a desired radioisotope using targetry coupled separation. The method 300 begins with the selection of the radioisotope to be created. This is illustrated by a selection operation 302. In the selection operation 302 any radioisotope may be selected, for example from Table 1 above, such as $^{99}$Mo, $^{238}$U, $^{131}$I, $^{51}$Cr, $^{227}$Ra, $^{223}$Ra, $^{227}$Ac, etc. that the operator ultimately wants to obtain. In an embodiment, more than one radioisotope may be selected.

As already noted, some desirable radioisotopes may not be direct products of an irradiation operation. In those situations, the selection operation 302 may be equally considered a selection of the decay chain or a selection of any of the radioisotopes in the decay chain. For example, to obtain $^{223}$Ra one may wish to create $^{223}$Ra generator out of $^{227}$Ac, as is known in the art. However, for the purpose of this disclosure, the term 'selected radioisotope' refers to the radioisotope that is the direct product of the irradiation of the target in the irradiation operation, and the selected radioisotope can be processed (including providing a holding time for anticipated decay) as necessary to ultimately generate the desired product.

For example, if one wished to use targetry coupled separation to ultimately create $^{223}$Ra for medical use, the selected radioisotope or direct product would be $^{227}$Ac, e.g., for subsequent incorporation into a $^{223}$Ra generator, the selected radioisotope would be would be $^{227}$Ac. Likewise, if one wished to use targetry coupled separation to generate $^{99}$Mo for subsequent incorporation into a $^{99m}$Tc generator, the selected radioisotope would be $^{99}$Mo (because it is a direct product). However, in this instance, there are also many direct products with atomic number 99 that are parents of $^{99}$Mo, by one decay chain or another, and that relatively quickly decay into $^{99}$Mo. These direct product parents include: $^{99}$Nb which decays into $^{99}$Mo and has a half-life of 15 seconds; $^{99}$Yr which decays into $^{99}$Nb and has a half-life of 1.47; and $^{99}$Zr which has a half-life of 2.2 seconds and decays into $^{99}$Y, to mention just a few in one particular decay chain. Thus, to use targetry coupled separation to generate $^{99}$Mo for a $^{99m}$Tc generator, in an embodiment the selected radioisotopes may include some or all those direct products with atomic number 99 that decay into the desired product of $^{99}$Mo.

After the radioisotope or isotopes are selected, a target material is identified from which the selected radioisotope(s) can be created through irradiation. This is referred to as the target identification operation 304. The target identification operation may further include identifying the overall source material (target and the ancillary material) including the physical properties of the source. In this manner, the target material identification operation may be referred to as the source material identification operation. For example, if $^{99}$Mo is a desired product and $^{99}$Mo and its atomic number 99 direct product parents are the selected radioisotopes, then one suitable target material may be created from $^{235}$U, such as an oxide of 235U or pure $^{235}$U metal, from which $^{99}$Mo can be obtained directly and indirectly through neutron bombardment. Many radioisotopes may be obtained from different compounds, e.g., from $^{235}$U or $^{239}$Pu and a combination of compounds may be selected as the target material.

The identified target material may include any fissionable material, or combination of fissionable materials, or other isotopes suitable for production of desired isotopes by nuclear reactions, and may be selected based on the type of radiation generator, bombardment chamber, spectrum of the reactor (thermal or fast), and other equipment available. For example, the target may incorporate any known material which can be fissioned with a neutron to create the direct, selected radioisotope product and/or absorb a neutron to create the selected radioisotope product. The target material may include, but is not limited to, a uranium-based material, a plutonium-based material, or a thorium-based material. For instance, a target material may contain $^{235}$U. In another instance, the target material may contain $^{239}$Pu. Further, it should be recognized that the target material need not be fissile directly upon fabrication, but rather could be or include a fertile material that could be converted into a fissile material through neutron absorption. For example, the target may include any known nuclear fertile material which can be bred up through neutron absorption to the selected product and/or bred up and then fissioned to create the selected radioisotopic product. Fissionable material includes any nuclide capable of undergoing fission when exposed to low-energy thermal neutrons or high-energy neutrons. Furthermore, for the purposes of this disclosure, fissionable material includes any fissile material, any fertile material or combination of fissile and fertile materials.

The identified target material may not be fertile or fissile. For example, $^{232}$Th may be used as a target material, which may be exposed to neutrons to yield the isotopes $^{225}$Ac or $^{227}$Ac. The isotope $^{226}$Ra is another example, which when exposed to protons may also generate $^{225}$Ac. Yet another example is using $^{153}$Eu as a target material, which when exposed to fast neutron (i.e., kinetic energy above 1 keV) radiation yields $^{153}$Sm. A further example includes using $^{14}$NH$_3$ as a target material, which when exposed to gamma rays may undergo a photonuclear reaction to generate $^{13}$NH$_3$.

The target material may include one or more metallic target materials, such as, but not limited to, a substantially pure metal target material, a metal alloy target material, or an intermetallic target material. For example, a pure metal target material may include, but is not limited to, $^{233}$U, $^{235}$U, $^{239}$Pu, and/or $^{232}$Th. In another example, a metal alloy target material may include, but is not limited to, uranium-zirconium, uranium-plutonium-zirconium, uranium-zirconium-hydride, thorium-aluminum, or uranium-aluminum. By way of a further example, an intermetallic target material may include, but is not limited to, UFe$_2$ or UNi$_2$. It should be recognized that the above list of suitable metallic target materials for inclusion in a target is not exhaustive and should not be interpreted as a limitation but rather merely as examples.

In another embodiment, the target material of a source may include one or more ceramic target materials, such as, but not limited to, an oxide target material, a nitride target material, or a carbide target material. For example, an oxide-based nuclear material may include, but is not limited to, uranium dioxide (UO$_2$), plutonium dioxide (PuO$_2$), or thorium dioxide (ThO$_2$). Moreover, an oxide-based target material may include a mixed oxide target material, such as, but not limited to, a mixture of PuO$_2$ and depleted or natural UO$_2$. In another example, a nitride-based target material may include, but is not limited to, uranium-nitride or plutonium-nitride. By way of a further example, a carbide-based target material may include, but is not limited to, uranium carbide. It should be recognized that the above list of suitable ceramic target material materials for inclusion in the target material should not be interpreted as a limitation but rather merely as an illustration.

In an embodiment, the target material identification operation 304 includes the determination of the complete compound or combination of compounds for the source material. It should be recognized that, in addition to the fissionable materials described above, the source material may also include ancillary material, which in some cases may include portions of non-fissionable material, such as, but not limited to, radiation-inert material, neutron moderating material or neutron reflective material. Such non-fissionable material may be provided to add strength, form, structure, or other properties to the target that could not be easily achieved using fissionable material alone.

It should also be noted that, in an alternative embodiment of the targetry coupled separation method (not shown), the target identification operation 304 may precede the radioisotope selection. This embodiment may occur in situations where the target material is provided and not substitutable. In this embodiment, the owner of the target material may wish to use targetry coupled separation on the provided target material in order to extract some valuable radioisotopes from the target material in lieu of or prior to simply disposing of the target material.

For any given solid selected target material, a recoil distance of the selected radioisotope(s) may be determined in a recoil distance determination operation 306. When a nuclear reaction occurs that coverts an atom of fissile material into a radioisotope atom, kinetic energy is imparted to the radioisotope atom. The amount of kinetic energy imparted varies based on the initial kinetic energy of the neutron, the atomic mass of the fissile atom, and the atomic mass of the direct product radioisotope, among other things. This kinetic energy causes the selected radioisotope(s) to recoil, i.e., move relative to the initial position of the fissile atom undergoing the nuclear reaction in the source material. The term recoil distance refers to the average distance or range of distances which a specific radioisotope is expected to move based on the imparted kinetic energy. Because many nuclear reactions have been well characterized, the kinetic energy and/or recoil distance can often be calculated or has been determined empirically for many given combinations of nuclear chemistry and neutron generator. For example, the recoil distance of fission products in uranium dioxide is generally described in S. G. Prussin et al., "Release of fission products (Xe, I, Te, Cs, Mo, and Tc) from polycrystalline $UO_2$," *Journal of Nuclear Materials*, Vol. 154, Issue 1 pp. 25-37 (1988), the recoil of fission products in thorium metal is generally described in C. H. Fox Jr. et al., "The diffusion of fission products in thorium metal," *Journal of Nuclear Materials*, Vol. 62, Issue 1 pp. 17-25 (1976) and the migration of gaseous and solid fission products in a uranium-plutonium mixed oxide fuel is generally described in L. C. Michels et al., "In-pile migration of fission product inclusions in mixed-oxide fuels," *Journal of Applied Physics*, Vol. 44, Issue 3 pp. 1003-1008 (1973). Such references allow one of skill in the art to estimate the recoil of selected radioisotopes for a particular system.

The recoil distance determination operation 306 refers to calculating, estimating or otherwise identifying the expected recoil distance for the selected radioisotope within the selected target material. In an embodiment, the recoil distance determination operation 306 takes into account the density of the target material, the particulars of the neutron generator and other aspects of the system design. The recoil distance may be determined empirically from prior experiments or may be estimated using known characteristics of the materials and atoms involved, such as the atom number of the direct irradiation products. The range of any particle in material can be found with the stopping power, which is the relationship between a particle's kinetic energy and the range in material. For the production of radioisotope products, the energy can be due to the recoil from the decay route, as in fission or alpha decay, or the nuclear reaction, as in fast neutron or accelerated particle bombardment. The product isotope's energy will need to be determined based on its production route. A number of routes are known and data are available to assess the distance an energetic particle can travel through material. The Bethe-Bloch formula provides the energy loss of particles traveling though material in units of energy distance squared per unit mass, an example is MeV $cm^2$ $g^{-1}$. Stopping power and range tables are available from numerous references, e.g., from the International Atomic energy Agency and the National Institute of Standards and Technology, that can provide data to assess the recoil range, including continuous-slowing-down approximation, of produced isotopes. The units for ranges and stopping power can be the same as the Bethe-Bloch formula, or as a range in mass per area, such as g $cm^2$. Programs are also available that provide ranges and stopping powers for ions in materials (see, e.g., the SRIM software package available from Dr. James F. Ziegler). Once ranges or stopping powers are obtained, the distance a particle will travel in material can be estimated using the material density and the particle energy. If the data for a specific product or nuclide cannot be found, relationships between energy loss, velocity, and charge can be used.

The recoil distance is then used in a source manufacture operation 308 in order to design and create a source that, for the particular combination of selected target and source material, preferentially results in radioisotopes distributed within the source material after the reaction so that the radioisotopes are more readily available to the extraction material than would occur in a bulk solid, or non-porous source. Specifically, the solid portions, i.e., the pore walls, of a porous source material (such as foams, particles, and the like) may be sized to be substantially similar to the recoil distance of the selected radioisotope product. In this manner, the anticipated recoil of the selected product can be used to improve placement of the product near an available surface of the source material to improve extraction of the product from the source (e.g., dissolution and extraction of the product without dissolution of the target). The term 'available surface' is used to describe a location, on or near a surface of a solid source material, from which the extraction material can obtain the product. In cases such as a source material formed as a foam or other porous structure (e.g., manufactured pores), the structure of the source material forming the pores (e.g., the walls of the pores) may be selected and formed to have a thickness substantially similar to the recoil distance of the selected radioactive product. In cases such as particles, one-half of the particle size or the particle radius may be sized to be substantially similar to the recoil distance of the selected radioisotope. In another example, in an embodiment in which the extraction material is a liquid, the available surface of the source material is a surface that the liquid can access during the separation process without having to alter the physical properties of the target material. In some cases, the available surface may include locations that are not physically on a surface of the source material, but that are close enough to an accessible surface that the extraction material can still obtain the product atoms, such as through diffusion. Thus, targetry coupled separation exploits the recoil from the nuclear reaction used to produce the selected radioisotope to simultaneously make that radioisotope more easily recoverable in the separation operation.

In the source manufacture operation 308, the selected source material is formed into a source based on the recoil distance of the selected radioisotope. For example, in an embodiment the source material in formed into solid grains and the size of the grains is selected based on the recoil distance of the desired radioisotope. As a further example, if $^{99}$Mo is the selected radioisotope product (with an anticipated decay to $^{99m}$Tc, the desired product) and the selected target is an oxide of $^{235}$U, then in an embodiment a source material including grains having an average particle size (such as diameter or average width) of equal to or less than two times (2×) the recoil distance of the $^{99}$Mo product but greater than 10% of the recoil distance. In another embodiment, the average particle size may be selected to be within ±50% of the recoil distance (0.5-1.5×) of the $^{99}$Mo product and, in yet another embodiment, the average particle size may be selected to be ±50% of half (0.25-0.75×) the recoil distance of the $^{99}$Mo product. In another embodiment, the average particle size may be selected to be within ±50% of the twice the recoil distance (1-3× the recoil distance of the selected radioisotope). In situations where there are more than one selected radioisotope each with a different recoil distance, the recoil distance used for sizing may be selected from that of any one or the selected radioisotopes, an average of the recoil distances of some or all of the selected radioisotopes, or a weighted average based on the expected yield of the selected radioisotopes.

In an alternative embodiment, grain size of less than 20 micrometers may be used. In yet another embodiment, a grain size between about 0.1 to 10 micrometers may be used. Generally fission products have a recoil range of around 10 microns in $UO_2$.

For solid source embodiments, the processing of the grains of source material into a solid, porous solid may include any suitable processing technique including one or more of sintering, milling, sieving, 3D printing, crystallizing, precipitating, or heating the grains of target material. The solid source may take any high surface area form such as an open-cell foam, an open lattice, an open framework, a ceramic, a cloth, a thin film, a monolayer, a sponge, a nanocage, or a nanocrystal.

The nuclear reactions can also induce chemical changes that can be used for selective separation. Such induced chemical changes are called hot atom chemistry and described in the literature. In hot atom chemistry, the nuclear reaction changes the chemical form of the reaction product compared to that of the target. The difference in chemistry between the target and reaction product, and the morphology of target, permit a separation of the reaction product without target destruction. As an example, a target could be a compound in a high oxidation state. Upon reaction with a neutron, the new isotope undergoes reduction and has different chemical properties than the target even though it is the same element as the target. The target morphology permits a separation of the product with the lower oxidation state without the need to dissolve the target. Additional detail regarding embodiments of targets, source materials, and the source manufacture operation 308 are discussed with reference to FIG. 5, below.

The source manufacture operation 308 may include further selecting, creating and/or providing a suitable container for the source material. For example, in an embodiment in which neutrons are the form of radiation used, the container may be made of a neutronically-translucent material, so that neutrons are capable of passing through the container. A container may be in any suitable shape and form and may be provided with one or more valves for allowing the easy introduction and/or removal of the extraction material.

In the embodiment shown in FIG. 3, after the source or sources have been created, the sources are exposed to neutrons for some irradiation period in an irradiation operation 310. This operation 310 may include transporting the source(s) to the irradiation facility/equipment for safe irradiation, for example by conveyor belt as described above. In the irradiation operation 310, source material is exposed to neutrons, thereby causing at least some atoms of the source material to undergo nuclear fission or neutron capture to create atoms of the selected radioisotope. This results in an irradiated source material that contains some amount of the selected radioisotope product within a reduced amount of unreacted target as discussed with reference to FIG. 11. In addition, because of the recoil from the fission reaction, at least some of the newly created atoms of the selected radioisotope move the recoil distance relative to the remaining, unreacted target within the source material. As described above, the recoil of the selected radioisotope product may make that radioisotope more available to the extraction material such as by making the radioisotope product closer to an available surface of the source material, which may then improve extraction by the extraction material.

After the irradiation period, a separation operation 312 is performed, extracting atoms of the desired product or products from the source material. As mentioned above, the desired product may be the selected radioisotope, a decay daughter of the selected radioisotope, or, as is the case with $^{99}$Mo, both. This operation 312 may include transporting the source(s) to a separation facility/equipment, for example by conveyor system as described above. The operation 312 may also include introducing a storage or holding period before the separation to allow time for decay to occur. In an embodiment of the separation operation 312, the target in the source material is exposed to an extraction material such as a solvent that preferentially extracts the desired product from the source without substantially dissolving the remaining target in the source material. Embodiments of separation techniques are further discussed elsewhere in this disclosure, particularly with reference to FIGS. 1 and 7. In an embodiment, the remaining, unreacted source material is not chemically reactive with or affected by the extraction solvent. Specifically, it is not necessary to dissolve the target to recover some of desired product from the target. Thus, the target is not substantially dissolved nor is its physical phase altered by the separation operation 312. For example, in one embodiment the target is in a solid phase and remains in the solid phase throughout the irradiation and separation operations.

In embodiments in which sources include a container, the source material may or may not be removed from the container during the separation operation 312. For example, in an embodiment, a source may comprise loose or packed individual loose grains of source material in a neutronically-translucent container, in which the grain size is based on a recoil distance of the selected radioisotope to be produced as discussed above. The source material grains may be repeatedly subjected to successive irradiation and extraction operations without removing the grains from the container. In this embodiment, a gaseous or liquid solvent may be flowed through the container or the container may be filled or partially filled with solvent and left in the container for some contact period of time after which the extraction material, now containing at least some of the selected radioisotope, is removed.

In an alternate embodiment, rather than individual grains meeting some size requirement based on the recoil distance, the sources may include a solid mass of target. As discussed in greater detail below, such a solid target may be made by sintering or otherwise bonding individual grains (which may be tailored similar to that described above with respect to recoil distance) together to form a larger source material mass. Such a larger mass may be porous to facilitate penetration of a solvent into the porous mass, thereby facilitating contact with the generated radioisotope.

The separation operation 312 may further include regeneration of the target to prepare it for subsequent irradiation. This may involve one or more washing operations to remove extraction material from the source material prior to subsequent irradiation.

After a separation operation 312, the same source may be re-irradiated to create more of the selected radioisotope allowing the irradiation and separation operations 310, 312 to be repeated multiple times without substantially dissolving, changing the phase of, or removing any of the remaining mass of target material in the source. As discussed above, this allows the fissionable material to be more efficiently converted into the desired product that would be possible with a single neutron exposure.

The method 300 further includes a final processing operation 314 that converts the extracted radioisotope product into a final product or final form suitable for commercial use. The final processing operation 314 includes separating the radioisotope from the extraction material and may also include additional processes to purify the radioisotope. The radioisotope may then be further processed into a final form suitable for transport and use as an industrial reagent or feedstock.

In an embodiment, the final processing operation 314 includes incorporating the radioisotope into a daughter isotope generator. For example, the method 300 may be used to manufacture $^{223}$Ra generators made from the radioisotope $^{227}$Ac, $^{68}$Ga generators made using $^{68}$Ge, $^{99m}$Tc generators made from $^{99}$Mo, and $^{82}$Rb generators made from $^{82}$Sr, to name but a few. Daughter isotope generators and methods for manufacturing daughter isotope generators from a parent radioisotope are known in the art. Any suitable method may be used.

For example, $^{99m}$Tc generators may be created from $^{99}$Mo in the form of the molybdate, $MoO_4^{2-}$. To create the generator, the $^9$Mo molybdate is adsorbed onto acid alumina ($Al_2O_3$) substrate and placed in a shielded column. When the $^{99}$Mo atoms decay, they form $^{99m}$Tc pertechnetate, $TcO_4^-$, which, because of its single charge, is less tightly bound to the alumina. Pouring normal saline solution through the column of immobilized $^{99}$Mo elutes the soluble $^{99m}$Tc, resulting in a saline solution containing the $^{99m}$Tc pertechnetate, with sodium as the counterbalancing cation.

In an embodiment, the final processing operation 314 may be an automated or semi-automated process. As described with reference to FIG. 2, in an embodiment a targetry coupled separation system incorporates equipment necessary to separate the radioisotope from the extraction fluid, modify the radioisotope into the generator material necessary for use in a daughter generator (such as $^{99}$Mo bound to a substrate suitable for column chromatography), and package the material into the generator body in an automated or semi-automated process.

Container

Figure 4:
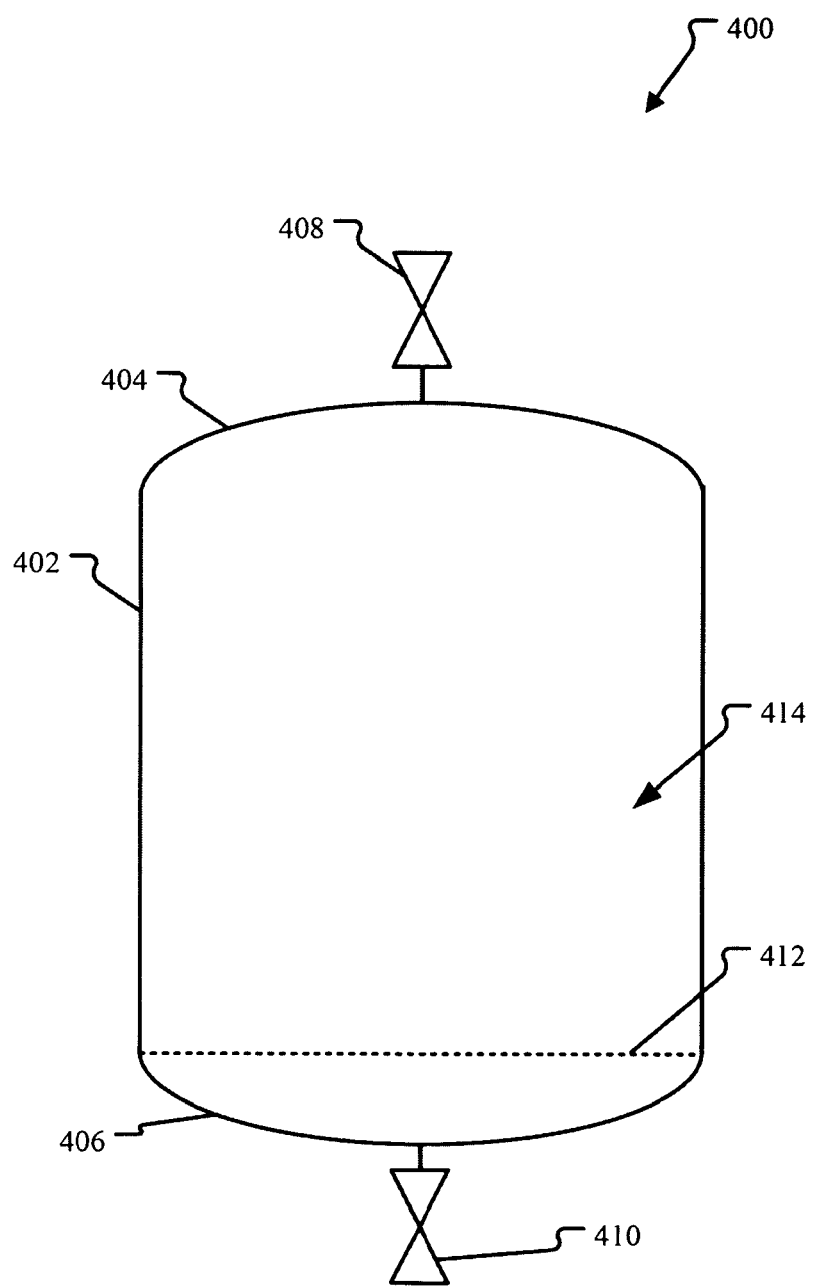
FIG. 4 illustrates an embodiment of a container suitable for holding target material in a targetry coupled separation.

FIG. 4 illustrates an example of a suitable container. The container 400 includes a cylindrical body 402 defining an internal cavity, a top or lid portion 404 that, when engaged, seals the cavity, and a bottom 406 which defines an interior chamber 414 that contains the source material. One or both of the top 404 and the bottom 406 may be removably attached to the body 402 to allow the source material to be inserted into or removed from the container 400. This may be achieved by any known system, such as corresponding threaded portions, for example on the lid portion and in the cylindrical body (not shown). Alternatively, the container 400 may be of a unitary construction and the source material charged through a sealable access port (not shown) or during the construction of the container. In the embodiment shown, two fluid flow valves 408, 410 are provided, first valve 408 (which may be an output value in some examples) in the top 404 and a second valve 410 (which may be an input valve in some examples) in the bottom 406. In yet another embodiment, the container may not be completely sealed when the lid is engaged, for example, to allow gas to escape or to allow the container to be immersed in the extraction material rather than having extraction material injected into the container through a valve or access port. Although valves 408, 410 are shown at the top and bottom of the container 400 respectively, one of skill in the art will recognize that the valves 408, 410 can be located in any appropriate location and/or orientation and do not necessarily have to be placed no opposing sides of the container. Alternatively, one valve 408 or additional valves (not shown) may be used for any of input, output, redundancy, and/or safety measures of the extraction material and/or container.

A container may be of any shape, both externally and internally in the source material chamber. Any number, type, and configuration of access ports, valves, shackles, connectors, contact points, or other ancillary components may be used as desired. For example, in the embodiment shown a diffuser 412 is provided so that the container may be easily used as a fluidized bed or packed bed reactor. In the embodiment, the diffuser is in the form of a perforated plate with perforations sized such that the source material (such as the particulate matter) is prevented or reduced from passing through it. Solvent introduced from the bottom valve 410, however, passes easily through the diffuser 412 allowing contact with the source material. This is but one example of ancillary components that could be provided on the container. For example, many different fluidized bed reactor designs could be incorporated into a container having additional ancillary components such as additional diffusers, manifolds, baffles for distributing solvent flow evenly, non-cylindrical internal shape of the source material chamber/cavity 414, baffles for directing flow, etc.

In an embodiment in which neutrons are the radiation used in the targetry coupled separation, the container may be neutronically-translucent as discussed above. Examples of suitable neutronically-translucent container materials include aluminum, zirconium, and molybdenum and alloys thereof as well as stainless steel alloys. Some or all of a container may be made from one or more of these neutronically-translucent materials.

Containers may be made with an opening to facilitate the insertion and removal of the physical form of source material to be used. For example, when one or more large masses of source material are used as discussed above, a container may be provided with a relatively large opening that allow for the insertion and removal of the masses. This would allow containers to be reused after the source material is spent. Alternatively, a container may be constructed around the source material with the intention that the source material be disposed of with the container and no provision is made for removing the source material from the container once the target is sufficiently spent which may reduce waste and/or waste processing.

Source Manufacture, Recoil Movement, Surface Treatment Improvement

Figure 5:
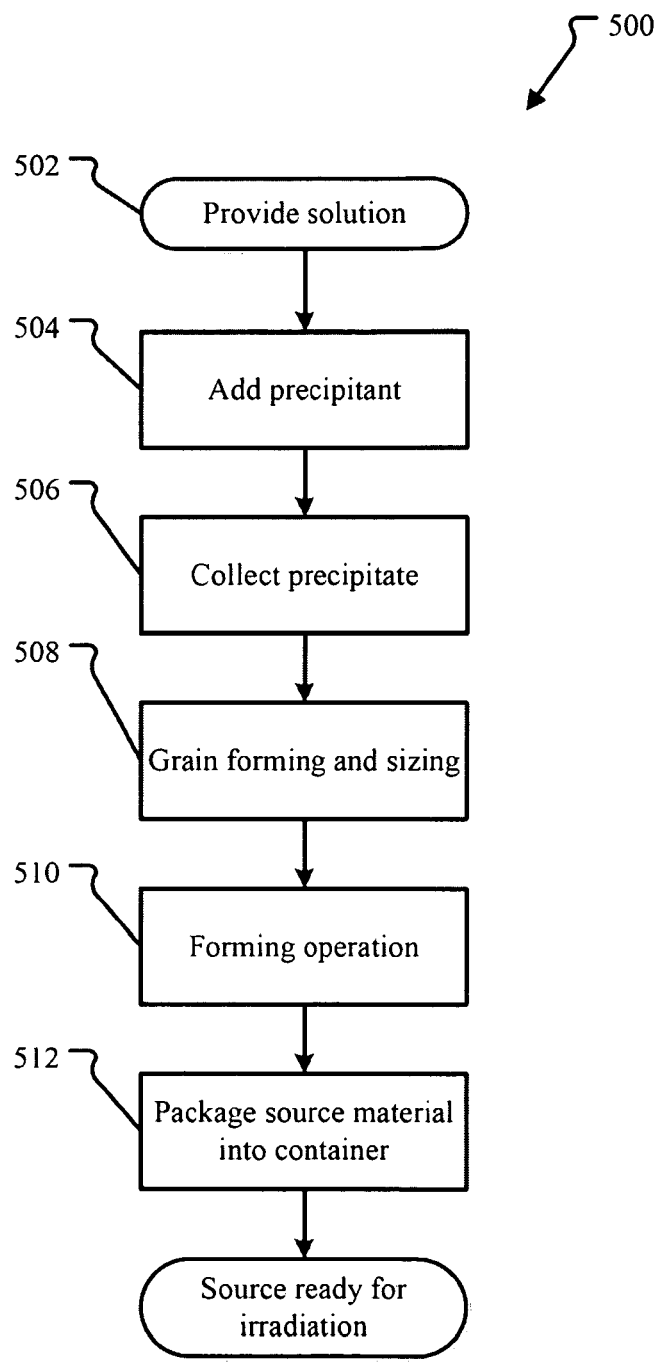
FIG. 5 illustrates an embodiment of a method of manufacturing a radioisotope-generating target in greater detail.

FIG. 5 illustrates an embodiment of a method of manufacturing a radioisotope-generating source in greater detail. As such, the method 500 represents an embodiment of the source manufacture operation 308 discussed above with reference to FIG. 3. In the embodiment shown in FIG. 5, the target material includes an oxide of a fissile or fertile material, such as thorium, uranium, or plutonium oxide. In various embodiments, targets in targetry coupled separation may include oxides which may be manufactured using any appropriate method, although many possible examples are provided below. Uranium oxides and plutonium oxides with suitable target properties have been prepared and characterized. Actinide salts may be dissolved in solution and precipitated to form solids.

For embodiments using solid sources, any morphology may be used, although higher surface area morphologies will have a better recovery of product. Suitable high surface area morphologies include porous sources of: loose or sintered particles or powders; open-cell foams; 3D printed, milled, or crystallized open lattices or open frameworks; cloths; thin films and monolayers; sponges; ceramics; nanocages; and nanocrystals. Preferably, a solid source will have a surface area greater than 10 m$^2$/g as measured by Brunauer, Emmett and Teller (BET) analysis.

For embodiments that use a liquid source, the target material may be solid, such as solid particles, suspended in a liquid, such as in a colloid suspension.

In the embodiment shown in FIG. 5, the method 500 begins with a dissolved salt of a fissionable material in a solution as a starting material, in providing operation 502. In an embodiment, the starting material may be created by dissolving and mixing chloride or nitrate salts of the appropriate fissionable material in purified water. In embodiments, the provided dissolved salt of the fissionable material may be in a solution such as an acidic solution, a basic solution, an aqueous solution, and an alcohol solution Next, a precipitant, such as sodium hydroxide, ammonium hydroxide, and/or oxalic acid, is mixed into the solution in a precipitant addition operation 504. The solution is maintained at the proper conditions for the precipitation to occur and the precipitate, an oxide of the fissionable material, is collected in a collection operation 506. Variations in the precipitation can include addition of ammonium hydroxide, peroxide, carbonate, or oxalate. Precipitation has been used to produce thorium, uranium, and plutonium containing oxides and is appropriate for other metal oxide formation. Any suitable method for precipitating a fissionable material oxide, now know or later developed, may be used.

The precipitated oxide is then formed into grains in a grain forming operation 508. This may include milling, calcining, or sintering the precipitated oxide to form powders and/or pellets and/or any other suitable form of the target. For example, in an embodiment of the grain forming operation 508, the precipitate may be washed with acetone and purified water after collection, milled, and dried at 90° C. The dried precipitate can be milled again and redried. It can be again milled and/or then calcined up to 750° C. for 1 hour. The calcined powder can be milled and additionally or alternatively then cold pressed into pellets (of any appropriate size as determined based desired properties of the source material such as the recoil distance of the selected radioisotope) for an appropriate time (which in some cases may be approximately 2 minutes) before being sintered. In an embodiment, sintering may be under a mixture of argon and 4% hydrogen for four hours at 1500° C.

In an embodiment, the grain forming operation 508 may include a sizing operation to ensure either a particle size distribution of the grains and/or that the grains have a particle size less than some threshold size, such as a recoil distance. Sizing of grains to obtain a desired result is known in the art and any suitable method of sizing grains may be used, such as mechanical screening, filtration, and classification, electrical methods such as electrophoresis and electrostatic precipitation, and flotation. For example, suitable equipment for grain sizing, depending on the embodiment, may include sieves; gas or liquid elutriation columns; stationary screens; grizzlies; gyrating screens; vibrating screens; centrifugal sifters; cake filters; clarifying filters; classifiers; and crossflow filters. In some embodiments, after the precipitates are formed and sized, calcination of the product yields compounds suitable for sintering. Sintering time, temperature, atmosphere, and oxide preparation can be varied to produce suitable target properties as is known in the art.

In embodiments, in addition to the sizes enumerated above with reference to FIG. 3, grains of target may be sized to have a maximum grain size of equal to or less than 10,000 nm (10 micrometers), or, alternatively, less than 1,000 nm, less than 100 nm, less than 50 nm, less than 10 nm, less than 5 nm or less than 2 nm. Furthermore, grains having a grain size ranging between 1 nm and 10 mm are anticipated to be particularly useful based upon recoil from nuclear reactions, fission, alpha decay, or beta decay.

In an embodiment, the method 500 may be considered to include some of the operations of the method for selectively generating a desired product using targetry coupled separation illustrated in FIG. 3. For example, in an embodiment of the source manufacture method 500, the selected radioisotope operation 302, target identification operation 304 and the recoil distance determination operation 306 described with reference to FIG. 3 may be included in the method 500.

In the embodiment shown, the method 500 includes a source formation operation 510 in which the grains are formed into a source material. This operation 510 is optional and not necessary in embodiments in which loose grains are used as the form of the source material. This may include combining grains into a solid mass to be incorporated into a source material, such as pelletizing the grains, making a ceramic from the grains, and/or making a solid matrix in which grains are incorporated.

The use of nanoparticles in the preparation of ceramics may yield materials with desirable properties as a source for targetry coupled separation. The term nanoparticle refers to grains having a grain size less than 100 nanometers. Compared with traditionally produced ceramics, ceramics created from nanoparticles (nanoparticle-based ceramics) have greater hardness and higher yield strength. Nanoparticles of fissionable materials may be produced, for example, by the precipitation method described above.

It is expected that ceramic properties derived from nanoparticles and nanoparticle synthesis routes will be useful in generating porous target material from tetravalent actinides. The following method for generating an actinide (e.g., U, Th, and/or Pu) ceramic is proposed. First, nanoparticles of the tetravalent actinide having a selected particle size are generated in an inert atmosphere. The particles are then sintered, for example at a temperature from 1,000-1,500° C., such as for example 1150° C. An inert atmosphere will be maintained throughout this process to prevent oxidation of the actinide metal. For example, an argon, neon, helium, nitrogen or any suitable inert gas mixture may be used. When this method was applied to zirconia nanoparticles as a surrogate for the actinide, after 2 hours of heating, a density of 93.5% theoretical was found. Density increased to 97.5% with 40 hours of heating and reached 99% at 60 hours. The average grain size was found to be 120 nm after 60 hours of heating at 1150° C. It is anticipated that actinide nanoparticles will have the same or similar properties and be suitable for use in targetry coupled separation sources.

It is also expected that actinide oxide nanoparticles could be used to product ceramic films and membranes and that such actinide oxide nanoparticles will have desirable properties for targetry coupled separations. The following method for generating an actinide oxide ceramic is proposed. First, actinide oxide nanoparticles are created. In an embodiment, this may be done by precipitating actinide oxide from a basic solution. In an alternative embodiment, actinide oxide particles may be synthesized by dissolving an actinide oxycarbonate in acidic nitric solutions, followed by hydrolysis and condensation of polynuclear actinide cations which should promote the formation of nano-sized, polymeric, oxy-hydroxide particles. When applied to zircon as surrogate, the zirconia particles so produced were found to be in the 3-6 nm range.

Creation of actinide oxide nanoparticles may also be enhanced through various techniques. In an embodiment, alcohol may also be used as a solvent to generate actinide oxide nanoparticles. The alcohol solvent may induce a faster particle formation rate and produced submicrometer microspheres due to the low solubility of hydroxide species in alcohol solution. In yet another embodiment, adding polyethyleneimine and 2,3-dihydroxybenzoic acid in the precipitation phase may to produce particles with a suitable particle size distribution. In yet another embodiment, oxalate precipitation may result nanoparticles within a suitable particle size.

A hydrothermal technique may also be suitable for the synthesis of actinide oxide nanoparticles which may be a suitable form for source material in targetry coupled separation. Urea can be used in the synthesis of the nanoparticles produced by hydrothermal conditions. The general method for this technique is actinide precipitation under basic conditions at temperatures above 100° C. in a pressure vessel. Monoclinic nanocrystal nucleation and growth is expected to occur at 1200° C. from powders produced by forced hydrolysis. The particles so produced may then be sintered into a ceramic as described above.

In yet another embodiment, near-critical water may be used to form actinide nanocrystalline materials. An aqueous mixture of actinide is brought to near-critical conditions and shock waves are produced by nozzle cavitation to generate actinide oxide particles. Near-critical water has been shown to rapidly hydrolyze and subsequently dehydrate cerium and zirconium salts to form mixed ceria-zirconia nanocrystalline materials. Shock waves produced by nozzle cavitation resulted in nano-sized particles of $TiO_2$ and $ZrO_2$.

In yet another embodiment, an emulsion-combustion method may be used to generate actinide oxide particles. In this embodiment, actinide ions in an aqueous phase are mixed into a second, flammable phase to form an emulsion. The emulsion may then be burned which will result in the actinide ions being rapidly oxidized. In the emulsion-combustion method, zirconium ions in flammable solution were rapidly oxidized upon combustion. This method produced hollow, thin-walled particles of sub-micrometer size.

In various embodiments, sources in targetry coupled separation may include metal-organic frameworks ("MOFs"). MOFs include coordination solids formed from linking metal ions with organic ligands. The high surface area compound can make suitable sources for the coupled production and separation of radionuclides. Lanthanide-based MOFs have been examined in more detail than actinide MOFs. Most of the actinide-based MOFs are based on the uranyl cation. Varying the combination of ligands and synthetic conditions has generated a large number of solid-state compounds. Molecular templates have been applied to uranyl MOFs.

In various embodiments, source materials in targetry coupled separation may include monolayers and aggregates. Photochemical reduction of actinides in organic solvent has been used to produce actinide monolayers and aggregates such as particles of tetravalent uranium phosphates. The product morphology can be varied through treatment to achieve the desired grain size or characteristic lengths for frameworks other than grains. In one monolayer example, a uranium monolayer is formed through the interaction of a pulsed laser with uranyl in a tributyl phosphate organic phase. The monolayer presents as a distinctly different color and can be isolated from the organic phase. Aggregation occurs upon treatment with methanol. The uranium product properties can be tuned through coupling photoreduction parameters and monolayer treatment.

In various embodiments, a target in targetry coupled separation may include uranium metal. High surface area uranium metal material can be prepared and used as targets, with or without a container, for specific radioisotope production. In an embodiment, a uranium metal ingot can be used as a starting form for uranium metal grain formation through arc melting. The arc melting parameters can be adjusted to produce metal grains with desirable properties such as a grain size selected based on the recoil distance of the selected radioisotope. Uranium metal can also form a high surface area structure through a hydriding-dehydriding process.

In an embodiment, the Kroll process may be modified to produce a high surface area structure in the form of a porous actinide metal sponge from an actinide tetrachloride.

The Kroll process involves the reduction of uranium chloride by liquid magnesium or sodium. Electrochemical reduction can also yield uranium metal which may have desirable target properties.

After the formation operation 510, the source material may be placed in a container in a packaging operation 512. Packaging of fissionable material into containers has been discussed above. Containers have been discussed in detail above with reference to FIG. 4.

Alternative Characterization of Grains

Figure 6A:
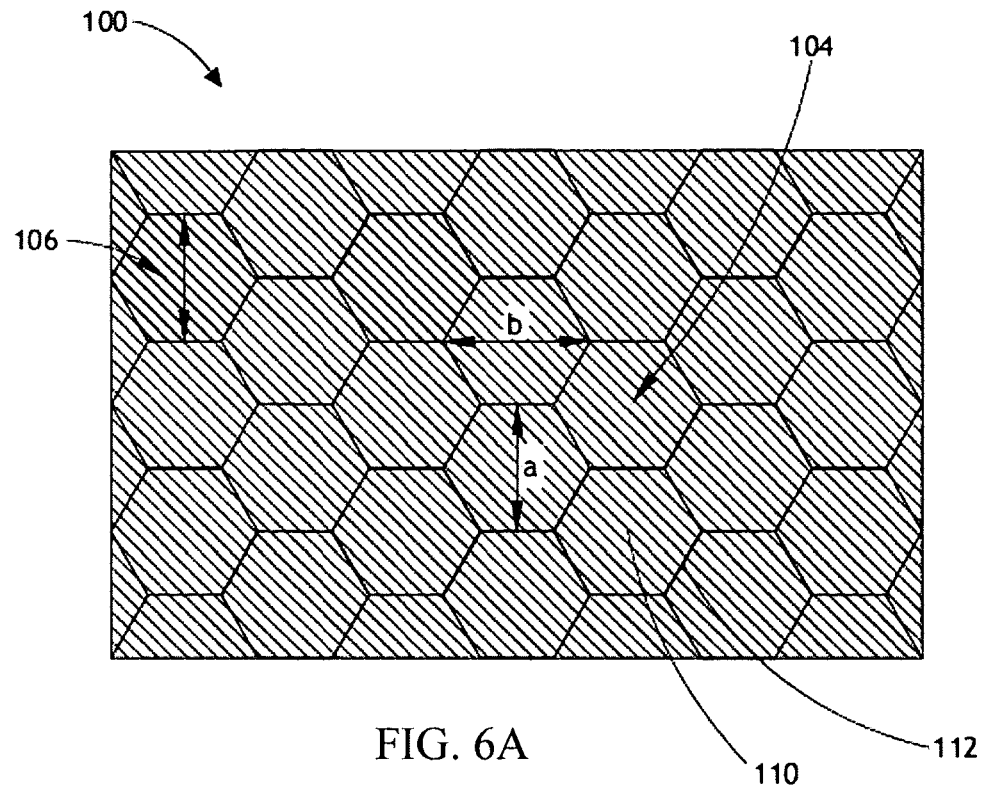
FIGS. 6A through 6C illustrate a more detailed means for characterizing grain size of a granular target material.
Figure 6B:
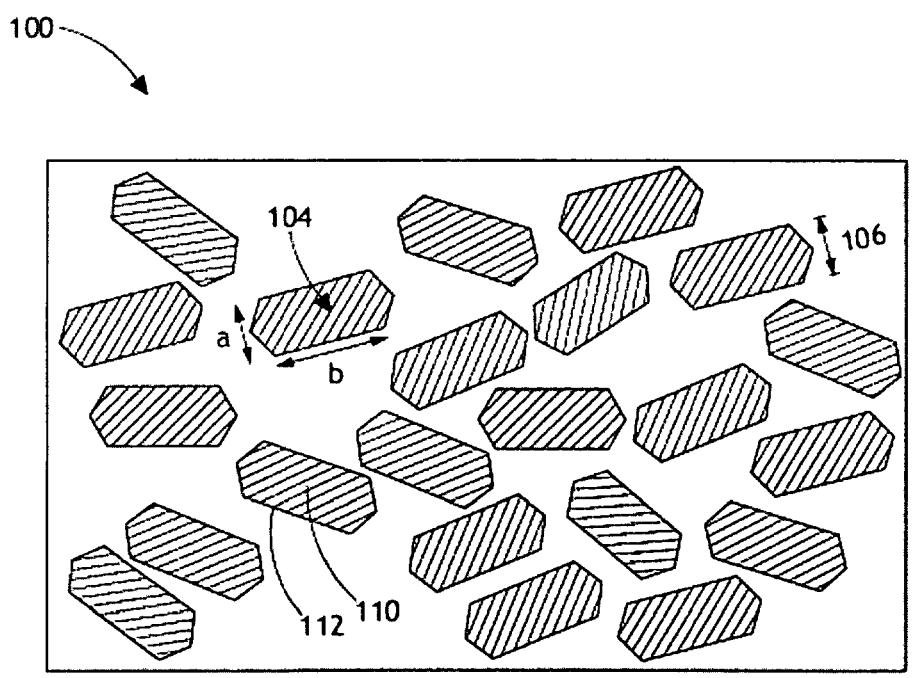
Figure 6C:
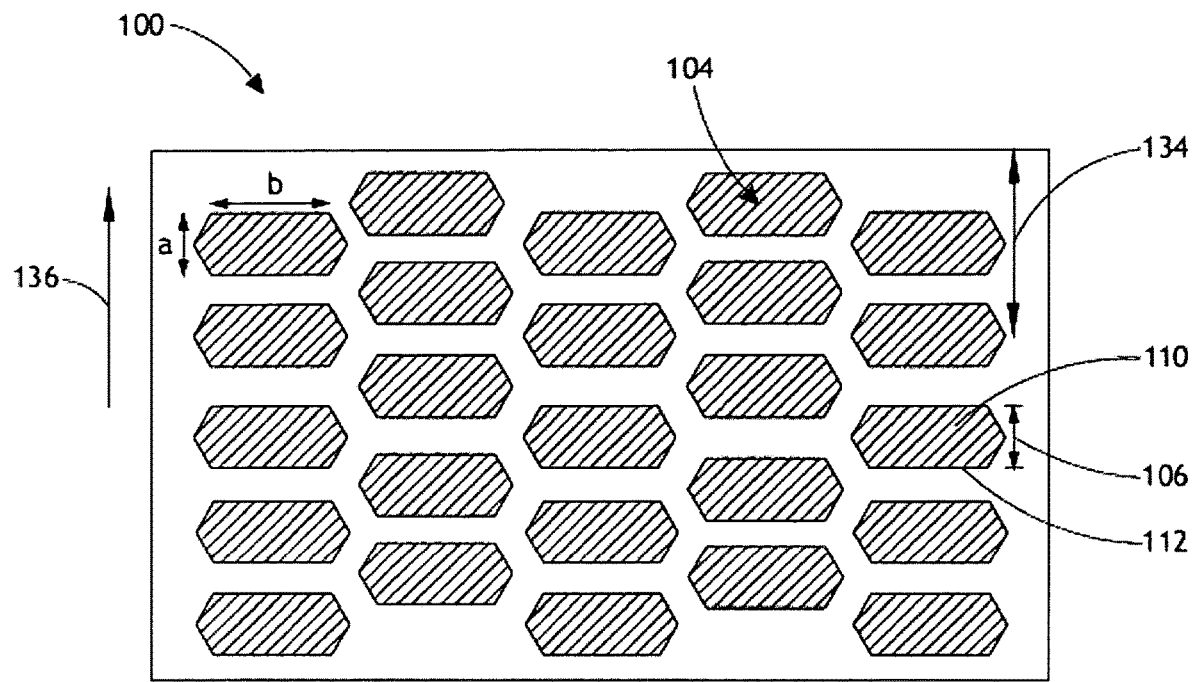

FIGS. 6A through 6C illustrate a more detailed means for characterizing grain size than the typical approximation of a grain as a spherical particle with a characteristic diameter. The characteristic length 106 along at least one dimension of one or more grains 104 may include a characteristic length 106 along all dimensions of one or more grains 104 of the source material 100. For example, the grains 104 of the source material 100 may be engineered such that the "height", represented by "a," and "width," represented by "b" are similar in size. Therefore, notwithstanding of factors (e.g., stress or thermal gradients), a radiation product subject to recoil upon creation may efficiently diffuse from the grain interior 110 to the grain boundary 112 along all directions within the grain. In this context, a grain structure may be characterized by the "grain size" of the grains 106 of the source material 100. The "grain size" may be selected such that the grains are small enough to allow for adequate diffusion from the interiors 110 of the one or more grains 104 to the boundaries 112 between the one or more grains 104.

As shown in FIG. 6B, the characteristic length 106 along at least one dimension of one or more grains 104 may include a characteristic length 106 along a selected dimension of one or more grains 104. For example, as shown in FIG. 6B, the grains 104 within the source material 100 may be engineered to have a selected characteristic length 106 along a given dimension of the grains 104. For instance, in a grain 104 having an elongated grain structure, the grain may have a selected characteristic length along the "thin" dimension, shown as dimension "a" in FIG. 6B, of the grain 104. In another instance, in a grain 104 having an elongated grain structure, the grain 104 may have a selected characteristic length along the "thick" dimension, shown as dimension "b" in FIG. 6B, of the grain 104. It should be recognized that the grain 104 need only have at least one characteristic length 106 smaller than the distance required for adequate diffusion due to recoil from the interiors 110 of the one or more grains 104 to the boundaries 112 of the one or more grains 104. It is further recognized, however, that all dimensions of a grain 104 may have a characteristic length 106 smaller than or equal to a distance required for adequate diffusion of fission product 108 from the interiors 110 of the one or more grains 104 to the boundaries 112 of the one or more grains 104.

As shown in FIG. 6C, the characteristic length 106 along at least one dimension of one or more grains 104 may include a characteristic length 106 along a selected direction 134. For example, the grains 106 within the source material 100 may be engineered to have a selected characteristic length 106 along a given direction in the source material 100. For instance, a grain 104 having an elongated grain structure may have a selected characteristic length 106 along a selected direction 134 within the nuclear fuel. It should be recognized that engineering the grain structures to have a characteristic length 106 along a selected direction 134 smaller than the length required for adequate movement of a radiation product due to recoil from a grain interior 110 to a grain-boundary 112 may supply a more efficient means for transferring fission product such as a radioisotope product from the grain interior 110.

In another embodiment, one or more grains 104 may have a characteristic length 104 along a dimension of the one or more grains selected to maximize heat transfer from a grain-interior 110 to a grain-boundary 112. For example, the one or more grains 104 may be oriented such that their narrow dimensions, shown as "a" in FIG. 6C, are aligned substantially perpendicular to a thermal gradient 136 in the source material 100. Such an arrangement aids in the heat transfer from the grain-interior 110 to the grain-boundary, aiding in the diffusion of a fission product 108 from the grain interior 110 to its grain boundary 112. By way of another example (not shown), in a cylindrical pellet fabricated utilizing the source material 100 the grains 104 of the source material 100 may be arranged (i.e., on average the grains of the material may be arranged) to have their the narrow dimension substantially perpendicular to the radial thermal gradient of the cylindrical pellet. It should be noted that the illustrations in FIGS. 6C, 6B, and 6A represent simplified conceptual illustrations of a plurality of grains 106 should not be interpreted as schematic in nature. Further, it should be recognized by those skilled in the art that a variety of materials processing techniques (e.g., cold-working and/or annealing, compression, or extrusion) may be implemented in order to develop the symmetrical grain structure in FIG. 6A, and the deformed elongated grain structure illustrated in FIGS. 6B and 6C. A variety of materials processing techniques are discussed further herein.

In another embodiment, the grains 104 of the source material 100 may have an average characteristic length 106 along at least one dimension smaller than or equal to a selected distance necessary for adequate diffusion of a fission product. For example, the grains 106 of the source material 100 may have an average characteristic length along a selected dimension or direction of the grains 104 of the nuclear fuel. It is recognized that there may exist a maximum average grain size which will provide adequate diffusion of fission products from the interiors 110 of the grains 104 to the grain boundaries 112 of the grains 104.

In another embodiment, the grains 104 of the source material may have a selected statistical distribution of characteristic lengths. For example, the grains 104 of the source material 100 may have a grain size distribution having a selected percentage of the grains having a grain size below a selected distance. For instance, the source material 100 may have a grain size distribution such that 75% of the grains have a grain size equal to or less than 5 µm, with an average grain size of 3 µm. In another embodiment, the grains 104 of the source material 100 may have multiple statistical distributions of characteristic lengths. For instance, the source material 100 may have a grain size 106 distribution such that 25% of the grains have a grain size equal to or less than 10 µm, 25% of the grains have a grain size 106 equal to or less than 5 µm, and 10% of the grains are below 1 µm. In another instance, the source material 100 may have a grain size 106 distribution such that 25% of the grains have a grain size 106 equal to or less than 10 µm and 25% of the grains have a grain size equal to or greater than 50 µm. In another instance, the source material 100 may have a grain size distribution such that 25% of the grains have a grain size between 1 µm and 5 µm, 50% of the grains have a grain size between 5 µm and 10 µm, and 25% of the grains have a grain size 106 greater than 10 µm. Applicant's co-pending U.S. patent application Ser. No. 13/066,253, filed Apr. 8, 2011 Apr. 8, 2011, titled Nuclear Fuel and Method of Fabricating the Same, which is hereby incorporated herein by reference, includes embodiments of nuclear fuel manufacture that could be used to create suitable target material for use in targetry coupled separations.

Liquid Source

Regarding various other embodiments of sources, a liquid source material can be employed and may be coupled with continuous separation to provide radioactive isotopes. As noted above target destruction can be reduced by limiting the phase change of the target (e.g., a liquid target with or without solid or other phase ancillary materials or a suspension of solid target in a liquid phase source material) through separation. In this embodiment, a liquid source can be a molten salt or solution phase. The liquid source can flow through an irradiation location or may be contained in a container that is passed through the irradiation location. The resulting radionuclides produced from a liquid source can be separated, isolated, and purified from the target using conditions and automation procedures as described for the solid source. Such separation may use a liquid-liquid extraction process, a liquid-gas extraction process, an electrochemical process, or, alternatively, a liquid-solid extraction process such as passing the irradiated liquid source over a solid material adapted to remove the desired product(s) from the liquid phase. For example, in a liquid-liquid extraction embodiment, under certain conditions the target may be immiscible in or otherwise separable from the extraction material to facilitate separation of a liquid extraction material from the liquid source material after a sufficient contact time. A liquid source embodiment may have similar benefits from target reuse and waste reduction, but the source configuration and flow may entail additional considerations than sources of solid material.

A liquid fuel recycle system for removing fission products from salt-based fuels and recycling the fuels back to the reactor may be chemically similar to the process developed for metallic fuels. Supercritical $CO_2$ separation, in particular, takes advantage of the properties of the salts, which are, by themselves, insoluble in $sCO_2$. Extractants, such as diketones, may be used to draw select metals into the $sCO_2$ phase as described herein. Physically, the liquid fuel recycle system may be made to avoid pressurization of the reactor vessel during a leak in the $sCO_2$ system. Additionally, the salts in their liquid states may be at temperatures high enough to dissociate or degrade the diketones. To avoid both of these obstacles, a liquid fuel recycle system may be designed such that the molten-salt is pumped external to the reactor vessel and injected into a vessel containing the $sCO_2$. A $sCO_2$ system may be maintained at a temperature low enough to solidify the molten-salt, resulting in a high surface area solid. Provided the $sCO_2$ can be maintained at a sufficiently low temperature, the beta-diketones or other appropriate extractant(s) may be co-mixed with the $sCO_2$ during salt injection, avoiding dissociation.

Alternatively, the extractant may be injected into an extraction vessel in a batch-wise fashion following salt injection. In either case, the result is a salt solution of (selected) metal-complexes solvated in the $sCO_2$ diketone solution. The salt solution may then be pumped to a secondary system where temperature or pressure is adjusted to remove the metal complexes (product) from the salt solution without substantial destruction of the target in the molten salt fuel. Again, it is likely that the metal complex is removable form the salt solution without dropping the $CO_2$ to a gaseous state (below the critical point) via heating, cooling, or both. Heat may be used to volatilize the metal complexes so that a separate gas phase occurs within the $sCO_2$ solution. The $sCO_2$ may alternatively be cooled or heated near and above the critical point where its solubility typically changes significantly with changes in temperature and pressure, resulting in a separate, liquid-metal complex phase which was forced out of solution due to changes in thermodynamic condition. This phase can then be transferred, such as by way of pumping, from the extraction system to a system designed for interim or long term storage. Whether further heating or cooling is used to separate the metal complex or other product, ultimately further heating can be used to thermally decompose the diketones, leaving behind the metal fission product(s).

Separations of Radioisotope(s) from a Source

Embodiments suitable for use in one or more of the separation operations described above will now be described in greater detail. As discussed above, embodiments of the separation of the desired product(s) from a source may include exposing at least some of the source material to an extraction material that preferentially extracts the selected radioisotope product from the source material without removing substantially any of the target or requiring the target to be dissolved or to otherwise require a change in the phase or physical form of the target. This allows the target to be reused in a subsequent neutron bombardment with little or no regeneration or post-separation processing.

In an embodiment, the separation process generally involves the preferential isolation of the desired product(s) created by neutron bombardment from a solid phase source material. The separation is performed without dissolution of the source material or the target within the source material using a solvent as the extraction material. As mentioned above, the targetry coupled separation can exploit the recoil from the nuclear reaction used to selectively tailor and produce the target nuclei and target material to make the desired product more easily recoverable in the separation operation. Additionally and/or alternatively to the recoil, chemical differences between the target and the product nuclei can be selected, tailored and/or exploited to achieve a preferential separation of the desired product(s). Additional steps may be desired to remove the extracted radioisotope product from the extraction material and, in subsequent steps, further purify the desired product. Additional purification may utilize any one or more appropriate techniques as are known in the art, including column chromatography, precipitation, electrochemistry, ion exchange, sorption, filtration, and solvent extraction.

Based on the source material composition, properties, and/or morphology, in various embodiments, the nuclear reaction may separate the product nuclei from the source or may physically move the product nuclei near or onto an available surface of the source material, which causes it to be more accessible to an extraction material, or may induce a chemical change that can be utilized to achieve separation. Appropriate extraction material can be selected, formed, introduced and/or activated in the separation process to exploit differences in the extraction product and the target, with the extraction product being either the direct (selected) product of the neutron bombardment or an indirect (decay daughter) product of the selected radioisotope. The desired product is amenable to separation due to the behavior of its chemical form in a solid, liquid, or gas phase. Additionally, the chemical processes do not appreciably dissolve the source or at least substantially reduce dissolution of the target, thereby leaving the target in a state to be reformed for further irradiation.

Various separation treatment options are available. In various embodiments the target may be removed from the irradiation generator and treated. The treatment can use any single and/or combination of any appropriate process including chemical, electrochemical, thermal, filtration, pressure, fluidized bed, and gas phase methods. Solution phases can include any one or more phases including aqueous phases, organic phase, ionic liquids, molten salts, suspensions, and supercritical fluids. The chemical composition of the gas phase can also be varied in composition of gases, temperature, flow rates, pressure, etc.

Illustrative separation processes and methods can include any one or more of members of the group comprising extraction, liquid chromatography, gas chromatography, capillary chromatography, crystallization, precipitation, filtration, distillation, fractional distillation, electrophoresis, capillary electrophoresis, magnetic separation, evaporation, flotation, cloud point, micellar, flocculation, electrochemical methods, volatilization, and sublimation. The separation process can be performed in the source's container, thereby precluding removing the target from the irradiation container. Alternatively, if there is no container, the source material may be placing inside a chemical reactor or other container and then removed for subsequent re-irradiation after the separation is complete. If desired, the separation process can utilize an automated chemistry system, such as those produced by Chemspeed Technologies, Skalar, Human Diagnostics, Randox or any other appropriate automated chemistry system.

Figure 7:
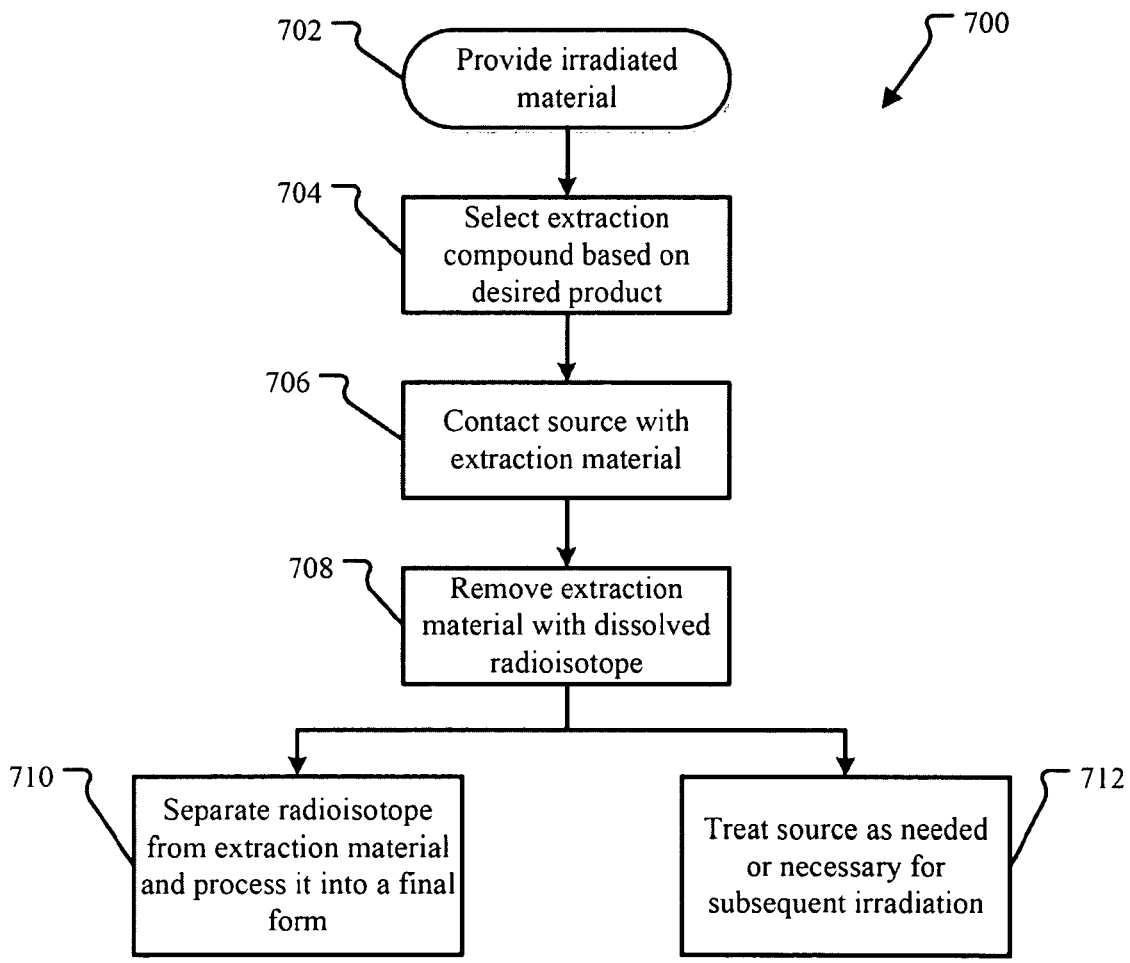
FIG. 7 illustrates an embodiment of general separation method suitable for use with targetry coupled separation.

FIG. 7 illustrates an embodiment of general separation method suitable for use with targetry coupled separation. The method 700 obtains a desired product or products from a source material that has previously been irradiated so that at least some of the desired product is distributed throughout the source material. In the embodiment shown, such a source material is provided in operation 702.

In a selection operation 704, an extraction material that removes the desired product or products from the source material without substantially dissolving the source material is selected and prepared based on the desired product to be removed and the characteristics of the source material. For example, in an embodiment, the extraction material may be a solvent that dissolves the desired product but does not dissolve fissionable material in the source material. In yet another embodiment, the extraction material may be a solvent containing an extractant, such as a ligand, that will bind to the desired product (thereby making it soluble with respect to the extraction material) but will not bind to fissionable material. If there are multiple desired products, one extractant may be suitable or, alternatively, multiple extractants may be selected. Such a ligand should be soluble in the solvent under temperature and pressure conditions of the contacting operation.

In yet another embodiment, and as will be discussed in greater detail below, the solvent may be $sCO_2$ and the selected ligand or ligands form a carbon dioxide soluble chelate with the radioisotope. Again, such a ligand should be soluble in the solvent under temperature and pressure conditions of the contacting operation. For example, for removal using $sCO_2$, the ligand concentration may be up to 0.5 mole/liter and the temperature and contacting time may be varied. However, sufficient removal is anticipated to occur at temperatures below 220° C. at 1 atm with a contacting time of 30 minutes or less. Examples of possible ligands include a fluorinated β-diketone and a trialkyl phosphate, or a fluorinated β-diketone and a trialkylphosphine oxide. Further examples include dithiocarbamates, thiocarbazones, β-diketones and crown ethers. Inorganic ligands, including nitrates, sulfates, thiocynates, cyanates, and other similar compounds may also be used. A ligand may be provided with one or more functional groups selected to enhance the ligands ability to bind and remove desired products. Such functional groups include hydroxyl, carbonyl, diketones, aldehyde, haloformyl, carbonate ester, carboxylate, ester, ether, peroxy, amine, carboxamide, imide, imine, nitrate, cyanate, thiol, sulfide, sulfinyl, sulfonyl, thiocyanate, isothiocyanate, phosphate, and phosphono groups.

Next, the source material is exposed to the extraction material, in a contacting operation 706 which in some cases may include adding the extraction material to the source material. Various actions may be performed to enhance the contact between the extraction material and the source material, again depending on the characteristics of the components involved. For example, if the source material is solid, the contacting operation 706 may include contacting the source material with a liquid extraction material for a residence time. As a result, an extraction material and radioisotope liquid mixture is created as the desired radioisotope product is dissolved from the source material. Alternatively, if the source material is a liquid, the contacting operation 706 may include contacting the source material with an immiscible liquid extraction material for a residence time. This results in a two-phase liquid mixture containing a first phase of bulk material and a second phase of extraction material with the dissolved desired product.

The contacting operation 706 may also include other actions to assist in separation. For example, in an embodiment the contacting operation 706 includes agitating one or both of the source material and the extraction material during at least a portion of the residence time. In yet another embodiment, the contacting operation 706 includes changing a temperature of one or both of the source material and the extraction material during at least a portion of the residence time. And, in yet another embodiment, the contacting operation 706 includes changing a pressure of one or both of the source material and the extraction material during at least a portion of the residence time.

In yet another embodiment in which the source material is in the form of solid grains stored in a container, the contacting operation 706 includes inserting an amount of the extraction material into the container and retaining the extraction material in the container for some predetermined residence time.

After a selected residence time, the extraction material, now including the dissolved desired radioisotope product or products, is removed from contact with the source material in a removing operation 708. This may involve simply draining liquid extraction material from the source material or may require more active processing such as using centrifugal force, heating, cooling, pressurizing, or depressurizing to remove the extraction material.

The desired product or products may then be separated from the extraction material and converted into a final product in a separation operation 710, substantially as described above with reference to final processing operation 314 of FIG. 3.

Volatility-Based Separations

Figure 9:
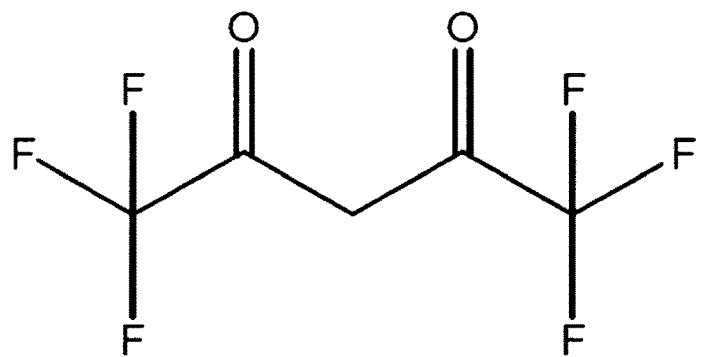
FIG. 9 illustrates the chemical structure of the ligand, hexafluoroacetylacetonate ("hfac"), suitable for use in targetry coupled separation with some specific radionuclides.

It will also be appreciated that in various embodiments of an extraction process may include a rapid, volatility-based separation that can be used to isolate the desired products from irradiated sources. Volatility-based separation embodiments can exploit the formation of halides ($F^-$, $Cl^-$, $Br^-$, $I^-$), carbonyl (CO), and diketone based ligands such as hexafluoroacetylacetonate ("hfac") (FIG. 9) to produce volatile metal compounds. The formation of volatile fluorides with nuclear materials is known. Chlorination has also been examined, and found similar to fluoride behavior. The existing differences can be exploited and extended to the other halides for tunable separations. This is readily performed in the Van Arkel process for obtaining pure Zr from $ZrI_4$. Carbonyls are used in the Mond process to form volatile Ni species. The fission products Mo, Tc, Ru, and Rh also form carbonyl species, with $Mo(CO)_6$ being a primary example of a volatile product. The hfac complexes are known to be volatile for a range of elements. This can provide a rapid and selective separation of radionuclides.

Formation of halide, carbonyl, or hfac complexes can be exploited for the separation of a range of elements from starting material based on differences in volatility. Targeting the specific formation of volatile species can achieve separations that can be rapid and selective. An additional benefit is that volatile complexes may be used as metal vapor deposition precursors. Thus, a pure sample of the product could be obtained directly from volatile complexes formed in the reaction mixture. It is to be noted that decay of the product or product of the irradiation may require further processing for product generation (e.g., a product precursor is the result of irradiation of the source).

In an embodiment, using the Mond process, an irradiated $UO_2$-containing source material in a granular form having $^{99}Mo$ solid distributed throughout the grains of the source material as the result of the previous irradiation may be exposed to carbon monoxide in a vessel, container or chamber maintained at a pressure from 0.5 to 5 atm and temperature from 50-60° C. According to the Mond process, this will convert at least some of the $^{99}Mo$ to $^{99}Mo(CO)_6$. Relatively more $^{99}Mo(CO)_6$ may be created by extending the exposure time and by other methods such as agitating the source material to provide better contacting of the carbon monoxide gas with the surface of the source material. The boiling point of $^{99}Mo(CO)_6$ (approximately 156° C.) is substantially less than the melting point of $UO_2$ (approximately 2,865° C.). Therefore, volatilization can be easily achieved by raising the temperature of the source material after the carbon monoxide contacting operation to a temperature above the boiling point of $^{99}Mo(CO)_6$. Furthermore, by keeping the temperature below the melting point of the $UO_2$ after the $^{99}Mo(CO)_6$ has been driven off, the source material is unaffected and ready for a subsequent irradiation operation.

In another more generalized embodiment, an amount of irradiated source material having desired product distributed throughout the source material as the result of the previous irradiation may be exposed to a $F^-$, $Cl^-$, $Br^-$, $I^-$, CO, or diketone based ligands in a vessel, container or chamber under conditions that cause the desired products to form a volatile compound of the desired product, but that do not alter the target material. Relatively more volatile desired products may be created by extending the exposure time and by other methods such as agitating the source material to provide better contacting with the surface of the source material. Subsequently, as long as the boiling point of the desired product compound is below the melting point of the target material, volatilization can be easily achieved by raising the temperature. The remaining source material is unaffected and ready for a subsequent irradiation operation.
Supercritical Carbon Dioxide Separations As mentioned above, another separation technology suitable for use in targetry coupled separations is supercritical carbon dioxide. The $sCO_2$ extraction described herein may also be suitable for use in removing fission products from nuclear fuel in addition to removing desired products from targetry coupled separation sources. Supercritical $CO_2$ has been examined for extraction on metals and metalloids from both aqueous and solid solutions. Accordingly, $sCO_2$ combined with various ionic liquids (ILs) can be utilized as ligands to extract metal ions from solutions. Similar methods may be used to extract metals or metalloids from solid materials, such as contaminated paper, fabrics, or even soils. Current irradiated fissionable material recycling techniques using $sCO_2$ solutions require dissolution of the irradiated material into a solution. Using the $sCO_2$ separation techniques described herein, it may be possible to treat used fuel source material (including nuclear fuels considered for molten-salt reactors) with $sCO_2$ in a manner which does not require dissolution. As an example, metal fuel from a breed and burn reactor such as a traveling wave reactor (TWR) can be treated with a $sCO_2$ system that does not dissolve the U metal but does remove selected fission products (with high cross sections for parasitic absorption). A $sCO_2$ system may be capable of selectively removing these elements and their corresponding isotopes. A list of elements soluble in ILs is shown in Table 2.

TABLE 2

Occurrence of selected elements in TWR spent fuel and IL solubility.

| Element | Fractional Absorption | Element | Fractional Absorption |
|---|---|---|---|
| Pd | 2.38% | Ru101 | 1.18% |
| Ru | 1.95% | Pd105 | 1.13% |
| Sm | 1.25% | Tc99 | 1.02% |
| Mo | 1.21% | Rh103 | 1.02% |
| Cs | 1.16% | Pd46 | 0.73% |
| Tc | 1.02% | Cs133 | 0.73% |
| Rh | 1.02% | Mo97 | 0.45% |
| Nd | 0.85% | Sm149 | 0.43% |
| Xe | 0.41% | Ru102 | 0.41% |
| Eu | 0.30% | Mo95 | 0.41% |

For ILs, the $sCO_2$ may be useful as a means of introducing uranium into the IL. In other cases, it may be appropriate to have direct dissolution of oxides into an IL. Metals of interest to nuclear waste processing, such as actinides, lanthanides, and transition metals, have been characterized chemically using highly soluble fluorinated β-diketones in $sCO_2$. Extraction can be accomplished by using appropriate chelating agents as extractants. For example, La and Eu extraction with greater than 90% effectiveness has been demonstrated using fluorinated diketones combined with tri-butylphosphate (TBP). In this process, a room temperature ionic liquid, an imidazolium-based 1-butyl-3-methyl-imidazolium (BMIM) with bis(trifluoromethylsulfonyl)-imide (also known as $Tf_2N^-$, which is properly described as $(CF_3SO_2)_2N^-$) was used as a complexing agent because of the complexing agent's ability to solubilize $CO_2$. In this manner, a full water/RTIL/$sCO_2$ system is developed. A similar process with other ionic liquids and metal chelating agents (extraction agents) is summarized in Table 3. Note that Eu and La are both extracted with all systems except when using thenoyl tri-fluoroacetone (TTA) without TBP. The latter only extracted La while not separating (extracting) Eu.

For example, for removal using $sCO_2$, the ligand concentration may be up to 0.5 mole/liter and the temperature and contacting time may be varied. However, sufficient removal is anticipated to occur at temperatures below 220° C. at 1 atm with a contacting time of 30 minutes or less. The extractions performed in Table 3 were carried out with the extractant/$sCO_2$ mixture at 150 atm for one hour at 50° C. The extractions show that $sCO_2$ separation should be suitable for use on irradiated source material including nuclear fuel, nuclear waste material, and targetry coupled separation sources. Further, the extractions show that β-diketones can be used to selectively bind with oxides or metal in the presence of fissionable species such as uranium. Based on this information, it is anticipated that β-diketones can be used to selectively bind with radioisotope oxides or metals while not substantially dissolving fissionable material regardless of its origin.

TABLE 3

Degree of extraction (%) of EuIII and LaIII from $BMIMTf_2N$ with different beta-diketones (with or without TBP).

| | $Eu^{3+}$ | $La_{3+}$ |
|---|---|---|
| HFA w/o TBP | 90.5 | 90.4 |
| HFA w/TBP | 99.9 | 92.6 |
| TTA w/o TBP | — | 87.1 |
| TTA w/TBP | 95.5 | 90.5 |

HFA = hexafluoroacetylacetone,
TTA = 4,4,4-trifluoro-1-(2-thienyl)-1,3-butanedione Further examples of possible ligands include dithiocarbamates, thiocarbazones, β-diketones and crown ethers. Inorganic ligands, including nitrates, sulfate, thiocynates, cyanates, and other similar compounds may also be used. A ligand may be provided with one or more functional groups selected to enhance the ligands ability to bind and remove desired products. Such functional groups include hydroxyl, carbonyl, diketones, aldehyde, haloformyl, carbonate ester, carboxylate, ester, ether, peroxy, amine, carboxamide, imide, imine, nitrate, cyanate, thiol, sulfide, sulfinyl, sulfonyl, thiocyanate, isothiocyanate, phosphate, and phosphono groups.

In general, an obstacle to $CO_2$ solvation is low solvent power of $CO_2$ (non-polar). Metals and metal chelates have low solubility in $sCO_2$ with $CO_2$ solubility parameters in the range of 4-5 cal/cm$^3$. This can be overcome by adding $CO_2$-philic functional groups such as fluoroethers, fluoroacrylates, fluoroalkyls, silicones, and certain phosphazenes. Fluorinated beta-diketones (with and without tributyl phosphate) have been demonstrated in current techniques to extract a variety of metals. Bis(trifluoroethyl) dithiocarbamate exhibits higher solubility than non-fluorinated counterparts; $10^{-4}$ mol/L for fluorinated vs. $10^{-6}$ to $10^{-7}$ mol/L for non-fluorinated. As another example, Diethyldithiocarbamate (DDC) can be 3-800 times less soluble in $sCO_2$ at 100 atm than bis(trifluoroethyl)dithiocarbamate (FDDC). Since $sCO_2$ density change is nearly linear with pressure, the solubility also changes nearly linearly with solubility increasing with increasing pressure.

Lanthanides, actinides, copper, arsenic, and antimony (and other products of irradiated sources) can have concentrations on the order of $10^{-4}$ mol/L $CO_2$. Water and soil extraction has been demonstrated in current techniques with 1000-10000 molar ratio of chelate to metal in solution.

In large scale processes, it may be impractical to transition $sCO_2$ to the gas phase and remain economical since it may require either recompression of the $CO_2$ to the supercritical state or a steady supply of high pressure $CO_2$, not to mention the safety risk inherent to confining a high pressure solution of a highly compressible fluid. Furthermore, the off-gas $CO_2$ may need to be collected in a container capable of further decontamination or disposal, due to some residual radioactive materials or decay products potentially remaining in the carbon dioxide gas.

Some current techniques have a 'back extraction' process which does not require gasification of the $sCO_2$ as part of the separation of the radioisotopes from the $sCO_2$. In this type of process, metal or metalloid species are removed from solid or liquid solutions by using supercritical fluids to form a metal or metalloid chelate. The supercritical fluid will typically contain a solvent modifier, such as a few percent $H_2O$ or MeOH. The metals or metalloids are then back-extracted from the $sCO_2$ solution by using an acidic solution, one which is preferably halogenated. By back extracting to another (aqueous) solution, decompression of the $sCO_2$ is avoided. What is left is the other solution bearing the selected radioisotopes and $sCO_2$ that can be readily reused. This is particularly advantageous in an automated system and in a continuous treatment, although even in a semi-automated, batch treatment system the ability to recycle $sCO_2$ without the added step of repressurization would be cost-advantageous. Back extraction may, or may not remove the ligand with the radioisotope product. In an embodiment, fresh ligand may need to be added to the $sCO_2$ before it can be reused as an extraction material. It should be noted that ILs could also be used for the back extraction process.

Figure 10:
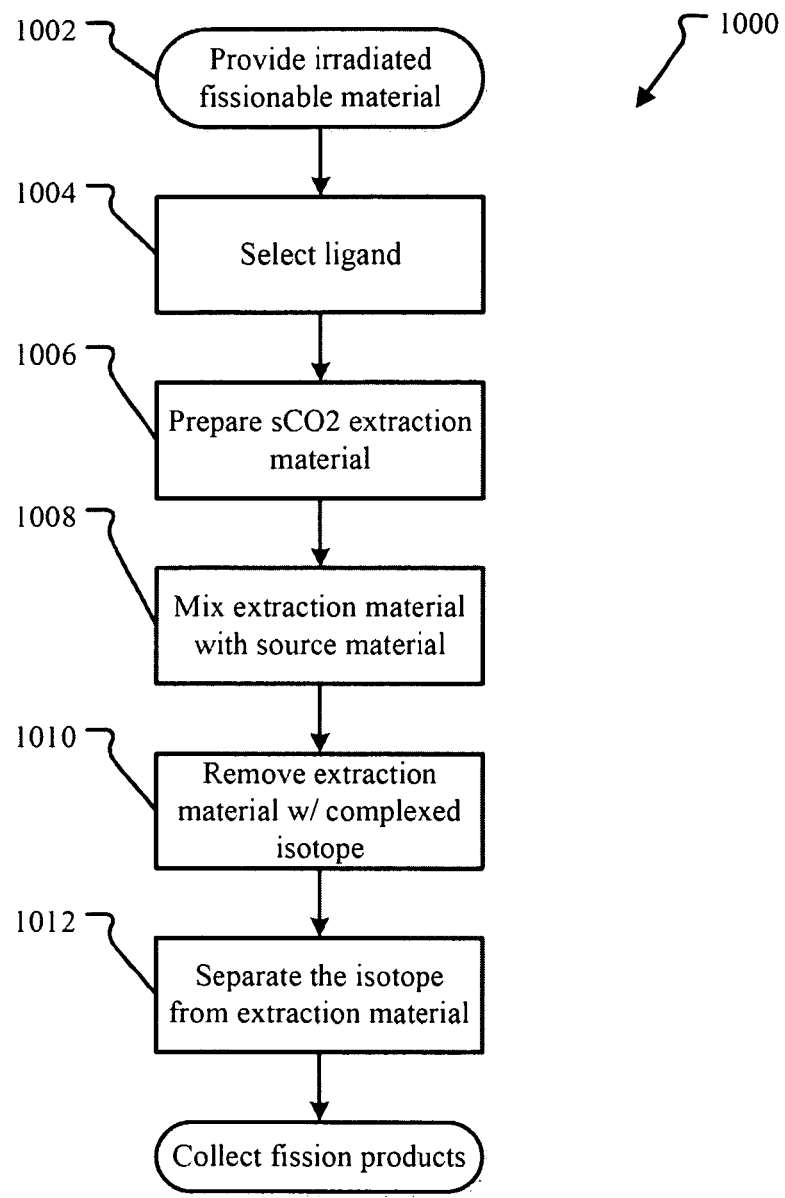
FIG. 10 illustrates an embodiment of a method of extracting a first radioisotope product from irradiated fissionable source material.

FIG. 10 illustrates an embodiment of a method of extracting a first radioisotope product from irradiated fissionable source material. The method 1000 begins with an irradiated fissionable source material illustrated by the providing operation 1002. The irradiated fissionable target material may contain a plurality of radioisotopes in addition to the desired radioisotope product. Examples of desired radioisotope products include $^{99}Mo$, $^{238}U$, $^{131}I$, $^{51}Cr$, $^{225}Ra$, and $^{225}Ac$.

Based on the desired radioisotope product or products and the characteristics of the target material, a ligand is selected in a ligand selection operation 1006. In an embodiment, a ligand is selected that is soluble in supercritical carbon dioxide ($sCO_2$), forms a chelate with the desired product, and does not form a chelate with the target material. For example, in an embodiment, the desired radioisotope product is $^{99}Mo$, the irradiated target material is $^{235}U$ and the ligand known to complex with molybdenum. Examples of other suitable ligands are provided above.

Next, the identified ligand is dissolved into $sCO_2$ to form a $sCO_2$-ligand solution in an extraction material preparation operation 1006. If the selected ligand is not particularly soluble in $sCO_2$, this operation 1006 may also include modifying the ligand to make it more soluble, such as by adding $CO_2$-philic functional groups such as fluoroethers, fluoroacrylates, fluoroalkyls, silicones, and certain phosphazenes. In an embodiment, the ligand may be a fluorinated β-diketone and a trialkyl phosphate, or a fluorinated β-diketone and a trialkylphosphine oxide. In another embodiment, the ligand may be selected from dithiocarbamates, thiocarbazones, β-diketones and crown ethers.

The $sCO_2$-ligand solution is then placed in contact with the irradiated source material for a contact time, in a contacting operation 1008. As the selected ligand forms a complex with the desired product, a result of the contacting operation 1008 is a $sCO_2$-radioisotope complex solution. In an embodiment, the irradiated source material is in a container and the contacting operation 1008 includes passing the $sCO_2$-ligand solution through the container.

The contacting operation 1008 may also include performing additional actions to enhance the mass transfer of the radioisotope product into the $sCO_2$-ligand extraction material. For example, in an embodiment in which the irradiated source material is in the form of loose or loosely packed grains in a container, the contacting operation 1008 may include passing the $sCO_2$-ligand extraction material through the container, essentially using the container as a packed bed reactor by forcing the solution through the bed of grains. In yet another embodiment, the $sCO_2$-ligand solution may be passed through the container at a flow rate sufficient to fluidize the plurality of grains within the container, in effect using the container as a fluidized bed reactor. In yet another embodiment, the irradiated fissionable source material may be in liquid form and contacting includes agitating the fissionable material/$sCO_2$-ligand solution mixture.

After the contact time, the $sCO_2$-radioisotope complex extraction solution is then removed from the irradiated source material in a removal operation 1010. In this operation, care may be taken to prevent the fissionable target material from being removed with the $sCO_2$-radioisotope complex extraction material so that substantially all of the irradiated fissionable target material remains together in its original, physical form, e.g., a powder or ceramic. The reader will understand that a perfect system is not possible, and that some de minimis amount of irradiated material may be removed with the extraction material. However, systems in which less than 1% by weight or less than 0.1%, 0.01%, or 0.001% of the original amount of irradiated material is removed with the $sCO_2$-radioisotope complex solution should be readily achievable.

Next, the desired product and/or a further decay daughter product of the desired product is separated from the $sCO_2$ in a separation operation 1012. This may be by back extraction of the $sCO_2$ or may involve reducing the $sCO_2$ to subcritical. This may include removing the ligand-product complex or, alternatively, may include removing only the product. In an embodiment, a back extraction is used in which a $sCO_2$-ligand solution is also generated from the separation operation 1012 that is suitable for reuse without decompressing and repressurizing the $sCO_2$ ligand solution. In an embodiment, this may be achieved by contacting the $sCO_2$-product complex solution with an acidic solution, thereby generating an acid-product solution and a regenerated $sCO_2$-ligand solution.

Supercritical Carbon Dioxide Separation for Reformation of Spent Fuel

Metallic fuel, including those metal fuels appropriate for vented pin configurations and/or a traveling wave reactor, typically includes metal fuel capable of high burn-up contained within vented, ferritic martensitic stainless steel cladding. At the end of life, the fuel generally has a highly porous matrix of metallic form fuel and solid fission products which precipitated from the fuel during the burn cycle.

Figure 8:
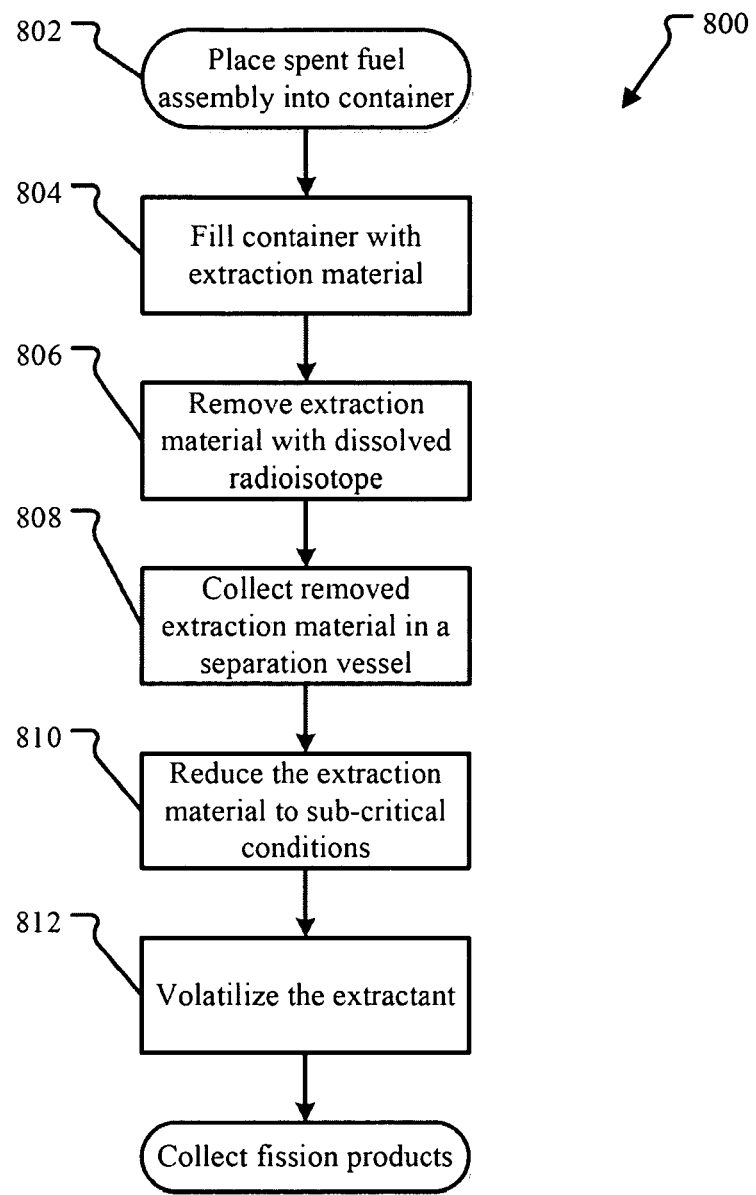
FIG. 8 illustrates an embodiment of a method for the reformation of nuclear fuel using supercritical carbon dioxide ($sCO_2$).

FIG. 8 illustrates an embodiment of a method for the reformation of nuclear fuel using $sCO_2$. Reformation of fuel after irradiation generally may be designed to allow treatment of the entire fuel assembly for fission product, lanthanide, or actinide removal treatments without modification of the nuclear fuel assembly or fuel pins contained within. Using the example of a sealed vessel with targetry coupled separations, a previously burned nuclear fuel assembly source material may be placed into a sealable pressure vessel in a container operation 802.

The vessel is then filled with pressurized $sCO_2$ and one or more extractant (such as diketones, or any other appropriate agent) to create an extraction material in the absence of an IL or aqueous component in operation 804. Because of the presence of a vent in the existing fuel assembly for fission gas venting, and the nature of supercritical fluids, the $sCO_2$-extractant solution will work to fill the fuel pin and the matrix of porous fuel (i.e. supercritical fluids behave as low surface tension, low viscosity fluids which fill the volume they are contained within). The extraction material will begin to solvate targeted fission products (or other materials, if so desired and a proper ligand chosen), leaving the uranium metal matrix unaffected. The fission products will then begin to diffuse out of the fuel source material such that the concentration of the overall system tends toward equilibrium.

The extraction material containing the dissolved fission products can then be slowly released from the pressure vessel in an extraction material removal operation 806. New, clean extraction material may or may not be added to the pressure vessel during the removal operation 806. Agitation, heat and/or continued pressurization and depressurization may be applied to the system to enhance the solvation rate. For example, the system may operate at greater than 7.5 MPa (approximate critical point at 51° C.) and be oscillated by +/−0.1 MPa to enhance 'pumping' of extraction material in and out of the porous fuel.

The extraction material removed from the system, containing the elements and isotopes removed from the used fuel, is directed toward another vessel in a collection operation 808.

In the separation vessel, the $sCO_2$ in the extraction material can be brought to below the critical point and converted to the gaseous phase in operation 810. By reducing the $CO_2$ below the critical point, the extractant and the fission products are separated out of the $CO_2$ and collect as a liquid phase in vessel.

Next, a volatilization operation 812 can be performed on the collected liquid phase extractant and fission product mixture in which the extractant is brought to above its volatilization temperature and converted to a vapor phase, leaving behind the selected element or isotopes. This may be done in the same separation vessel as the sub-critical operation 810 or the extractant-fission product liquid mixture may be moved to a different vessel for this operation.

Variations of this scheme may be used as appropriate. For example, lowering the solution to below the liquidus point of the carbon dioxide may be preferred if the chosen extractant and liquid $CO_2$ are insoluble. Another alternative may be to raise the temperature of the supercritical solution to above the volatilization point of the extractant (e.g. greater than 100° C. to 200° C.) or to above the decomposition temperature (e.g. greater than 200° C. to 300° C.). In either case, the metal may substantially or partially precipitate from the $sCO_2$ once the extractant is lost. Removal of the extractant vapor or decomposition product can be accomplished by a gas phase separation or, as above, by converting the $CO_2$ to a liquid phase. Furthermore, the solution may change temperature or pressure from a first supercritical condition to a second supercritical condition, the second condition having a solubility of the extractant lower than the solubility of the first condition. By this process, all or a portion of the extractant may be recovered without leaving the supercritical state.

Removing fission products from the fuel assembly may greatly enhance the disposability of the fuel assemblies, as >90% of targeted fission products may be removed with >90% capable of being removed with multiple $sCO_2$ solution treatments. In some cases, it may be advantageous to apply multiple cycles such as repeated treatments or multiple different treatments, each with a different extraction material, to increase the removal of fission products. For example, in some cases, two treatments could give 99% removal of accessible fission products whereas three would give 99.9% and so forth. Any appropriate factors may be used to determine the number and/or type of processing treatments and may be based on fission products dissolved or stuck inside the solid fuel matrix where $sCO_2$ solution cannot penetrate. It should be noted, however, that it may be possible to operate at temperature and timescales which would allow for diffusion of solution soluble metals out of the fuel matrix and into solution. This may lower the short term heat load of the spent fuel assembly, decrease the dangers of handling and transporting the assembly, and make it more suitable for long-term disposal.

An alternative to spent fuel disposal would be to re-use the fuel assembly once the fissions products are removed as a source in a targetry coupled separation method, such as described above. The fuel assembly could be transported to a targetry coupled separation facility for this or processed in the same facility that created the spent fuel. A fuel assembly may be used as a source without modification or it may be processed to improve the targetry couple separation effects, such as by converting the spent fuel into grains of an appropriate size for the radioisotope products of interest to the targetry coupled separation facility.

For example, in an embodiment the facility is a breed and burn type reactor such as a TWR. In this embodiment, the fission products may be removed and then a thermo-mechanical treatment is performed within the pressure vessel used for solvation. The thermo-mechanical treatment modifies the structural material for continued in-reactor use. To enhance the treatment, after the fission products are removed, the vessel and contained assembly may be brought to significantly higher temperatures (which could be made to exceed the fuel melting point) and pressures (10's of MPa's).

A system using targetry coupled separation may remove fission products prior to the end of life by incorporating the separation process such as $sCO_2$ process into the fuel management or 'shuffling' cycle to remove fission products periodically during irradiation (operation of the reactor). For example, some TWR re-fueling systems incorporate a sealed enclosure for raising the assembly out of the vessel. In such systems, the existing enclosure also contains cooling capability to manage assembly decay heat. These systems may be made more robust such that fission products may be removed, in containment, with minimal system modifications. This allows $sCO_2$ extraction to be done as an integral part of the shuffling operation. Such a system would not require large vessels and piping, due to the high density of $sCO_2$. Concentrations of greater than 10-4 kg metal/kg solution are possible. At end of life, each assembly contains the maximum amount of fission products, on the order of 50 kg. The solution density is on the order of 1000 kg/m3. Therefore only 5 $m^3$ of $sCO_2$ solution would be needed in some cases to contain all the fission products in a single assembly. Treating the assembly at more frequent intervals would obviously reduce this maximum volume. Furthermore, since the $CO_2$ may be separated from the fission products and re-entered into the system, the inventory can be additionally reduced.

Irradiated Material Reprocessing

Figure 12:
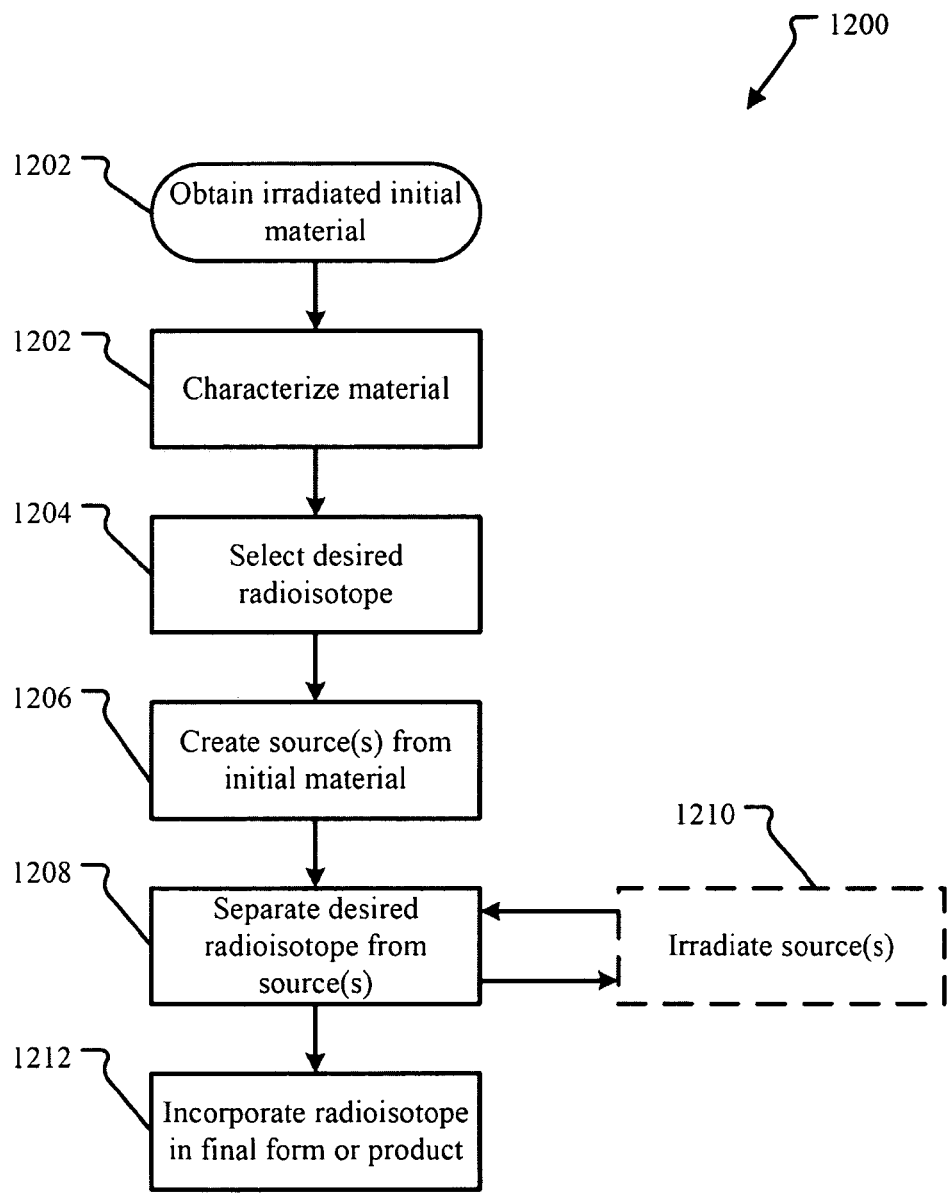
FIG. 12 illustrates an alternative embodiment of a method for selectively generating a desired radioisotope using targetry coupled separation.

FIG. 12 illustrates an alternative embodiment of a method for selectively generating a desired radioisotope using targetry coupled separation. The method of FIG. 12 differs from that of FIG. 3 in that the irradiated target material is provided as the starting material, thus limiting the options of which desired products may be selected. This may occur, for example, when a quantity of spent nuclear fuel is available and it is desired to use targetry coupled separation to recover some value from the spent fuel. Such an example includes the production of $^{223}$Ra from $^{223}$U which is a waste product from the thorium fuel cycle.

The method 1200 begins in operation 1201 with provision of an amount of irradiated source material, which may include some amount of both target and ancillary material, to be used in targetry coupled separation. The initial source material may be spent nuclear fuel, nuclear waste containing some amount of fissionable material, or some other material and may include any target material as described above.

The initial source material is then characterized to determine what radioisotopes are within the material in a characterization operation 1202. The initial source material may or may not be suitable for targetry coupled separation without further processing and/or its incorporation into a source material. Thus, the characterization operation 1202 also determines if the form of the initial material can be modified to enhance the separation of any particular radioisotopes.

A selection operation 1204, similar to that described above with reference to FIG. 3, is then performed. In this operation 1204, however, because the initial source material is known, the range of radioisotopes that may be selected is limited to those that can be obtained from the initial material. In an embodiment, more than one radioisotope may be selected.

As already noted, some desirable radioisotopes may not be direct products of an irradiation operation. In those situations, the selection operation 1204 may be equally considered a selection of the decay chain or a selection of any of the radioisotopes in the decay chain.

A material processing operation 1206 may then be performed. The initial source material is processed into one or more sources. In an embodiment where re-irradiation is to occur, this processing may be done based on the recoil distance of the selected radioisotope, as described with reference to FIG. 3. The processing operation 1206 may be as simple as placing the initial source material in a container. In another embodiment, the initial source material may be processed, physically and/or chemically, to make the form of the source material more suitable for the separation operation. For example, an initial material may be crushed and sieved to generate particulates having a selected particle size. As mentioned above, it the initial source material is to be re-irradiated, this sizing may be done based on the recoil distance of the selected radioisotope. Such processing may further include sintering the particulate into a ceramic, as described herein. Additional detail regarding embodiments of targets, source materials, and the processing operation 1206 are discussed with reference to FIG. 5, below.

The processing operation 1206 may include further selecting, creating and/or providing a suitable container for the source material. In an embodiment in which re-irradiation using neutrons will occur, the container may be made of a neutronically-translucent material, so that neutrons are capable of passing through the container. If re-irradiation will not occur, then a container of neutron-absorbing material may be selected. A container may be in any suitable shape and form and may be provided with one or more valves for allowing the easy introduction and/or removal of the extraction material.

After the source or sources have been created, a separation operation 1208 is performed, extracting atoms of the desired product or products from the source material. As mentioned above, the desired product may be the selected radioisotope, a decay daughter of the selected radioisotope, or, as is the case with $^{99}$Mo, both. This operation 1208 may include transporting the source(s) to a separation facility/equipment, for example by conveyor system as described above. In an embodiment of the separation operation 1208, the source material is exposed to an extraction material such as a solvent that preferentially extracts the desired product from the source without substantially dissolving the remaining target in the source material. For example, in one embodiment the source is in a solid phase and remains in the solid phase throughout the irradiation and separation operations.

In the embodiment illustrated in FIG. 12, an optional re-irradiation operation 1210 may be performed. In that operation, the sources are exposed to neutrons for some irradiation period in an irradiation operation 1210. This operation 1210 may include transporting the source(s) to the irradiation facility/equipment for safe irradiation, for example by conveyor belt as described above. In the irradiation operation 1210, source material is exposed to neutrons, thereby causing at least some atoms of the source material to undergo nuclear fission or neutron capture to create atoms of the selected radioisotope. This results in a re-irradiated source material that contains some amount of the selected radioisotope product within a reduced amount of unreacted target as discussed with reference to FIG. 11. In addition, because of the recoil from the fission reaction, at least some of the newly created atoms of the selected radioisotope move the recoil distance relative to the remaining, unreacted target within the source material. As described above, the recoil of the selected radioisotope product may make that radioisotope more available to the extraction material such as by making the radioisotope product closer to an available surface of the source material, which may then improve extraction by the extraction material.

In embodiments in which sources include a container, the source material may or may not be removed from the container during the separation operation 1208. The separation operation 1208 may further include regeneration of the target to prepare it for subsequent irradiation. This may involve one or more washing operations to remove extraction material from the source material prior to subsequent irradiation.

After a separation operation 1208, the same source may be re-irradiated to create more of the selected radioisotope allowing the irradiation and separation operations 1210, 1208 to be repeated multiple times without substantially dissolving, changing or removing any of the mass of remaining target material in the source (except as a result of the fusion reaction). As discussed above, this allows the fissionable material to be more efficiently converted into the desired product than would be possible with a single neutron exposure. The method 1200 further includes a final processing operation 1214 that converts the extracted radioisotope product into a final product or final form suitable for commercial use, as described with reference to FIG. 3. In an embodiment, the final processing operation 1214 includes incorporating the radioisotope into a daughter isotope generator as described above.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the technology described herein. For example, targetry coupled separation may be adapted to remove fission products including poisons or other nuclear contaminants from sources made of solid nuclear waste. Numerous other changes may be made which will readily suggest themselves to those skilled in the art and which are encompassed in the spirit of the disclosure and as defined in the appended claims.

What is claimed is:

1. A method of manufacturing a radioisotope of actinium comprising:
    providing an irradiated source material including thorium, the irradiated source material derived from fission product material created by the fissioning of a nuclear fuel;
    placing the irradiated source material including thorium in a containment vessel;
    storing the source material for a period of time thereby allowing some of the irradiated source material to decay into radioisotopes including at least one radioisotope of actinium;
    after storing the source material for the period of time, injecting the containment vessel containing the radioisotopes with supercritical carbon dioxide containing a ligand that selectively forms a metal complex with the at least one radioisotope of actinium but does not form a metal complex with the thorium, thereby forming a supercritical carbon dioxide mixture containing an amount of actinium radioisotope complexes;
    removing the supercritical carbon dioxide mixture containing an amount of actinium radioisotope complexes; and
    separating at least some of the actinium radioisotope complexes from the supercritical carbon dioxide mixture to provide a separation fraction containing the at least one radioisotope of actinium.

2. The method of claim 1, wherein the thorium is a direct irradiation product of the fissioning of the nuclear fuel.

3. The method of claim 1, wherein the thorium has been previously separated from the fission product material.

4. The method of claim 1, wherein the separating further comprises:
    transferring the supercritical carbon dioxide mixture containing an amount of actinium radioisotope complexes to an extraction vessel; and
    adjusting at least one of a temperature or a pressure of the actinium radioisotope complexes and supercritical carbon dioxide mixture.

5. The method of claim 4, wherein the adjusting further comprises:
    decreasing the temperature, the pressure, or both to obtain a liquid phase separate from the supercritical carbon dioxide, the liquid phase containing the at least one radioisotope of actinium.

6. The method of claim 5, wherein the separating further comprises:
    removing the liquid phase from the extraction vessel.

7. The method of claim 6, wherein the decomposing further comprises:
    heating the liquid phase.

8. The method of claim 1, wherein the at least one radioisotope of actinium is $^{227}$Ac.

\* \* \* \* \*